United States Patent
Wang et al.

(10) Patent No.: US 11,887,557 B2
(45) Date of Patent: Jan. 30, 2024

(54) METHOD FOR IMAGE PROCESSING BASED ON VERTICAL SYNCHRONIZATION SIGNALS AND ELECTRONIC DEVICE

(71) Applicant: HUAWEI TECHNOLOGIES CO., LTD., Guangdong (CN)

(72) Inventors: Liang Wang, Shanghai (CN); Yu Li, Shanghai (CN); Jian Chen, Shanghai (CN); Xingchun Ji, Shanghai (CN); Yifang Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 17/624,292

(22) PCT Filed: Jul. 3, 2020

(86) PCT No.: PCT/CN2020/100014
§ 371 (c)(1),
(2) Date: Dec. 31, 2021

(87) PCT Pub. No.: WO2021/000921
PCT Pub. Date: Jan. 7, 2021

(65) Prior Publication Data
US 2022/0358894 A1    Nov. 10, 2022

(30) Foreign Application Priority Data

Jul. 3, 2019 (CN) .......................... 201910596178.X
Jul. 9, 2019 (CN) .......................... 201910617101.6

(51) Int. Cl.
*G09G 5/12* (2006.01)
*G09G 5/00* (2006.01)

(52) U.S. Cl.
CPC ...... *G09G 5/001* (2013.01); *G09G 2320/0252* (2013.01); *G09G 2330/021* (2013.01); *G09G 2340/10* (2013.01); *G09G 2354/00* (2013.01)

(58) Field of Classification Search
CPC ............ G09G 5/363; G09G 5/12; G09G 5/18; G09G 2340/10; G09G 2354/00;
(Continued)

(56) References Cited

U.S. PATENT DOCUMENTS

2014/0184619 A1    7/2014 Kim
2016/0247484 A1*   8/2016 Chen .................. G06T 1/20
(Continued)

FOREIGN PATENT DOCUMENTS

CN    103593155 A    2/2014
CN    105913371 A    8/2016
(Continued)

OTHER PUBLICATIONS

Deng Wei et al, Dual-channel chaos synchronization and communication based on a vertical-cavity surface emitting laser with double optical feedback, Acta Phys. Sin. vol. 62, No. 16 (2013) 164209, 8 pages.

*Primary Examiner* — Hau H Nguyen
(74) *Attorney, Agent, or Firm* — HUAWEI TECHNOLOGIES CO., LTD.

(57) ABSTRACT

Embodiments of this application relate to the field of image processing and display technologies, and provide a method for image processing based on vertical synchronization signals and an electronic device, to shorten a response latency of the electronic device and improve fluency (such as a touch latency) of the electronic device. A specific solution includes: drawing, by the electronic device, one or more first layers in response to a first vertical synchronization signal, and rendering the one or more first layers, and
(Continued)

after rendering the one or more first layers, performing layer composing on the rendered one or more first layers to obtain a first image frame; and refreshing and displaying the first image frame in response to a second vertical synchronization signal.

16 Claims, 25 Drawing Sheets

(58) Field of Classification Search
 CPC ..... G09G 2320/0252; G09G 2330/021; G09G 2340/12
 See application file for complete search history.

(56) References Cited

U.S. PATENT DOCUMENTS

| | | |
|---|---|---|
| 2016/0335737 A1 | 11/2016 | Shah et al. |
| 2017/0205943 A1 | 7/2017 | Uchiyama et al. |
| 2018/0121213 A1 | 5/2018 | Koo et al. |
| 2018/0164586 A1 | 6/2018 | Jin |
| 2018/0261140 A1* | 9/2018 | Yi ................ G09G 3/2003 |

FOREIGN PATENT DOCUMENTS

| | | |
|---|---|---|
| CN | 107220019 A | 9/2017 |
| CN | 107533450 A | 1/2018 |
| CN | 108829475 A | 11/2018 |
| CN | 110503708 A | 11/2019 |
| JP | 2005322144 A | 11/2005 |
| WO | 2018161957 A1 | 9/2018 |

* cited by examiner

METHOD FOR IMAGE PROCESSING BASED ON VERTICAL SYNCHRONIZATION SIGNALS AND ELECTRONIC DEVICE

CROSS-REFERENCE TO RELATED APPLICATIONS

This application is a National Stage of International Application No. PCT/CN2020/100014, filed on Jul. 3, 2020, which claims priority to Chinese Patent Application No. 201910596178.X, filed on Jul. 3, 2019 and Chinese Patent Application No. 201910617101.6, filed on Jul. 9, 2019. All of the aforementioned applications are hereby incorporated by reference in their entireties.

TECHNICAL FIELD

Embodiments of this application relate to the field of image processing and display technologies, and in particular, to a method for image processing based on vertical synchronization signals and an electronic device.

BACKGROUND

With development of electronic technologies, performance of various electronic products (such as mobile phones) becomes better. Consumers have increasingly high requirements on man-machine interaction performance of electronic products. Fluency is important man-machine interaction performance. For example, fluency may include a touch latency.

Fluency may be reflected as a length of a latency time from inputting a user operation to an electronic product by a user to displaying an image corresponding to the user operation by the electronic product. For example, the user operation may be an operation input by the user by using a mouse or a key. Alternatively, the user operation may be a touch operation performed by the user on a touchscreen. The latency time may be referred to as a response latency of the electronic device. For example, when the user operation is a touch operation, the latency time may be referred to as a touch response latency. If the latency time is longer, fluency (such as a touch latency) is poorer; or if the latency time is shorter, fluency (such as a touch latency) is better. Therefore, how to shorten the latency time and improve fluency of the electronic product is a problem to be resolved urgently.

SUMMARY

Embodiments of this application provide a method for image processing based on vertical synchronization signals and an electronic device, to shorten a response latency of the electronic device and improve fluency of the electronic device.

To achieve the foregoing objective, the following technical solutions are used in the embodiments of this application:

According to a first aspect, an embodiment of this application provides a method for image processing based on vertical synchronization signals. The method may be applied to an electronic device including a touchscreen. The method may include the following steps: The electronic device draws one or more first layers in response to a first vertical synchronization signal, and renders the one or more first layers, and after rendering the one or more first layers, performs layer composing on the rendered one or more first layers to obtain a first image frame; and refreshes and displays the first image frame in response to a second vertical synchronization signal.

In a first case, the electronic device can complete layer drawing, rendering, and composing in one synchronization period. In other words, a duration required by the electronic device for layer drawing, rendering, and composing is shorter than or equal to one synchronization period. The synchronization period is equal to a signal period of the second vertical synchronization signal. In this case, the electronic device may perform layer drawing, rendering, and composing in response to the first vertical synchronization signal, instead of performing layer composing on the rendered first layer in response to a third vertical synchronization signal only after waiting for arrival of the third vertical synchronization signal. In this way, the electronic device can complete layer drawing, rendering, and composing in one synchronization period (such as a first synchronization period). In other words, the method in this embodiment of this application can shorten a response latency of the electronic device by one synchronization period, and can improve fluency (such as a touch latency) of the electronic device.

In a second case, the electronic device cannot complete layer drawing, rendering, and composing in one synchronization period. In other words, a duration required by the electronic device for layer drawing, rendering, and composing is longer than one synchronization period. In this case, if a conventional solution "performing layer composing in response to a third vertical synchronization signal" is used, a frame loss phenomenon may occur in a process of refreshing and displaying the image frame. However, the method in this embodiment of this application can avoid a frame loss phenomenon in image displaying, to prevent a display screen from displaying a repeated image frame. In other words, the method in this embodiment of this application can ensure fluency of image displaying of the display screen, thereby improving visual experience of a user. In addition, a possibility that the electronic device completes layer drawing, rendering, and composing in one synchronization period can be increased.

With reference to the first aspect, in a possible design, when detecting a user operation or a user interface (user interface, UI) event on the electronic device, the electronic device may draw the one or more first layers in response to the first vertical synchronization signal, and render the one or more first layers. The user operation may be used to trigger the electronic device to update an interface.

With reference to the first aspect, in another possible design, the method in this embodiment of this application may further include: the electronic device performs positive scheduling on a hardware resource of the electronic device, to shorten a duration required by the electronic device for layer drawing, layer rendering, and/or layer composing.

With reference to the first aspect, in another possible design, that the electronic device performs positive scheduling on a hardware resource of the electronic device may include: the electronic device performs one or more of the following hardware resource scheduling, to shorten the duration required by the electronic device for layer drawing, layer rendering, and/or layer composing.

The positive scheduling may include: increasing a working frequency of a processor of the electronic device, selecting a large-core processor to perform the method, and increasing a working frequency of a memory of the electronic device. The processor may include a central processing unit (central processing unit, CPU) and/or a graphics processing unit (graphics processing unit, GPU).

It may be understood that if the working frequency of the processor is higher, a computing speed of the processor is higher, and the duration required by the electronic device for layer drawing, rendering, and composing is shorter. A computing speed of a large-core processor is higher than a computing speed of a small-core processor. If the working frequency of the memory of the electronic device is higher, a read/write speed of the electronic device is higher, and the duration required by the electronic device for layer drawing, rendering, and composing is shorter. The electronic device can perform positive scheduling on the hardware resource of the electronic device, to shorten the duration required by the electronic device for layer drawing, layer rendering, and/or layer composing, and increase a possibility that the electronic device completes layer drawing, rendering, and composing in one synchronization period. Therefore, if the electronic device can complete layer drawing, rendering, and composing in one synchronization period, the response latency of the electronic device can be shortened by one synchronization period, and fluency (for example, the touch latency) of the electronic device can be improved.

With reference to the first aspect, in another possible design, the electronic device may perform positive scheduling on the hardware resource of the electronic device based on a first frame processing duration, to shorten the duration required by the electronic device for layer drawing, layer rendering, and/or layer composing. For example, assuming that the electronic device increases the working frequency of the processor, if the first frame processing duration is longer, the electronic device adjusts the working frequency of the processor to a higher frequency when adjusting the working frequency of the processor.

With reference to the first aspect, in another possible design, the electronic device may perform positive scheduling on the hardware resource of the electronic device based on a quantity of times or a probability of completing layer drawing, layer rendering, and layer composing by the electronic device in one synchronization period in a first measurement period, to shorten the duration required by the electronic device for layer drawing, layer rendering, and/or layer composing. For example, assuming that the electronic device increases the working frequency of the processor, if the quantity of times of completing layer drawing, layer rendering, and layer composing by the electronic device in one synchronization period in the first measurement period is smaller, or the probability of completing layer drawing, layer rendering, and layer composing by the electronic device in one synchronization period in the first measurement period is lower, the electronic device adjusts the working frequency of the processor to a higher frequency when adjusting the working frequency of the processor.

With reference to the first aspect, in another possible design, the electronic device may perform positive scheduling on a foreground application of the electronic device, to shorten the duration required by the electronic device for layer drawing, layer rendering, and/or layer composing. The foreground application is an application corresponding to an interface currently displayed on the display screen.

It may be understood that a plurality of applications may be installed in the electronic device. When the electronic device runs different applications in the foreground, different time is required for layer drawing, rendering, and composing. Therefore, a manner or policy used to perform positive scheduling on the hardware resource of the electronic device may be set for each application. For example, assuming that the electronic device increases the working frequency of the processor, when the electronic device runs the foreground application, if the duration required for layer drawing, rendering, and composing is longer, the electronic device adjusts the working frequency of the processor to a higher frequency when adjusting the working frequency of the processor.

With reference to the first aspect, in another possible design, if a first frame processing duration in a first measurement period is shorter than or equal to a preset single-frame duration, the electronic device may draw the one or more first layers in response to the first vertical synchronization signal, and render the one or more first layers, and after rendering the one or more first layers, perform layer composing on the rendered one or more first layers to obtain the first image frame.

The first frame processing duration is a sum of a first frame rendering duration and a first SF frame duration. The first frame rendering duration is a duration required for drawing the layer and rendering the drawn layer. The first SF frame duration is a duration required for performing layer composing on the rendered layer.

It may be understood that if the first frame processing duration in the first measurement period (that is, a measurement period before a current time) is shorter than or equal to the preset single-frame duration, it indicates that the electronic device can complete layer drawing, rendering, and composing in one synchronization period in the first measurement period. In this case, in a measurement period (that is, a measurement period in which the current time is located) next to the first measurement period, there is a relatively high possibility that the electronic device completes layer drawing, rendering, and composing in one synchronization period.

With reference to the first aspect, in another possible design, the preset single-frame duration is shorter than or equal to a signal period of the second vertical synchronization signal.

With reference to the first aspect, in another possible design, if the first frame processing duration in the first measurement period (that is, the measurement period before the current time) is longer than the preset single-frame duration, it indicates that the electronic device cannot complete layer drawing, rendering, and composing in one synchronization period in the first measurement period. In this case, in the measurement period (that is, the measurement period in which the current time is located) next to the first measurement period, there is a relatively low possibility that the electronic device completes layer drawing, rendering, and composing in one synchronization period. In this case, the electronic device may draw the one or more first layers in response to the first vertical synchronization signal, and perform layer composing on the rendered first layer in response to the third vertical synchronization signal, to obtain the first image frame.

With reference to the first aspect, in another possible design, if the first frame processing duration is longer than the preset single-frame duration, the electronic device may draw the one or more first layers in response to the first vertical synchronization signal, and render the one or more first layers, and after rendering the one or more first layers, perform layer composing on the rendered one or more first layers to obtain the first image frame. Therefore, the electronic device can perform layer composing in advance, and a possibility that the electronic device completes layer drawing, rendering, and composing in one synchronization period can be increased.

With reference to the first aspect, in another possible design, the method in this embodiment of this application may further include: the electronic device obtains one or more second frame processing durations in the first measurement period; and determines the first frame processing duration based on the one or more second frame processing durations. Each second frame processing duration is a sum of a second frame rendering duration and a second SF frame duration. The second frame rendering duration is a duration required for drawing the layer and rendering the drawn layer. The second SF frame duration is a duration required for performing layer composing on the rendered layer. When the one or more second frame processing durations include a plurality of second frame processing durations, the first frame processing duration is a longest second frame processing duration among the plurality of second frame processing durations, or the first frame processing duration is an average value of the plurality of second frame processing durations.

With reference to the first aspect, in another possible design, the drawing one or more first layers in response to a first vertical synchronization signal, and rendering the one or more first layers, and after rendering the one or more first layers, performing layer composing on the rendered one or more first layers to obtain a first image frame may include: the electronic device draws the one or more first layers in the first synchronization period in response to the first vertical synchronization signal, and renders the one or more first layers, and after rendering the one or more first layers, performs layer composing on the rendered one or more first layers to obtain the first image frame. The first synchronization period is a synchronization period corresponding to the first vertical synchronization signal. In other words, in this embodiment of this application, the electronic device may start layer composing in one synchronization period (that is, the first synchronization period) in which layer drawing and rendering are performed.

With reference to the first aspect, in another possible design, the method in this embodiment of this application may further include: if the first frame processing duration is longer than the preset single-frame duration, the electronic device performs positive scheduling on the hardware resource of the electronic device, to shorten the duration required by the electronic device for layer drawing, layer rendering, and/or layer composing. For a specific method for performing positive scheduling by the electronic device on the hardware resource of the electronic device and a technical effect achieved, refer to descriptions in the foregoing possible designs. Details are not described herein again in this embodiment of this application.

With reference to the first aspect, in another possible design, the one or more layers may include a layer drawn by the electronic device by performing a drawing task corresponding to one or more applications. The one or more applications may include at least one of one or more system-level applications and one or more user-level applications. For example, the system-level application may include a status bar, a launcher, a navigation bar, and a wallpaper. The user-level application may include a system application of the electronic device such as "settings", "phone", and "SMS", and a third-party application that the electronic device can download from an application store in response to a user operation. For example, the third-party application may include an application such as WeChat, Alipay, or Baidu Map.

With reference to the first aspect, in another possible design, that the electronic device draws one or more first layers in response to a first vertical synchronization signal, and renders the one or more first layers, and after rendering the one or more first layers, performs layer composing on the rendered one or more first layers to obtain a first image frame may specifically include: the electronic device draws one or more first layers for each of the one or more applications in response to the first vertical synchronization signal, and renders the one or more first layers; and the electronic device performs layer composing on the one or more first layers rendered by the electronic device for the one or more applications, to obtain the first image frame. In other words, the electronic device may perform layer drawing and rendering for each application in response to the first vertical synchronization signal, and then perform layer composing on the one or more first layers rendered by the electronic device for all of the one or more applications, to obtain the first image frame.

With reference to the first aspect, in another possible design, the performing layer composing on the rendered one or more first layers to obtain a first image frame after rendering the one or more first layers may specifically include: after rendering one or more first layers of a focus application, a key application, or an application closely related to fluency of the electronic device in the one or more applications, the electronic device performs layer composing on the first layer rendered by the electronic device for the one or more applications, to obtain the first image frame. In other words, when the electronic device completes layer rendering for the focus application, even if layer rendering for another application is not completed, the electronic device may start to perform layer composing on the rendered first layer, to obtain the first image frame.

With reference to the first aspect, in another possible design, the performing layer composing on the rendered one or more first layers to obtain a first image frame after rendering the one or more first layers may specifically include: after rendering a focus layer, a key layer, or a layer closely related to fluency of the electronic device in the one or more first layers, the electronic device performs layer composing on the first layer rendered by the electronic device for the one or more applications, to obtain the first image frame.

With reference to the first aspect, in another possible design, the electronic device may determine the first frame processing duration based on a first frame rendering duration corresponding to the focus application in the one or more applications and a first SF frame duration corresponding to the one or more applications by the electronic device.

With reference to the first aspect, in another possible design, the electronic device may determine the first frame processing duration based on a longest first frame rendering duration among first frame rendering durations corresponding to all of the one or more applications and a first SF frame duration corresponding to the one or more applications by the electronic device.

With reference to the first aspect, in another possible design, after the electronic device performs positive scheduling on the hardware resource of the electronic device, when a screen refresh rate of the electronic device is greater than a preset refresh rate threshold, the electronic device may perform negative scheduling on the hardware resource of the electronic device, to reduce power consumption of the electronic device. Therefore, the electronic device can avoid a frame loss phenomenon in image displaying in the second case while reducing power consumption, to prevent the display screen from displaying a repeated image frame.

With reference to the first aspect, in another possible design, after the electronic device performs positive scheduling on the hardware resource of the electronic device, when the screen refresh rate of the electronic device is greater than the preset refresh rate threshold, if the first frame processing duration is longer than a preset dual-frame duration, the electronic device may perform negative scheduling on the hardware resource of the electronic device, to reduce power consumption of the electronic device. Therefore, the electronic device can avoid a frame loss phenomenon in image displaying in the second case while reducing power consumption, to prevent the display screen from displaying a repeated image frame.

With reference to the first aspect, in another possible design, the electronic device may perform one or more of the following negative scheduling, to reduce power consumption of the electronic device. The negative scheduling includes: decreasing the working frequency of the processor of the electronic device, selecting a small-core processor to perform the method, and decreasing the working frequency of the memory of the electronic device.

With reference to the first aspect, in another possible design, the preset dual-frame duration is shorter than or equal to K times the signal period of the second vertical synchronization signal, where $K \geq 2$.

With reference to the first aspect, in another possible design, a method for increasing the working frequency of the processor by the electronic device may include: the electronic device increases the working frequency of the processor based on a first preset step; or the electronic device increases the working frequency of the processor based on a difference between the first frame processing duration and the preset single-frame duration. A range of adjusting the working frequency of the processor is proportional to a value of the difference.

With reference to the first aspect, in another possible design, the method in this embodiment of this application may further include: if the first frame processing duration meets a preset condition, decreasing the working frequency of the processor. That the first frame processing duration meets a preset condition specifically includes: the first frame processing duration is shorter than the preset single-frame duration; or the first frame processing duration is shorter than the preset single-frame duration, and a difference between the preset single-frame duration and the first frame processing duration is greater than a first preset duration.

It may be understood that if the first frame processing duration is shorter than the preset single-frame duration, it indicates that there is a relatively high possibility that the electronic device completes layer drawing, rendering, and composing in one synchronization period. In this case, possibly because the working frequency of the processor is relatively high, the computing speed of the processor is relatively high, and the electronic device can complete layer drawing, rendering, and composing in one synchronous period. However, an excessively high working frequency of the processor causes relatively high power consumption of the electronic device. Therefore, the electronic device may reduce the working frequency of the processor.

With reference to the first aspect, in another possible design, to prevent a ping-pong phenomenon during an adjustment of the working frequency of the processor, the method in this embodiment of this application may further include: if first frame processing durations in N consecutive measurement periods meet the preset condition, decreasing the working frequency of the processor, where $N \geq 2$, and N is a positive integer. This can not only prevent a ping-pong phenomenon during the adjustment of the working frequency of the processor, but also implement a fast rise and slow fall during the adjustment of the working frequency of the processor. While ensuring system stability of the electronic device in layer drawing, rendering, and composing, this can shorten a touch response latency of the electronic device, and improve fluency (for example, the touch latency) of the electronic device.

With reference to the first aspect, in another possible design, a method for decreasing the working frequency of the processor by the electronic device may include: the electronic device decreases the working frequency of the processor based on a second preset step.

The second preset step may be equal to the first preset step. Alternatively, the second preset step may be less than the first preset step.

It should be noted that when the second preset step is less than the first preset step, the electronic device may adjust the working frequency of the processor in a fast rise and slow fall manner. This helps the electronic device perform the method in this embodiment of this application, shorten the touch response latency of the electronic device, and improve fluency (for example, the touch latency) of the electronic device.

With reference to the first aspect, in another possible design, the method in this embodiment of this application may further include: in a measurement period, if a duration consumed at a first characteristic point during drawing and rendering of one or more third layers is longer than a second preset duration corresponding to the first characteristic point, adjusting the working frequency of the processor to a maximum working frequency of the processor. The first characteristic point includes at least any one of the following: drawing the one or more third layers; rendering the one or more third layers; executing any function in a process of drawing the one or more third layers; and executing any function in a process of rendering the one or more third layers.

It may be understood that, in the measurement period, if the duration consumed at the first characteristic point is longer than the second preset duration corresponding to the first characteristic point, it indicates that there is a relatively high possibility that the electronic device cannot complete drawing and rendering of one or more third layers by using a method corresponding to an accelerated rendering mode.

The one or more third layers are layers that are being drawn or rendered by the electronic device in the measurement period. In this case, the electronic device may instantaneously increase the frequency of the processor, and adjust the working frequency of the processor to the maximum working frequency of the processor. After the frequency of the processor is instantaneously increased, the computing speed of the processor may be increased, and further, the duration required by the electronic device for layer drawing, rendering, and composing may be shortened.

With reference to the first aspect, in another possible design, after the electronic device adjusts the working frequency of the processor to the maximum working frequency of the processor, the method in this embodiment of this application may further include: if a third frame processing duration is longer than the preset single-frame duration, performing layer composing on the rendered layer in response to the third vertical synchronization signal, to obtain the image frame. The third frame processing duration is a sum of a third frame rendering duration and a third SF frame duration. The third frame rendering duration is a duration required for drawing and rendering the one or more third layers. The third SF frame duration is a duration required for performing layer composing on the rendered one or more third layers.

With reference to the first aspect, in another possible design, the preset single-frame duration is a difference between a synchronization period and a preset latency threshold. The preset latency threshold is greater than or equal to zero.

With reference to the first aspect, in another possible design, before the electronic device draws the one or more first layers in response to the first vertical synchronization signal, and renders the one or more first layers, and after rendering the one or more first layers, performs layer composing on the rendered one or more first layers to obtain the first image frame, the method in this embodiment of this application may further include: starting the accelerated rendering mode in response to a first event.

After the accelerated rendering mode is started, in response to the first vertical synchronization signal, the electronic device may not only draw the one or more first layers and render the one or more first layers, but also perform layer composing on the rendered one or more first layers, to obtain the first image frame. The first event may include: a first operation of the user is received; and/or the first frame processing duration in the first measurement period is shorter than or equal to the preset single-frame duration. The first measurement period is the measurement period before the current time.

With reference to the first aspect, in another possible design, in response to a second event, the electronic device may exit the accelerated rendering mode. The second event may include: a second operation of the user is received; and/or the first frame processing duration in the first measurement period is longer than the preset single-frame duration.

After the electronic device exits the accelerated rendering mode, the method in this embodiment of this application may further include: drawing one or more second layers in response to a first vertical synchronization signal, and rendering the one or more second layers; performing layer composing on the rendered one or more second layers in response to a third vertical synchronization signal to obtain a second image frame; and refreshing and displaying the second image frame in response to a second vertical synchronization signal.

According to a second aspect, this application provides an electronic device, where the electronic device includes a touchscreen, a memory, and one or more processors, where the touchscreen and the memory are coupled to the processor; and the memory is configured to store computer program code, the computer program code includes computer instructions, and when the processor executes the computer instructions, the electronic device performs the method according to any one of the first aspect and possible designs of the first aspect.

According to a third aspect, this application provides a system-on-a-chip, where the system-on-a-chip is applied to an electronic device including a touchscreen; the system-on-a-chip includes one or more interface circuits and one or more processors; the interface circuit and the processor are interconnected by using a line; the interface circuit is configured to receive a signal from a memory of the electronic device, and send the signal to the processor, where the signal includes computer instructions stored in the memory; and when the processor executes the computer instructions, the electronic device performs the method according to any one of the first aspect and possible designs of the first aspect.

According to a fourth aspect, this application provides a computer storage medium, where the computer storage medium includes computer instructions, and when the computer instructions are run on an electronic device, the electronic device is enabled to perform the method according to any one of the first aspect and possible designs of the first aspect.

According to a fifth aspect, this application provides a computer program product, where when the computer program product is run on a computer, the computer is enabled to perform the method according to any one of the first aspect and possible designs of the first aspect.

It may be understood that for beneficial effects achievable by the electronic device provided in the second aspect, the system-on-a-chip in the third aspect, the computer storage medium in the fourth aspect, and the computer program product in the fifth aspect, refer to the beneficial effects in any one of the first aspect and possible designs of the first aspect. Details are not described herein again.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments, unless otherwise stated, "a plurality of" means two or more than two.

An embodiment of this application provides a method for image processing based on vertical synchronization signals. The method may be applied to an electronic device including a touchscreen. Specifically, the method may be applied to a process in which the electronic device displays an image on the touchscreen in response to a touch operation performed by a user on the touchscreen.

A latency time from inputting a user operation to the electronic device by the user to displaying an image corresponding to the user operation by the electronic device may be referred to as a response latency of the electronic device. Fluency (such as a touch latency) of the electronic device may be reflected by a length of the response latency. For example, when the user operation is a touch operation, the fluency may be the touch latency, and the response latency may be referred to as a touch response latency. The touch response latency is a latency time from inputting the touch operation to the touchscreen by a finger of the user to displaying an image corresponding to the touch operation by the touchscreen.

Specifically, if the response latency of the electronic device is longer, the fluency (such as the touch latency) of the electronic device is poorer; or if the response latency of the electronic device is shorter, the fluency (such as the touch latency) of the electronic device is better. If the fluency (such as the touch latency) of the electronic device is better, the user has better user experience and feels more fluent when controlling the electronic device through a user operation (such as a touch operation). The method in this embodiment of this application can increase a possibility that the electronic device completes layer drawing, rendering, and composing in one synchronization period. Therefore, the response latency of the electronic device can be shortened, the fluency (such as the touch latency) of the electronic device is improved, and user experience is improved.

Figure 1A:
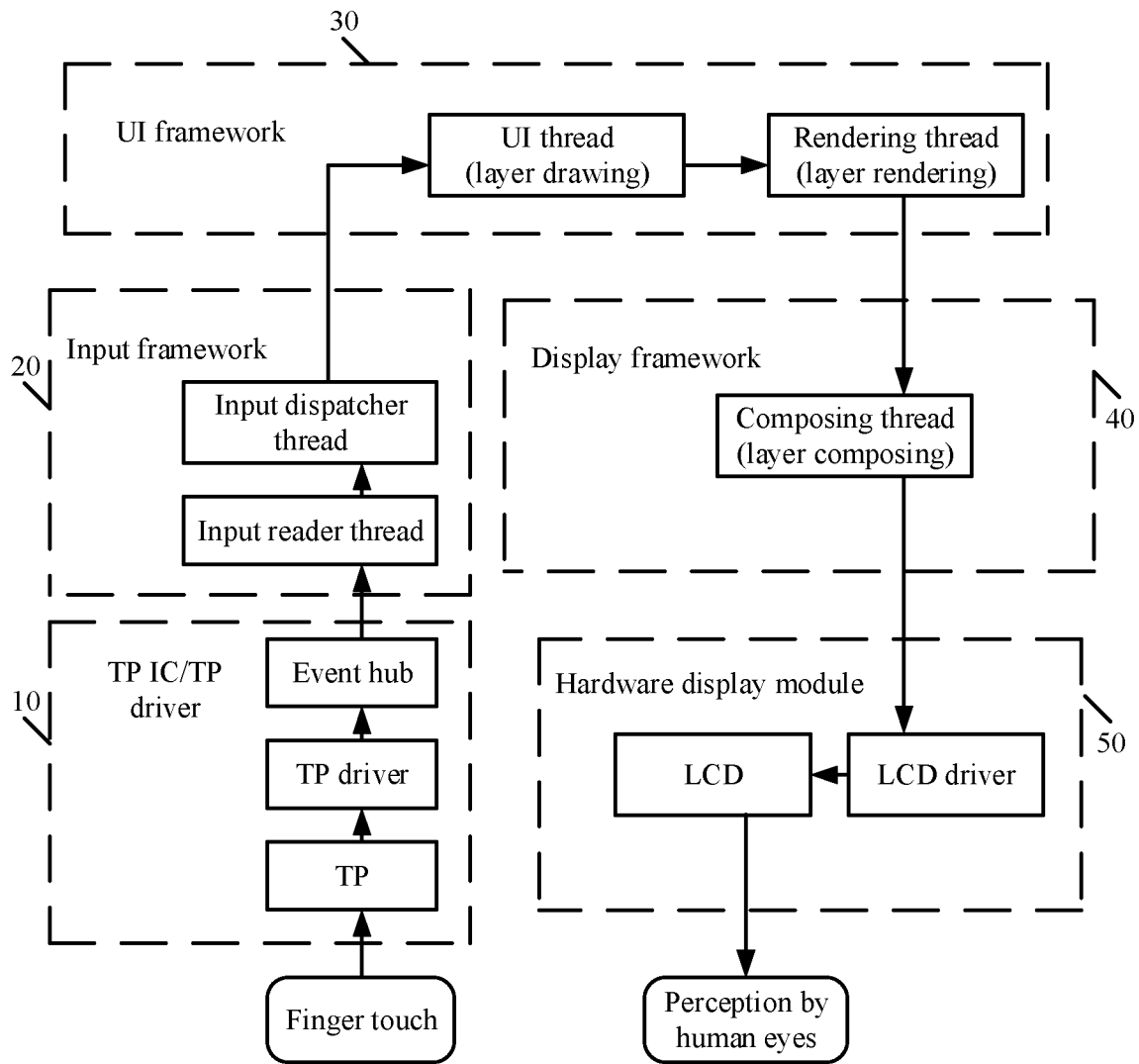
FIG. 1A is a schematic diagram of a software processing procedure in which an electronic device displays an image in response to a touch operation according to an embodiment of this application.

Assuming that the user operation is a touch operation, FIG. 1A is a schematic diagram of a software processing procedure of the electronic device in the process from inputting the touch operation to the touchscreen by the finger of the user to displaying the image corresponding to the touch operation by the touchscreen. As shown in FIG. 1A, the electronic device may include a touch panel (touch panel, TP)/TP driver (driver) 10, an input framework (input framework) 20, a UI framework (UI framework) 30, a display framework (display framework) 40, and a hardware display module 50.

As shown in FIG. 1A, the software processing procedure of the electronic device may include the following step (1) to step (5).

Step (1): After the TP in the TP IC/TP driver 10 captures a touch operation performed by a finger of the user on the TP of the electronic device, the TP driver reports a corresponding touch event to an event hub.

Step (2): An input reader thread of the input framework 20 may read the touch event from the event hub, and then send the touch event to the input dispatcher thread; and the input dispatcher thread uploads the touch event to a UI thread (such as DoFrame) in the UI framework 30.

Step (3): The UI thread in the UI framework 30 draws one or more layers corresponding to the touch event; and a rendering thread (such as DrawFrame) performs layer rendering on the one or more layers.

Step (4): A composing thread in the display framework 40 performs layer composing on the drawn one or more layers (that is, the rendered one or more layers) to obtain an image frame.

Step (5): A liquid crystal display panel (liquid crystal display, LCD) driver of the hardware display module 50 may receive the composed image frame, and an LCD displays the composed image frame. After the image frame is displayed on the LCD, the image displayed on the LCD can be perceived by human eyes.

In this embodiment of this application, the processing procedure of the electronic device in the process from "inputting the touch operation by the finger of the user on the touchscreen" to "displaying the image corresponding to the touch operation on the touchscreen, so that the image is perceived by human eyes" is analyzed herein, to briefly describe a principle of shortening a response latency of the electronic device.

Figure 1B:
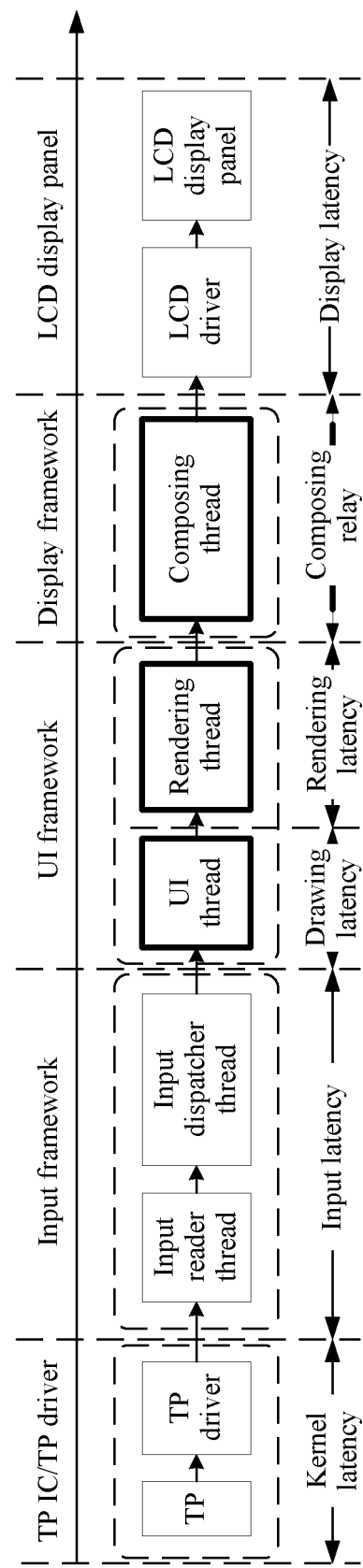
FIG. 1B is a schematic diagram of latencies in the software processing procedure shown in FIG. 1A.

In step (1), in a process in which the TP IC/TP driver 10 captures the touch operation and reports the touch event to the input framework 20, a kernel latency shown in FIG. 1B may exist. In step (2), in a process in which the input framework 20 processes the touch event and inputs the touch event to the UI framework, an input latency shown in FIG. 1B may exist. In step (3), a drawing latency (also referred to as a UI thread latency) shown in FIG. 1B may exist when the UI thread in the UI framework draws the one or more layers corresponding to the touch event. In addition, a rendering latency shown in FIG. 1B may exist when the rendering thread performs layer rendering. In step (4), a composing latency shown in FIG. 1B may exist when the composing thread in the display framework 40 performs layer composing. In step (5), in a process in which the hardware display module 50 displays the composed image frame, a display latency shown in FIG. 1B may exist.

The method for image processing based on vertical synchronization signals according to this embodiment of this application can shorten the "drawing latency", the "rendering latency", and the "composing latency" shown in FIG. 1B, to shorten the response latency of the electronic device, and improve fluency (for example, the touch latency) of the electronic device.

For example, the electronic device in this embodiment of this application may be a mobile phone, a tablet computer, a desktop computer, a laptop computer, a handheld computer, a notebook computer, an ultra-mobile personal computer (ultra-mobile personal computer, UMPC), a netbook, or a device including a touchscreen, such as a cellular phone, a personal digital assistant (personal digital assistant, PDA), or an augmented reality (augmented reality, AR) or virtual reality (virtual reality, VR) device. A specific form of the electronic device is not specifically limited in this embodiment of this application.

The following describes the implementations of the embodiments of this application in detail with reference to accompanying drawings.

Figure 2:
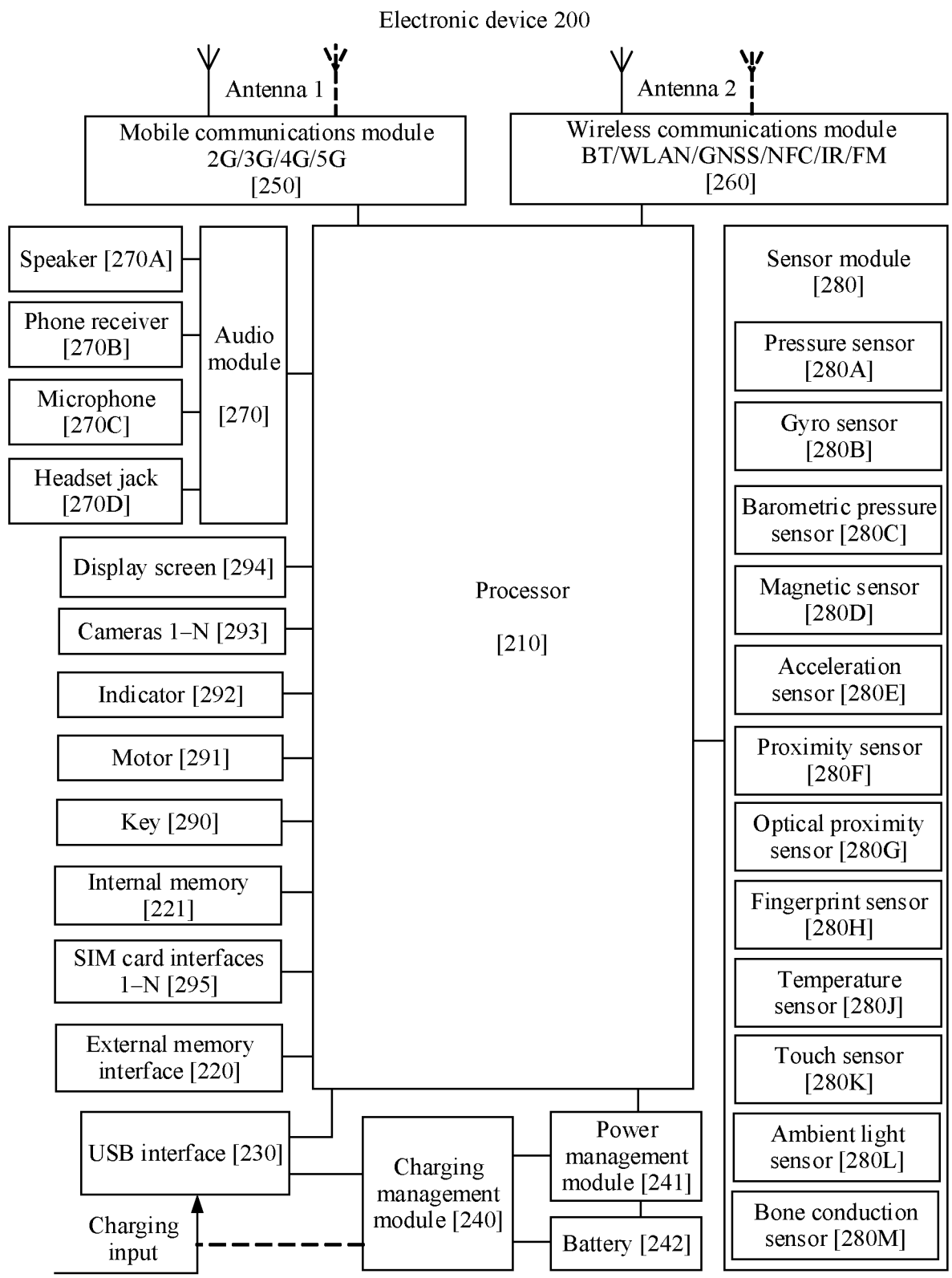
FIG. 2 is a schematic diagram of a hardware structure of an electronic device according to an embodiment of this application.

FIG. 2 is a schematic diagram of a structure of an electronic device 200 according to an embodiment of this application. As shown in FIG. 2, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a phone receiver 270B, a microphone 170C, a headset jack 270D, a sensor module 280, a key 290, a motor 291, an indicator 292, a camera 293, a display screen 294, and a subscriber identity module (subscriber identification module, SIM) card interface 295, and the like.

The sensor module 280 may include a pressure sensor 280A, a gyro sensor 280B, a barometric pressure sensor 280C, a magnetic sensor 280D, an acceleration sensor 280E, a proximity sensor 280F, an optical proximity sensor 280G, a fingerprint sensor 280H, a temperature sensor 280J, a touch sensor 280K, an ambient light sensor 280L, and a bone conduction sensor 280M, and the like.

It may be understood that the structure illustrated in this embodiment does not constitute a specific limitation on the electronic device 200. In other embodiments, the electronic device 200 may include more or fewer components than those shown in the figure, or some components are combined, or some components are split, or component arrangements are different. The illustrated components may be implemented by hardware, software, or a combination of software and hardware.

The processor 210 may include one or more processing units. For example, the processor 210 may include an application processor (application processor, AP), a modem processor, a GPU, an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on instruction operation code and a timing signal, and implement control over instruction fetching and instruction execution.

A memory may be further disposed in the processor 210, and is configured to store instructions and data. In some embodiments, the memory in the processor 210 is a cache memory. The memory may store instructions or data that have/has just been used or are/is cyclically used by the processor 210. If the processor 210 needs to use the instructions or data again, the processor 210 may invoke the instructions or data directly from the memory. Therefore, repeated access is avoided, a waiting time of the processor 210 is reduced, and system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

It may be understood that an interface connection relationship between modules illustrated in this embodiment is merely an example for description, and does not constitute a limitation on the structure of the electronic device 200. In other embodiments, the electronic device 200 may alternatively use different interface connection manners in the foregoing embodiments, or a combination of a plurality of interface connection manners.

The charging management module 240 is configured to receive a charging input from a charger. When charging the battery 242, the charging management module 240 may further supply power to the electronic device by using the power management module 241.

The power management module 241 is configured to connect the battery 242, the charging management module 240, and the processor 210. The power management module 241 receives an input from the battery 242 and/or the charging management module 240, and supplies power to the processor 210, the internal memory 221, the external memory, the display screen 294, the camera 293, the wireless communications module 260, and the like. In other embodiments, the power management module 241 may alternatively be disposed in the processor 210. In other embodiments, the power management module 241 and the charging management module 240 may alternatively be disposed in a same component.

A wireless communications function of the electronic device 200 may be implemented by using the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device 200 may be used to cover a single or a plurality of communication frequency bands. Different antennas may also be reused to improve antenna utilization. For example, the antenna 1 may be reused as a diversity antenna in a wireless local area network.

The mobile communications module 250 may provide a wireless communications solution applied to the electronic device 200 and including 2G/3G/4G/5G. The mobile communications module 250 may include at least one filter, a switch, a power amplifier, a low noise amplifier (low noise amplifier, LNA), and the like. The mobile communications module 250 may receive an electromagnetic wave by using the antenna 1, perform processing such as filtering and amplification on the received electromagnetic wave, and transmit the electromagnetic wave to the modem processor for demodulation. The mobile communications module 250 may further amplify a signal modulated by the modem processor, and convert the signal into an electromagnetic wave for radiation by using the antenna 1.

The modem processor may include a modulator and a demodulator. The modulator is configured to modulate a to-be-sent low frequency baseband signal into an intermediate or high frequency signal. The demodulator is configured to demodulate a received electromagnetic wave signal into a low frequency baseband signal. Then the demodulator transmits the low frequency baseband signal obtained through demodulation to the baseband processor for processing. After being processed by the baseband processor, the low frequency baseband signal is transferred to the application processor. The application processor outputs a sound signal by using an audio device (not limited to the speaker 270A, the phone receiver 270B, or the like), or displays an image or a video by using the display screen 294.

The wireless communications module 260 may provide a wireless communications solution applied to the electronic device 200 and including a wireless local area network (wireless local area network, WLAN) (for example, a Wireless Fidelity (Wireless Fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 260 may be one or more components integrating at least one communication processing module. The wireless communications module 260 receives an electromagnetic wave by using the antenna 2, performs frequency modulation and filtering processing on the electromagnetic wave signal, and sends the processed signal to the processor 210. The wireless communications module 260 may further receive a to-be-sent signal from the processor 210, perform frequency modulation and amplification on the signal, and convert the signal into an electromagnetic wave for radiation by using the antenna 2.

In some embodiments, the antenna 1 of the electronic device 200 is coupled to the mobile communications module 250, and the antenna 2 is coupled to the wireless communications module 260, so that the electronic device 200 can communicate with a network and another device by using a wireless communications technology. The wireless communications technology may include a global system for mobile communications (global system for mobile communications, GSM), general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), BT, GNSS, WLAN, NFC, FM, and/or IR technology. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 200 implements a display function by using the GPU, the display screen 294, the application processor, and the like. The GPU is a microprocessor for image processing, and is connected to the display screen 294 and the application processor. The GPU is configured to perform mathematical calculation and geometric calculation and used for graphics rendering. The processor 210 may include one or more GPUs that execute a program instruction to generate or change display information.

The display screen 294 is configured to display an image, a video, and the like. The display screen 294 includes a display panel. The display panel may be a liquid crystal display (liquid crystal display, LCD), an organic light-emitting diode (organic light-emitting diode, OLED), an active-matrix organic light emitting diode or an active matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diode, QLED), or the like.

The display screen 294 in this embodiment of this application may be a touchscreen. In other words, the touch sensor 280K is integrated in the display screen 294. The touch sensor 280K may also be known as a "touch panel". To be specific, the display screen 294 may include a display panel and a touch panel. The touch sensor 280K and the display screen 294 form a touchscreen, which is also referred to as a "touchscreen". The touch sensor 280K is configured to detect a touch operation that acts on or near the touch sensor 280K. After the touch sensor 280K detects the touch operation, a driver (for example, the TP driver) at the kernel layer may transfer the touch operation to the upper layer, to determine a touch event type. A visual output related to the touch operation may be provided by using the display screen 294. In other embodiments, the touch sensor 280K may alternatively be disposed on a surface of the electronic device 200, or disposed in a position different from the display screen 294.

The electronic device 200 may implement a photographing function by using the ISP, the camera 293, the video codec, the GPU, the display screen 294, the application processor, and the like. The ISP is configured to process data fed back by the camera 293. The camera 293 is configured to capture a still image or a video. The digital signal processor is configured to process a digital signal, and may process other digital signals in addition to a digital image signal. The video codec is configured to compress or decompress a digital video. The electronic device 200 may support one or more video codecs. Therefore, the electronic device 200 can play or record videos in a plurality of encoding formats, for example, moving picture experts group (moving picture experts group, MPEG) 1, MPEG2, MPEG3, and MPEG4.

The NPU is a neural-network (neural-network, NN) computing processor. With reference to a structure of a biological neural network, for example, with reference to a transfer mode between neurons of a human brain, the NPU quickly processes input information, and can further continuously perform self-learning. The NPU can implement applications such as intelligent cognition on the electronic device 200, for example, image recognition, human face recognition, speech recognition, and text understanding.

The external memory interface 220 may be configured to connect an external storage card, for example, a micro SD card, to expand a storage capability of the electronic device 200. The external storage card communicates with the processor 210 by using the external memory interface 220, to implement a data storage function. For example, music and video files are stored in the external storage card. The internal memory 221 may be configured to store computer-executable program code, where the computer-executable program code includes instructions. The processor 210 executes various function applications and data processing of the electronic device 200 by running the instructions stored in the internal memory 221. For example, in this embodiment of this application, the processor 210 may execute the instructions stored in the internal memory 221. The internal memory 221 may include a program storage area and a data storage area. The program storage area may store an operating system, an application program (for example, a sound playing function or an image playing function) required by at least one function, and the like. The data storage area may store data (for example, audio data or a phone book) created in a process of using the electronic device 200. In addition, the internal memory 221 may include a high-speed random access memory, and may further include a non-volatile memory, for example, at least one magnetic disk storage device, a flash memory, or a universal flash storage (universal flash storage, UFS).

The electronic device 200 may implement an audio function such as music playing or recording by using the audio module 270, the speaker 270A, the phone receiver 270B, the microphone 170C, the headset jack 270D, the application processor, and the like.

The audio module 270 is configured to convert digital audio information into an analog audio signal for outputting, and also configured to convert an analog audio input into a digital audio signal. The audio module 270 may be further configured to encode and decode an audio signal. The speaker 270A, also referred to as a "loudspeaker", is configured to convert an audio electrical signal into a sound signal. The phone receiver 270B, also referred to as an "earpiece", is configured to convert an audio electrical signal into a sound signal. The microphone 170C, also referred to as a "mike" or an "electro-acoustic transducer", is configured to convert a sound signal into an electrical signal. The headset jack 270D is configured to connect a wired headset.

The pressure sensor 280A is configured to sense a pressure signal and may convert the pressure signal into an electrical signal. In some embodiments, the pressure sensor 280A may be disposed on the display screen 294. The pressure sensor 280A is classified into a plurality of types, such as a resistive pressure sensor, an inductive pressure sensor, and a capacitive pressure sensor. The capacitive pressure sensor may include at least two parallel plates having an electrically conductive material. When a force is applied to the pressure sensor 280A, a capacitance between electrodes changes. The electronic device 200 determines strength of pressure based on the change of the capacitance. When a touch operation acts on the display screen 294, the electronic device 200 detects strength of the touch operation based on the pressure sensor 280A. The electronic device 200 may also calculate a touch position based on a detection signal of the pressure sensor 280A. In some embodiments, touch operations that act on a same touch position but have different touch operation strength may correspond to different operation instructions. In this embodiment of this application, the electronic device 200 may obtain pressure of the touch operation of the user by using the pressure sensor 280A.

The key 290 includes a power-on key, a volume key, and the like. The key 290 may be a mechanical key, or may be a touch key. The electronic device 200 may receive an input from the key, and generate a key signal input related to a user setting and function control of the electronic device 200. The motor 291 may generate a vibration prompt. The motor 291 may be used for an incoming call vibration prompt, or may be used for touch vibration feedback. The indicator 292 may be an indicator, and may be used to indicate a charging status or a power change, or may be used to indicate a message, a missed call, a notification, or the like. The SIM card interface 295 is configured to connect a SIM card. The SIM card may be inserted into the SIM card interface 295 or pulled out of the SIM card interface 295, so that the SIM card is in contact with or separated from the electronic device 200. The electronic device 200 may support one SIM card interface or N SIM card interfaces, where N is a positive integer greater than 1. The SIM card interface 295 may support a nano-SIM card, a micro-SIM card, a SIM card, and the like.

All methods in the following embodiments may be implemented in the electronic device 200 having the foregoing hardware structure.

The following describes terms used in the embodiments of this application.

Vertical synchronization signal 1: for example, VSYNC_APP. The vertical synchronization signal 1 may be used to trigger drawing of one or more layers. It should be noted that, in the embodiments of this application, "the vertical synchronization signal 1 may be used to trigger drawing of one or more layers" specifically means that the vertical synchronization signal 1 may be used to trigger drawing of one or more layers and trigger rendering of the one or more layers. In other words, in the embodiments of this application, the drawn one or more layers are rendered one or more layers. In the embodiments of this application, in response to the vertical synchronization signal 1, the electronic device may draw one or more layers for each application by using each drawing thread in a plurality of drawing threads. To be specific, in response to the vertical synchronization signal 1, the electronic device may simultaneously perform a drawing task for one or more applications, to draw one or more layers corresponding to each application. For detailed descriptions of the one or more applications, refer to related content in the following embodiments. Details are not described herein in the embodiments of this application.

Vertical synchronization signal 2: for example, VSYNC_SF. The vertical synchronization signal 2 may be used to trigger layer composing on the drawn one or more layers to obtain an image frame.

Vertical synchronization signal 3: for example, HW_VSYNC. The vertical synchronization signal 3 may be used to trigger hardware to refresh and display the image frame.

In the embodiments of this application, the vertical synchronization signal 1 (for example, VSYNC_APP) is the first vertical synchronization signal described in the claims, the vertical synchronization signal 2 (for example, VSYNC_SF) is the third vertical synchronization signal described in the claims, the vertical synchronization signal 3 (HW_VSYNC) is the second vertical synchronization signal described in the claims.

It should be noted that names of the vertical synchronization signals may be different in different systems or architectures. For example, in some systems or architectures, a name of the vertical synchronization signal (that is, the vertical synchronization signal 1) used to trigger drawing of one or more layers may not be VSYNC_APP. However, regardless of the name of the vertical synchronization signal, as long as the vertical synchronization signal is a synchronization signal having a similar function and complying with the technical idea of the method provided in the embodiments of this application, such ideas shall fall within the protection scope of this application.

In addition, definitions of the vertical synchronization signals may be different in different systems or architectures. For example, in other systems or architectures, a definition of the vertical synchronization signal 1 may be: the vertical synchronization signal 1 may be used to trigger rendering of one or more layers; a definition of the vertical synchronization signal 2 may be: the vertical synchronization signal 2 may be used to trigger generation of an image frame based on the one or more layers; and a definition of the vertical synchronization signal 3 may be: the vertical synchronization signal 3 may be used to trigger displaying of the image frame. In the embodiments of this application, the definition of the vertical synchronization signal is not limited. However, regardless of the definition of the vertical synchronization signal, as long as the vertical synchronization signal is a synchronization signal having a similar function and complying with the technical idea of the method provided in the embodiments of this application, such ideas shall fall within the protection scope of this application.

Figure 3:
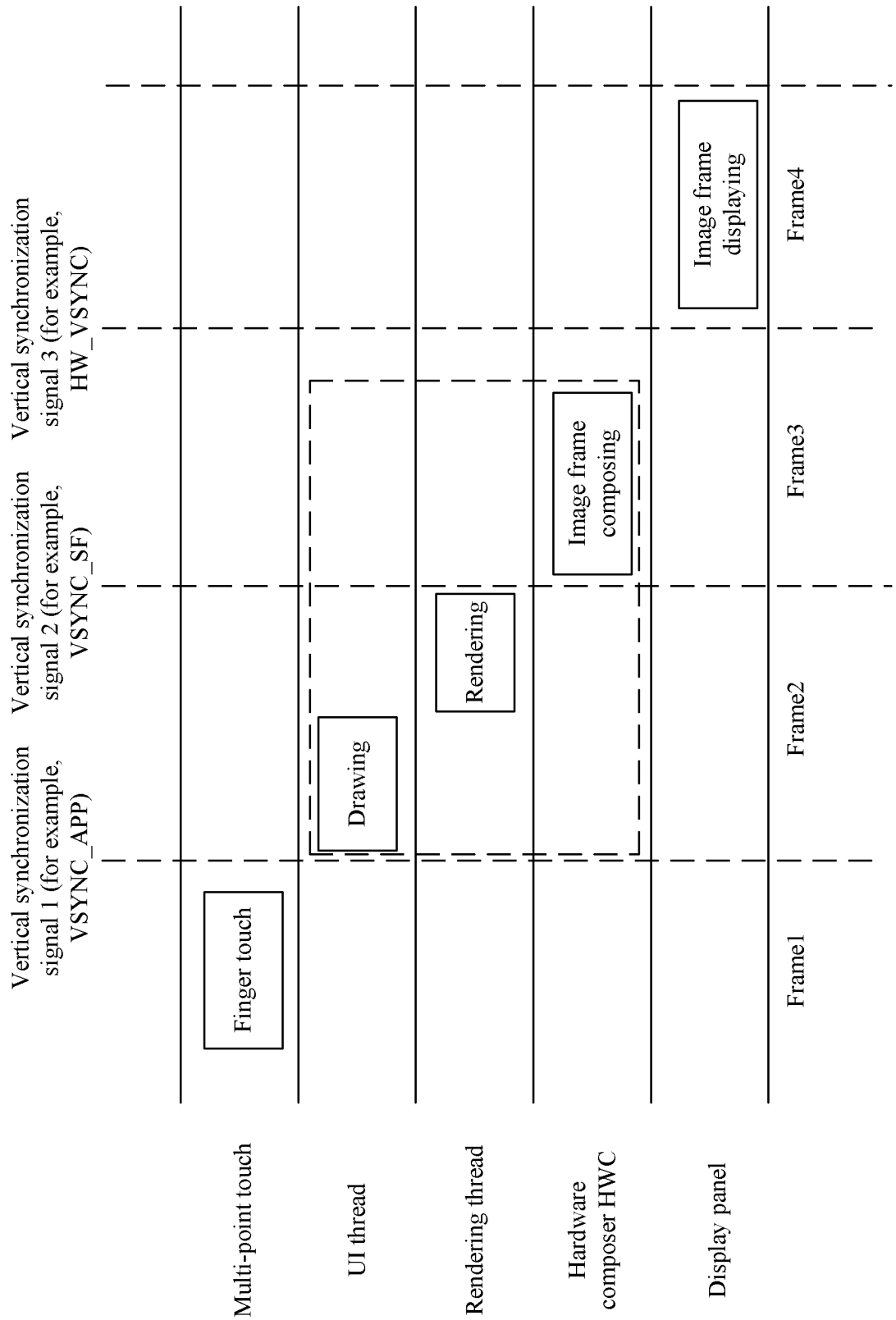
FIG. 3 is a schematic diagram of an image processing procedure according to an embodiment of this application.

With reference to FIG. 1A, in response to a user operation (for example, a touch operation is performed by the user on the TP; as shown in FIG. 3, a finger touches the TP), or when a UI event occurs on the electronic device, the UI framework may invoke the UI thread at a time when the vertical synchronization signal 1 arrives, to draw one or more layers corresponding to the touch event, and then invoke the rendering thread to render the one or more layers. For example, the user operation may alternatively be an operation input by the user by using a mouse, a key, or the like. In response to the user operation input by the user by using the mouse, the key, or the like, the electronic device may also use the method in the embodiments of this application to improve fluency of the electronic device. Then a hardware composer (hardware composer, HWC) may invoke the composing thread at a time when the vertical synchronization signal 2 arrives, to perform layer composing on the drawn one or more layers (that is, the rendered one or more layers) to obtain an image frame. Finally, the hardware display module may refresh and display the image frame on the LCD (that is, the display screen, for example, the display screen 294, where the LCD is used as an example herein) at a time when the vertical synchronization signal 3 arrives. The UI event may be triggered by the touch operation performed by the user on the TP. Alternatively, the UI event may be automatically triggered by the electronic device. For example, the UI event may be triggered when a foreground application of the electronic device automatically switches a picture. The foreground application is an application corresponding to an interface currently displayed on the display screen of the electronic device.

It should be noted that the UI framework periodically performs layer drawing and rendering based on the vertical synchronization signal 1; the hardware composer HWC periodically performs layer composing based on the vertical synchronization signal 2; and the LCD periodically refreshes the image frame based on the vertical synchronization signal 3.

The vertical synchronization signal 3 is a hardware signal actively triggered by the display screen of the electronic device. In the embodiments of this application, a signal period T3 of the vertical synchronization signal 3 (for example, HW_VSYNC) is determined based on a screen refresh rate of the display screen of the electronic device. Specifically, the signal period T3 of the vertical synchronization signal 3 is a reciprocal of the screen refresh rate of the display screen (such as the LCD) of the electronic device.

For example, the screen refresh rate of the display screen of the electronic device may be any value such as 60 hertz (Hz), 70 Hz, 75 Hz, or 80 Hz. Assuming that the screen refresh rate is 60 Hz, the signal period of the vertical synchronization signal 3 is T3=1/60=0.01667 second (s)=16.667 milliseconds (ms). It should be noted that the electronic device may support a plurality of different screen refresh rates. For example, it is assumed that a maximum screen refresh rate supported by the electronic device is 80 Hz. In this case, the electronic device may support a screen refresh rate of 80 Hz, 60 Hz, 40 Hz, or the like. The screen refresh rate in the embodiments of this application is a screen refresh rate currently used by the electronic device. In other words, the signal period T3 of the vertical synchronization signal 3 is a reciprocal of the screen refresh rate currently used by the electronic device.

Figure 5:
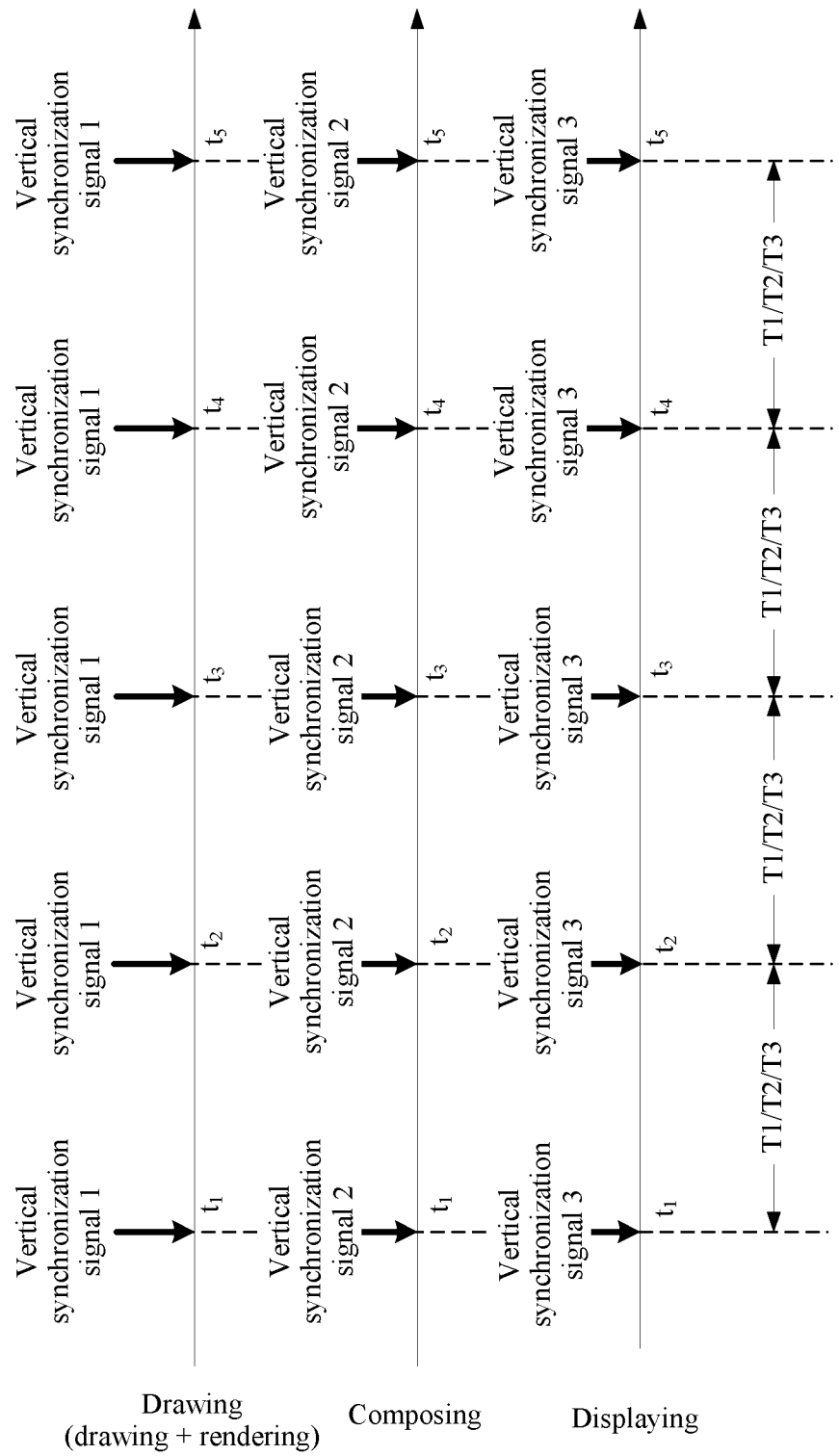
FIG. 5 is a schematic diagram of a vertical synchronization signal used to trigger layer drawing, a vertical synchronization signal used to trigger layer rendering, and a vertical synchronization signal used to trigger layer composing according to an embodiment of this application.

It should be noted that the vertical synchronization signal 3 in the embodiments of this application is a periodic discrete signal. For example, as shown in FIG. 5, at intervals of one signal period (for example, T3), there is one vertical synchronization signal 3 actively triggered by hardware. The vertical synchronization signal 3 that appears for a plurality of times in FIG. 5 sequentially arrives based on the signal period T3 of the vertical synchronization signal 3.

The vertical synchronization signal 1 and the vertical synchronization signal 2 are generated based on the vertical synchronization signal 3. In other words, the vertical synchronization signal 3 may be a signal source of the vertical synchronization signal 1 and the vertical synchronization signal 2. Alternatively, the vertical synchronization signal 1 and the vertical synchronization signal 2 are synchronized with the vertical synchronization signal 3. Therefore, signal periods of the vertical synchronization signal 1 and the vertical synchronization signal 2 are the same as the signal period of the vertical synchronization signal 3, and phases of the signals are consistent. For example, as shown in FIG. 5, the signal period T1 of the vertical synchronization signal 1, the signal period T2 of the vertical synchronization signal 2, and the signal period T3 of the vertical synchronization signal 3 are the same. That is, T1=T2=T3. In addition, as shown in FIG. 5, the phases of the vertical synchronization signal 1, the vertical synchronization signal 2, and the vertical synchronization signal 3 are consistent. It may be understood that, in an actual implementation process, a phase error may exist between the vertical synchronization signal 1, the vertical synchronization signal 2, and the vertical synchronization signal 3 due to various factors (such as processing performance). It should be noted that the phase error is ignored during understanding of the method in the embodiments of this application.

It should be noted that the vertical synchronization signal 1 and the vertical synchronization signal 2 are also periodic discrete signals. For example, as shown in FIG. 5, there is one vertical synchronization signal 1 at intervals of one signal period (such as T1), and there is one vertical synchronization signal 2 at intervals of one signal period (such as T2). In other words, the vertical synchronization signal 1 that appears for a plurality of times in FIG. 5 sequentially arrives based on the signal period T1 of the vertical synchronization signal 1, and the vertical synchronization signal 2 that appears for a plurality of times in FIG. 5 sequentially arrives based on the signal period T2 of the vertical synchronization signal 2. Therefore, the vertical synchronization signal 3, the vertical synchronization signal 1, and the vertical synchronization signal 2 may all be considered as periodic discrete signals.

The vertical synchronization signal 1, the vertical synchronization signal 2, and the vertical synchronization signal 3 are all periodic signals. Therefore, in the embodiments of this application, arrival of the vertical synchronization signal (for example, arrival of the vertical synchronization signal 1) means arrival of a pulse edge of the vertical synchronization signal; and response to the vertical synchronization signal (for example, response to the vertical synchronization signal 1) means response to the pulse edge of the vertical synchronization signal. For example, as shown in FIG. 5, arrival of the vertical synchronization signal 1 at a time $t_1$ means arrival of a pulse edge of the vertical synchronization signal 1 at the time $t_1$; and response to the vertical synchronization signal 1 at the time t1 means response to the pulse edge of the vertical synchronization signal 1 at the time t1.

The pulse edge is a pulse edge visually observed from an oscilloscope or an observation system. In different systems, a rising edge, a falling edge, or both may be included. In an actual system, the pulse edge may be implemented by flipping of a timer, an interrupt signal, or the like.

In the embodiments of this application, the signal periods of the vertical synchronization signal 1, the vertical synchronization signal 2, and the vertical synchronization signal 3 may all be referred to as a synchronization period $T_Z$. That is, $T1=T2=T3=T_Z$. In other words, the synchronization period in the embodiments of this application is the reciprocal of the screen refresh rate of the display screen of the electronic device. All of a frame 1, a frame 2, a frame 3, and a frame 4 shown in FIG. 3 are the foregoing synchronization period. For example, the screen refresh rate of the display screen of the electronic device may be any value such as 60 hertz (Hz), 70 Hz, 75 Hz, or 80 Hz. Assuming that the screen refresh rate may be 60 Hz, the synchronization period $T_Z=1/60=0.01667$ second (s)=16.667 milliseconds (ms), that is, $T1=T2=T3=T_Z=16.667$ ms.

The TP is the touch panel and the TP may be integrated in the display screen 294. The TP is also referred to as a touch sensor, such as the touch sensor 280K described above. The TP may periodically detect a touch operation of the user. After detecting the touch operation, the TP may wake up the vertical synchronization signal 1 and the vertical synchronization signal 2, to trigger the UI framework to perform layer drawing and rendering based on the vertical synchronization signal 1, and trigger the hardware composer HWC to perform layer composing based on the vertical synchronization signal 2. A detection period for detecting the touch operation by the TP is the same as the signal period T3 of the vertical synchronization signal 3 (such as HW_VSYNC).

It may be understood that layer drawing, rendering, and composing performed by the electronic device can be completed only in two synchronization periods, because the drawing thread performs layer drawing based on the vertical synchronization signal 1, and then the rendering thread performs layer rendering, and the composing thread performs layer composing based on the vertical synchronization signal 2 (for example, VSYNC_SF).

For example, as shown in FIG. 3, layer drawing and rendering are completed in the frame 2, while image frame composing is completed in the frame 3. Each of the frame 1, the frame 2, the frame 3, and the frame 4 shown in FIG. 3 corresponds to one synchronization period.

However, in some cases, a duration required by the electronic device for layer drawing, rendering, and composing may be shorter than or equal to one synchronization period. To be specific, in the foregoing two synchronization periods (the frame 2 and the frame 3 shown in FIG. 3), the electronic device may spend only some time in layer drawing, rendering, and composing, but spends other time in waiting for arrival of the vertical synchronization signal 2 and the vertical synchronization signal 3. Therefore, the response latency of the electronic device is unnecessarily prolonged, and fluency (for example, the touch latency) of the electronic device is affected.

In the method provided in the embodiments of this application, when the duration required by the electronic device for layer drawing, rendering, and composing meets a single-frame rendering requirement (for example, the required duration is shorter than or equal to one synchronization period), layer drawing, rendering, and composing are performed in one synchronization period. In this way, the "drawing latency", the "rendering latency", and the "composing latency" shown in FIG. 1B can be shortened, so that the response latency of the electronic device is shortened, and that fluency (for example, the touch latency) of the electronic device is improved. Specifically, the method in the embodiments of this application can increase a possibility that the electronic device completes layer drawing, rendering, and composing in one synchronization period. In other words, a benefit may be shortening the response latency of the electronic device to one synchronization period.

The method for image processing based on vertical synchronization signals according to the embodiments of this application may be performed by an image frame generation apparatus. The image frame generation apparatus may be any one of the foregoing electronic devices (for example, an apparatus for adjusting a phase may be the electronic device 200 shown in FIG. 2). Alternatively, the image frame generation apparatus may be a CPU of the electronic device, or a control module configured to perform the method for image processing based on vertical synchronization signals in the electronic device. In the embodiments of this application, the method for image processing based on vertical synchronization signals according to the embodiments of this application is described by using an example in which the electronic device performs the method for image processing based on vertical synchronization signals.

In the following embodiments, the method in the embodiments of this application is described by using an example in which the first vertical synchronization signal is the vertical synchronization signal 1 (such as the VSYNC_APP signal), the third vertical synchronization signal is the vertical synchronization signal 2 (such as the VSYNC_SF signal), and the second vertical synchronization signal is the vertical synchronization signal 3 (such as the HW_VSYNC signal).

Embodiment 1

Figure 4:
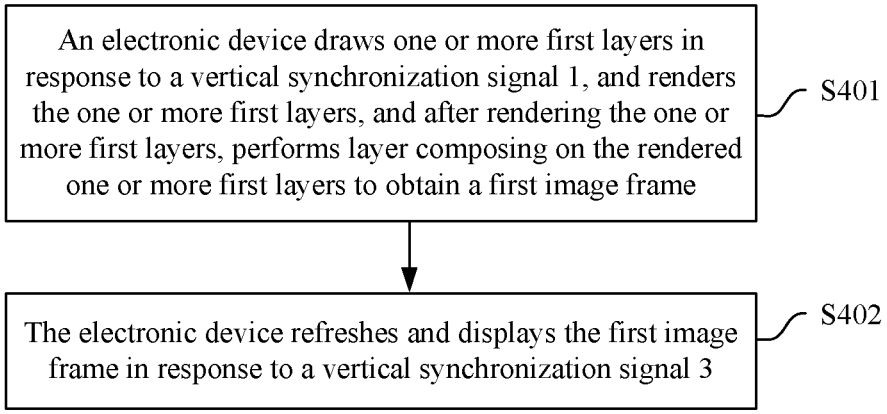
FIG. 4 is a flowchart of a method for image processing based on vertical synchronization signals according to an embodiment of this application.

This embodiment of this application provides a method for image processing based on vertical synchronization signals. As shown in FIG. 4, the method for image processing based on vertical synchronization signals may include S401 and S402.

S401. An electronic device draws one or more first layers in response to a vertical synchronization signal 1, and renders the one or more first layers, and after rendering the one or more first layers, performs layer composing on the rendered one or more first layers to obtain a first image frame.

Generally, a latency time of the vertical synchronization signal 1 relative to a vertical synchronization signal 3 is zero, and their phase difference is zero. For example, as shown in FIG. 5, the latency time of the vertical synchronization signal 1 and a latency time of a vertical synchronization signal 2 relative to the vertical synchronization signal 3 are zero, and their phase differences are zero. On a premise that a signal period T1 of the vertical synchronization signal 1, a signal period T2 of the vertical synchronization signal 2, and a signal period T3 of the vertical synchronization signal 3 are the same (that is, $T1=T3=T_Z$), the latency time of the vertical synchronization signal 1 and the latency time of the vertical synchronization signal 2 relative to the vertical synchronization signal 3 are zero. Specifically, when the vertical synchronization signal 3 arrives, the vertical synchronization signal 1 and the vertical synchronization signal 2 also arrive.

Figure 6A:
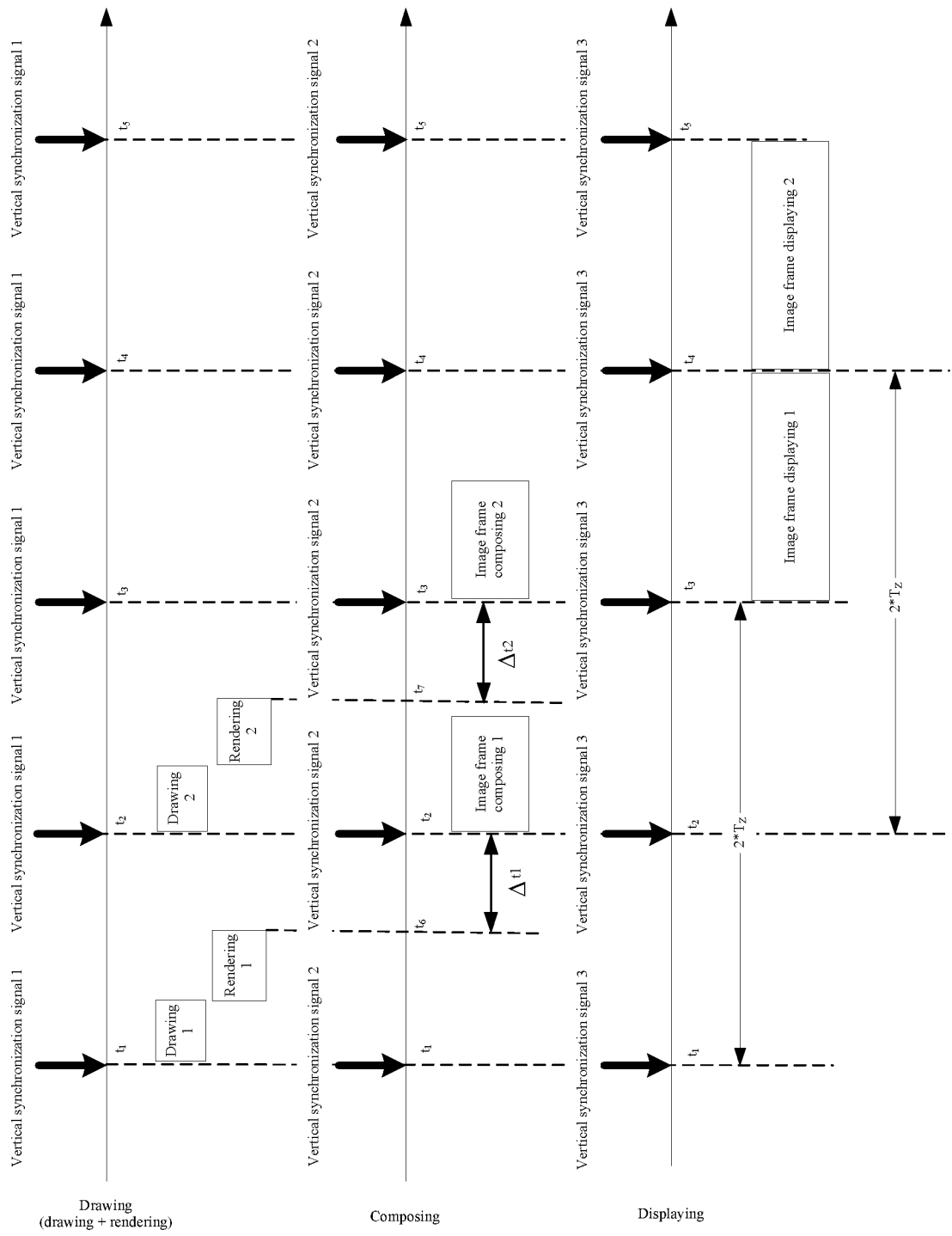
FIG. 6A(a) and FIG. 6A(b) are schematic principle diagrams of a method for image processing based on vertical synchronization signals according to an embodiment of this application.
Figure 6A:
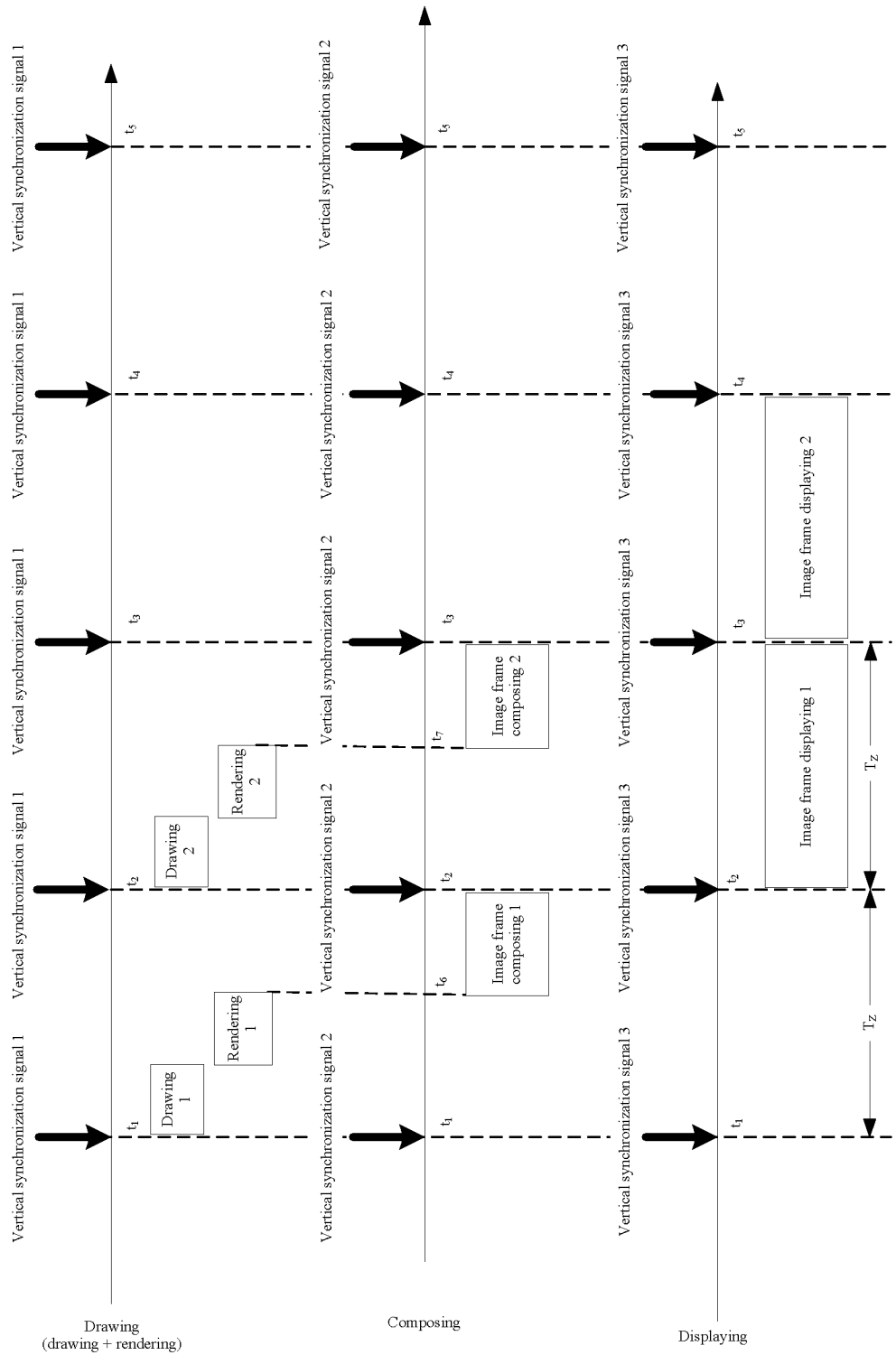

For example, as shown in FIG. 5 or FIG. 6A(a), at a time $t_1$, a vertical synchronization signal 1, a vertical synchronization signal 2, and a vertical synchronization signal 3 arrive simultaneously; at a time $t_2$, a vertical synchronization signal 1, a vertical synchronization signal 2, and a vertical synchronization signal 3 arrive simultaneously; at a time $t_3$, a vertical synchronization signal 1, a vertical synchronization signal 2, and a vertical synchronization signal 3 arrive simultaneously; at a time $t_4$, a vertical synchronization signal 1, a vertical synchronization signal 2, and a vertical synchronization signal 3 arrive simultaneously; and at a time $t_5$, a vertical synchronization signal 1, a vertical synchronization signal 2, and a vertical synchronization signal 3 arrive simultaneously.

For example, as shown in FIG. 6A(a), a vertical synchronization signal 1 arrives at the time $t_1$, and in response to the vertical synchronization signal 1 at the time $t_1$, the electronic device may perform drawing 1 and rendering 1; and at the time $t_2$, a vertical synchronization signal 1 arrives, and in response to the vertical synchronization signal 1 at the time $t_2$, the electronic device may perform drawing 2 and rendering 2.

Generally, the electronic device (that is, an HWC of the electronic device) performs layer composing based on the vertical synchronization signal 2. To be specific, even if the electronic device (that is, a UI thread and a rendering thread of the electronic device) has completed rendering of one or more first layers, if no vertical synchronization signal 2 is detected, the HWC does not perform layer composing on the rendered one or more first layers. The HWC performs layer composing to obtain an image frame only when the time of the vertical synchronization signal 2 arrives.

For example, as shown in FIG. 6A(a), even if the electronic device has completed layer rendering (that is, "rendering 1") at a time $t_6$, the vertical synchronization signal 2 can arrive only at the time $t_2$ after the time $t_6$; and in response to the vertical synchronization signal 2 at the time $t_2$, the electronic device (that is, the HWC of the electronic device) can perform layer composing (that is, perform "image frame composing 1") to obtain the first image frame. In other words, the electronic device can perform "image frame composing 1" only after waiting for $\Delta t_1$ shown in FIG. 6A(a).

For another example, as shown in FIG. 6A(a), even if the electronic device has completed layer rendering (that is, "rendering 2") at a time $t_7$, the vertical synchronization signal 2 can arrive only at the time $t_3$ after the time $t_7$; and in response to the vertical synchronization signal 2 at the time $t_3$, the electronic device (that is, the HWC of the electronic device) can perform layer composing (that is, perform "image frame composing 2") to obtain the first image frame. In other words, the electronic device can perform "image frame composing 2" only after waiting for $\Delta t_2$ shown in FIG. 6A(a).

Therefore, layer drawing, rendering, and composing performed by the electronic device can be completed only in two synchronization periods. For example, as shown in FIG. 6A(a), "drawing 1" and "rendering 1" are completed in a synchronization period from the time $t_1$ to the time $t_2$, while "image frame composing 1" is completed in a synchronization period from the time $t_2$ to the time $t_3$. For another example, as shown in FIG. 6A(a), "drawing 2" and "rendering 2" are completed in a synchronization period from the time $t_2$ to the time $t_3$, while "image frame composing 2" is completed in a synchronization period from the time $t_3$ to the time $t_4$.

However, in this embodiment of this application, the electronic device does not need to wait for the vertical synchronization signal 2; instead, after drawing and rendering the one or more first layers in response to the vertical synchronization signal 1, that is, after rendering of the one or more first layers is completed, the electronic device may start to perform layer composing on the rendered first layers to obtain the first image frame. In other words, the electronic device may perform layer composing on the rendered first layers in advance.

For example, as shown in FIG. 6A(b), the electronic device may perform "drawing 1", "rendering 1", and "image frame composing 1" in response to the vertical synchronization signal 1. As shown in FIG. 6A(b), at the time $t_6$, "drawing 1" and "rendering 1" have been ended. Before the vertical synchronization signal 2 at the time $t_2$ arrives, the electronic device may start to perform layer composing at the time $t_6$, that is, perform "image frame composing 1". In other words, the electronic device may start to perform "image frame composing 1" without waiting for arrival of the vertical synchronization signal 2 at the time $t_2$.

For another example, as shown in FIG. 6A(b), the electronic device may perform "drawing 2", "rendering 2", and "image frame composing 2" in response to the vertical synchronization signal 1. As shown in FIG. 6A(b), at the time $t_7$, "drawing 2" and "rendering 2" have been ended. Before the vertical synchronization signal 2 at the time $t_3$ arrives, the electronic device may start to perform layer composing at the time $t_6$, that is, perform "image frame composing 2". In other words, the electronic device may start to perform "image frame composing 2" without waiting for arrival of the vertical synchronization signal 2 at the time $t_3$.

It should be noted that when the one or more first layers include only one first layer, that the electronic device performs layer composing on the first layer specifically includes: the electronic device converts a format of the first layer, to convert the first layer into the first image frame. When the one or more first layers include a plurality of first layers, that the electronic device performs layer composing on the plurality of first layers specifically includes: the electronic device performs layer composing on the plurality of first layers to obtain the first image frame.

For example, in S401, that the electronic device performs layer composing on the rendered one or more first layers to obtain a first image frame may specifically include: after the rendering thread completes rendering of the one or more first layers, a composing thread may be invoked to perform layer composing on the rendered one or more first layers to obtain the first image frame; or after completing rendering of the one or more first layers, the rendering thread sends an indication message to a composing thread, to trigger the composing thread to perform layer composing on the rendered one or more first layers to obtain the first image frame; or when detecting that the rendering thread completes rendering of the one or more first layers, a composing thread may perform layer composing on the rendered one or more first layers to obtain the first image frame.

It may be understood that, in S401, after completing rendering of the one or more first layers, the electronic device may immediately perform layer composing on the rendered one or more first layers. Alternatively, in S401, after completing rendering of the one or more first layers, the electronic device may perform layer composing on the rendered one or more first layers after a specific latency time. In other words, in an actual implementation process, a latency may exist between layer rendering and layer composing performed by the electronic device.

S402. The electronic device refreshes and displays the first image frame in response to a vertical synchronization signal 3.

As shown in FIG. 6A(b), at the time $t_2$, a vertical synchronization signal 3 arrives; and in response to the vertical synchronization signal 3 at the time $t_2$, the electronic device may refresh and display an image frame (for example, the first image frame) obtained by performing "image frame composing 1", that is, perform "image frame displaying 1". At the time $t_3$, a vertical synchronization signal 3 arrives; and in response to the vertical synchronization signal 3 at the time $t_3$, the electronic device refreshes and displays an image frame obtained by performing "image frame composing 2", that is, performs "image frame displaying 2".

Analysis on a principle and an effect of shortening a response latency of the electronic device in Embodiment (1):

In this embodiment of this application, with reference to FIG. 6A(b), the principle and the effect of shortening the response latency of the electronic device after the electronic device performs S401 are analyzed and described herein.

(1) When a duration required by the electronic device for layer drawing, rendering, and composing is shorter than or equal to one synchronization period (that is, a first case), the principle and the effect of shortening the response latency in this embodiment of this application are described.

The duration required by the electronic device for layer drawing, rendering, and composing may be shorter than or equal to one synchronization period. In this case, the electronic device can complete layer drawing, rendering, and composing in one synchronization period (for example, a first synchronization period) by performing S401.

For example, as shown in FIG. 6A(b), the electronic device completes "drawing 1", "rendering 1", and "image frame composing 1" in the synchronization period from the time $t_1$ to the time $t_2$; and the electronic device completes "drawing 2", "rendering 2", and "image frame composing 2" in the synchronization period from the time $t_2$ to the time $t_3$, as shown in FIG. 6A(b).

By comparing FIG. 6A(b) with FIG. 6A(a), it can be learned that the time of refreshing and displaying the first image frame by the electronic device may be advanced by one synchronization period (for example, the time $t_2$ is one synchronization period $T_Z$ ahead of the time $t_3$) by using the method in this embodiment of this application. In other words, the method in this embodiment of this application can shorten the response latency of the electronic device by one synchronization period, and can improve fluency (such as a touch latency) of the electronic device.

(2) When a duration required by the electronic device for layer drawing, rendering, and composing is longer than one synchronization period (that is, a second case), the principle and the effect of shortening the response latency in this embodiment of this application are described.

The duration required by the electronic device for layer drawing, rendering, and composing or a duration required by the electronic device for layer drawing and rendering may be longer than one synchronization period. In this case, if a conventional solution "performing layer composing in response to a vertical synchronization signal 2" is used, a frame loss phenomenon may occur in a process of refreshing and displaying the image frame. Specifically, in the process of refreshing and displaying the image frame, a display screen may display a repeated image frame. Therefore, fluency of image displaying of the display screen is affected, and visual experience of a user is affected.

Figure 7A:
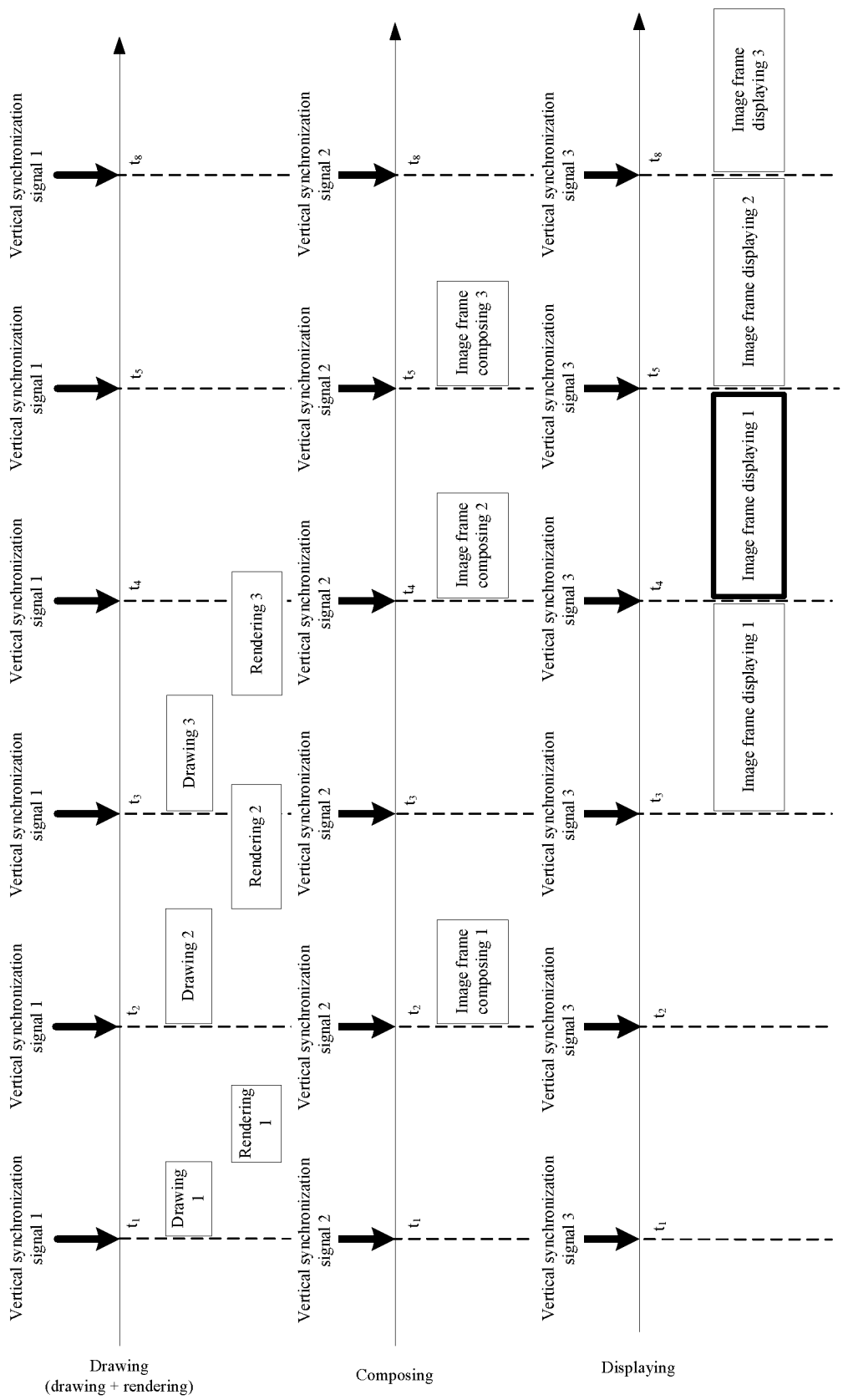
FIG. 7(a) and FIG. 7(b) are schematic principle diagrams of another method for image processing based on vertical synchronization signals according to an embodiment of this application.

For example, as shown in FIG. 7(a), at the time $t_1$, a vertical synchronization signal 1 arrives; and the electronic device performs "drawing 1" and "rendering 1" in response to the vertical synchronization signal 1 at the time $t_1$. At the time $t_2$, a vertical synchronization signal 2 arrives; and the electronic device performs "image frame composing 1" in response to the vertical synchronization signal 2 at the time $t_2$. At the time $t_3$, a vertical synchronization signal 3 arrives; and the electronic device performs "image frame displaying 1" in response to the vertical synchronization signal 3 at the time $t_3$. As shown in FIG. 7(a), at the time $t_2$, a vertical synchronization signal 1 arrives; and the electronic device performs "drawing 2" and "rendering 2" in response to the vertical synchronization signal 1 at the time $t_2$. Because "drawing 2" and "rendering 2" cannot be completed in one synchronization period (for example, the synchronization period from the time $t_2$ to the time $t_3$), that is, because the electronic device has not completed "rendering 2" before a vertical synchronization signal 2 at the time $t_3$ arrives, the electronic device can only wait for arrival of a vertical synchronization signal 2 at the time $t_4$, and perform "image frame composing 2" in response to the vertical synchronization signal 2 at the time $t_4$. Therefore, the electronic device can also only wait for arrival of a vertical synchronization signal 3 at the time $t_5$, and the electronic device performs "image frame displaying 2" in response to the vertical synchronization signal 3 at the time $t_5$.

With reference to the foregoing description, it can be learned from FIG. 7(a) that because "drawing 2" and "rendering 2" cannot be completed in one synchronization period (for example, the synchronization period from the time $t_2$ to the time $t_3$), the electronic device can only wait for arrival of the vertical synchronization signal 2 at the time $t_4$, and perform "image frame composing 2" in response to the vertical synchronization signal 2 at the time $t_4$. Therefore, in a synchronization period from the time $t_4$ to the time $t_5$, a frame loss phenomenon occurs in image displaying of the display screen, that is, the display screen displays a repeated image frame, that is, the display screen continues to perform "image frame displaying 1" from the time $t_4$ to the time $t_5$. An image frame displayed by the display screen from the time $t_4$ to the time $t_5$ and an image frame displayed from the time $t_3$ to the time $t_4$ are the same image frame.

However, the method in this embodiment of this application can avoid a frame loss phenomenon in image displaying, to prevent the display screen from displaying a repeated image frame. In other words, the method in this embodiment of this application can ensure fluency of image displaying of the display screen, thereby improving visual experience of the user.

Figure 7B:
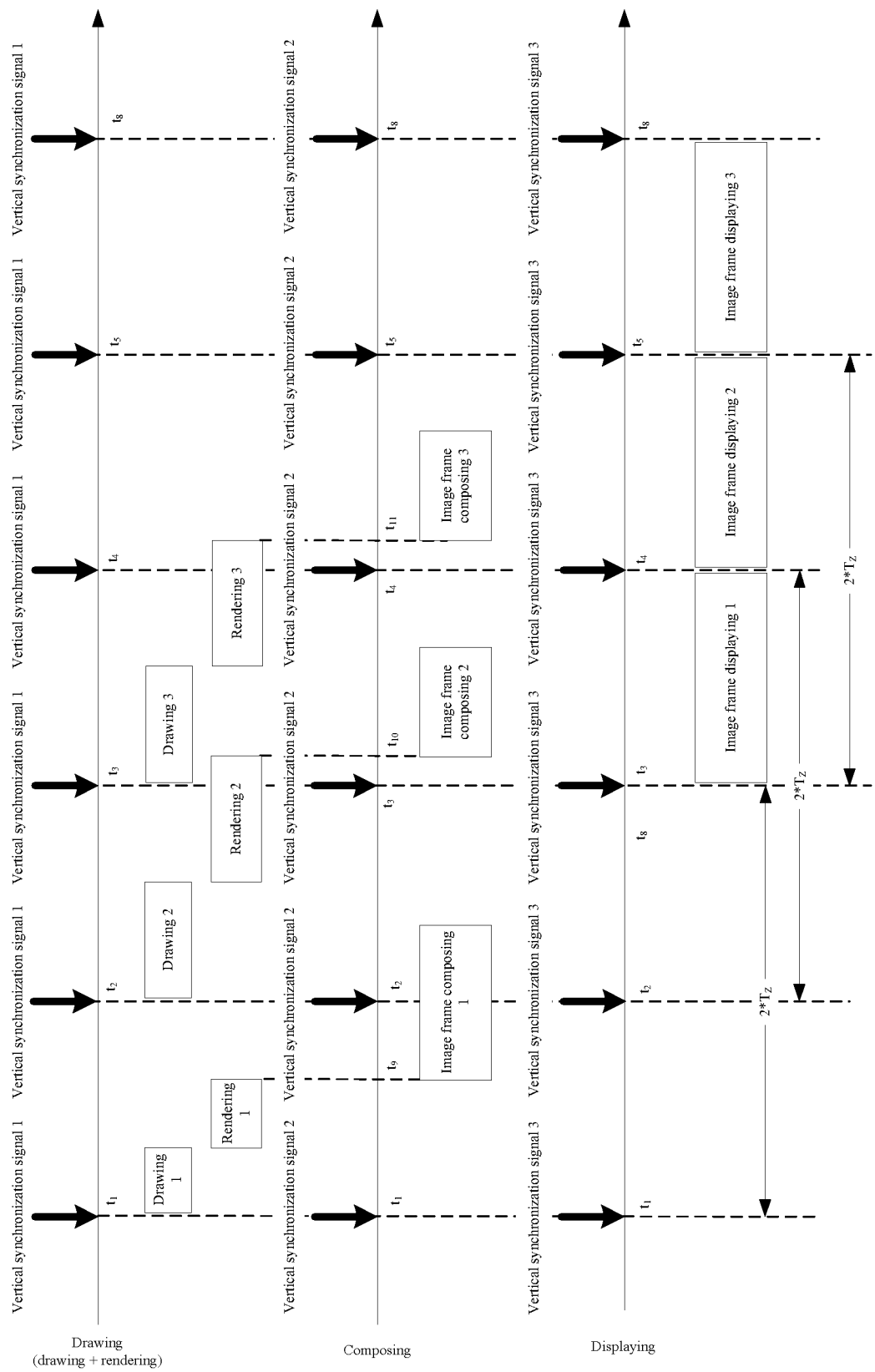

For example, as shown in FIG. 7(b), the electronic device may perform "drawing 1", "rendering 1", and "image frame composing 1" in response to the vertical synchronization signal 1. As shown in FIG. 7(b), at a time $t_9$, "drawing 1" and "rendering 1" have been ended. Before the vertical synchronization signal 2 at the time $t_2$ arrives, the electronic device may start to perform layer composing at the time $t_9$, that is, perform "image frame composing 1". In other words, the electronic device may start to perform "image frame composing 1" without waiting for arrival of the vertical synchronization signal 2 at the time $t_2$.

For another example, as shown in FIG. 7(b), the electronic device may perform "drawing 2", "rendering 2", and "image frame composing 2" in response to the vertical synchronization signal 1. As shown in FIG. 7(b), at a time $t_{10}$, "drawing 2" and "rendering 2" have been ended. Before the vertical synchronization signal 2 at the time $t_4$ arrives, the electronic device may start to perform layer composing at the time $t_{10}$, that is, perform "image frame composing 2". In other words, the electronic device may start to perform "image frame composing 2" without waiting for arrival of the vertical synchronization signal 2 at the time $t_4$.

For another example, as shown in FIG. 7(b), the electronic device may perform "drawing 3", "rendering 3", and "image frame composing 2" in response to the vertical synchronization signal 1. As shown in FIG. 7(b), at a time $t_{11}$, "drawing 3" and "rendering 3" have been ended. Before a vertical synchronization signal 2 at the time $t_5$ arrives, the electronic device may start to perform layer composing at the time $t_{11}$, that is, perform "image frame composing 3". In other words, the electronic device may start to perform "image frame composing 3" without waiting for arrival of the vertical synchronization signal 2 at the time $t_5$.

It can be learned from FIG. 7(b) that the electronic device starts to perform "image frame composing 2" at the time $t_{10}$, and may complete "image frame composing 2" before a vertical synchronization signal 3 at the time $t_4$ arrives. Therefore, after the vertical synchronization signal 3 at the time $t_4$ arrives, the electronic device may perform "image frame displaying 2" in response to the vertical synchronization signal 3 at the time $t_4$. Therefore, a frame loss phenomenon in image displaying of the display screen can be avoided, and fluency of image displaying of the display screen can be ensured, thereby improving visual experience of the user.

It should be noted that, in the second case, the electronic device cannot complete layer drawing, rendering, and composing in one synchronization period. As shown in FIG. 7(b), the electronic device completes "drawing 1", "rendering 1", and "composing 1" only in two synchronization periods from the time $t_1$ to the time $t_3$, and completes "drawing 2", "rendering 2", and "composing 2" only in two synchronization periods from the time $t_2$ to the time $t_4$. However, a frame loss phenomenon in image displaying of the display screen can be avoided, and fluency of image displaying of the display screen can be ensured, thereby improving visual experience of the user. In addition, the electronic device performs layer composing in advance, and a possibility that the electronic device completes layer drawing, rendering, and composing in one synchronization period can be increased.

Embodiment 2

In this embodiment of this application, a principle of performing the foregoing method by the electronic device for one or more applications is described.

The one or more layers may include a layer drawn by the electronic device by performing a drawing task corresponding to one or more applications. The one or more applications may include at least one of one or more system-level applications and one or more user-level applications. For example, the system-level application may include a status bar, a launcher, a navigation bar, and a wallpaper. The user-level application may include a system application of the electronic device such as "settings", "phone", and "SMS", and a third-party application that the electronic device can download from an application store in response to a user operation. For example, the third-party application may include an application such as WeChat, Alipay, or Baidu Map. The drawing task described in this embodiment of this application includes "layer drawing" and "layer rendering".

Correspondingly, S401 may specifically include S401a and S401b. S401a. The electronic device draws one or more first layers for each of the one or more applications in response to the vertical synchronization signal 1, and renders the one or more first layers. S401b. The electronic device performs layer composing on the one or more first layers rendered by the electronic device for the one or more applications, to obtain the first image frame.

It should be noted that, in this embodiment of this application, the electronic device may perform layer composing on the layer rendered by the electronic device for the one or more applications, to obtain an image frame. Alternatively, the electronic device may separately perform layer composing on a layer rendered by the electronic device for each application, to obtain a plurality of image frames. This embodiment of this application (for example, S401b) is described by using an example in which the electronic device performs layer composing on the layer rendered by the electronic device for the one or more applications, to obtain an image frame.

The following uses two application scenarios to describe a principle of performing, by the electronic device for the one or more applications, the method in this embodiment of this application to perform layer drawing, rendering, and composing, and image frame displaying.

In an application scenario (1), the one or more applications may include only one application. The electronic device may perform a drawing task corresponding to the application, to draw (that is, draw and render) one or more layers. In other words, the electronic device may perform S401a for the application, to draw and render one or more corresponding layers. Then the electronic device may perform S401b to perform layer composing on the one or more layers rendered for the application.

For example, assuming that the application is an application 1, the electronic device may perform S401a to draw and render one or more layers 1 for the application 1; and then the electronic device may perform S401b to perform layer composing on the one or more layers 1 rendered for the application 1, to obtain an image frame 1.

For example, as shown in FIG. 6A(b), in response to the vertical synchronization signal 1 at the time $t_1$, the electronic device may perform "drawing 1" and "rendering 1" to obtain one or more rendered layers 1; and then perform layer composing on the rendered one or more layers 1, that is, perform "image frame composing 1" to obtain an image frame 1. In response to the vertical synchronization signal 3 at the time $t_2$, the electronic device may perform "image frame displaying 1" to refresh and display the image frame 1.

In an application scenario (2), the one or more applications may include a plurality of applications. The electronic device may perform a drawing task corresponding to each of the plurality of applications, and separately draw (that is, draw and render) one or more layers for each of the plurality of applications. To be specific, the electronic device may separately perform S401a for each of the plurality of applications, to draw and render one or more corresponding layers. Then the electronic device may perform S401b to perform layer composing on the one or more layers rendered for each of the plurality of applications. In other words, the rendered one or more layers in S401b may include the layer obtained by the electronic device by performing the drawing task corresponding to the plurality of applications.

For example, assuming that the plurality of applications are two applications (including an application 1 and an application a), the electronic device may perform drawing and rendering for the application 1 to obtain one or more layers 1, and perform drawing and rendering for the application a to obtain one or more layers a. Then the electronic device may perform layer composing on the one or more layers 1 and the one or more layers a to obtain an image frame a.

Figure 6B:
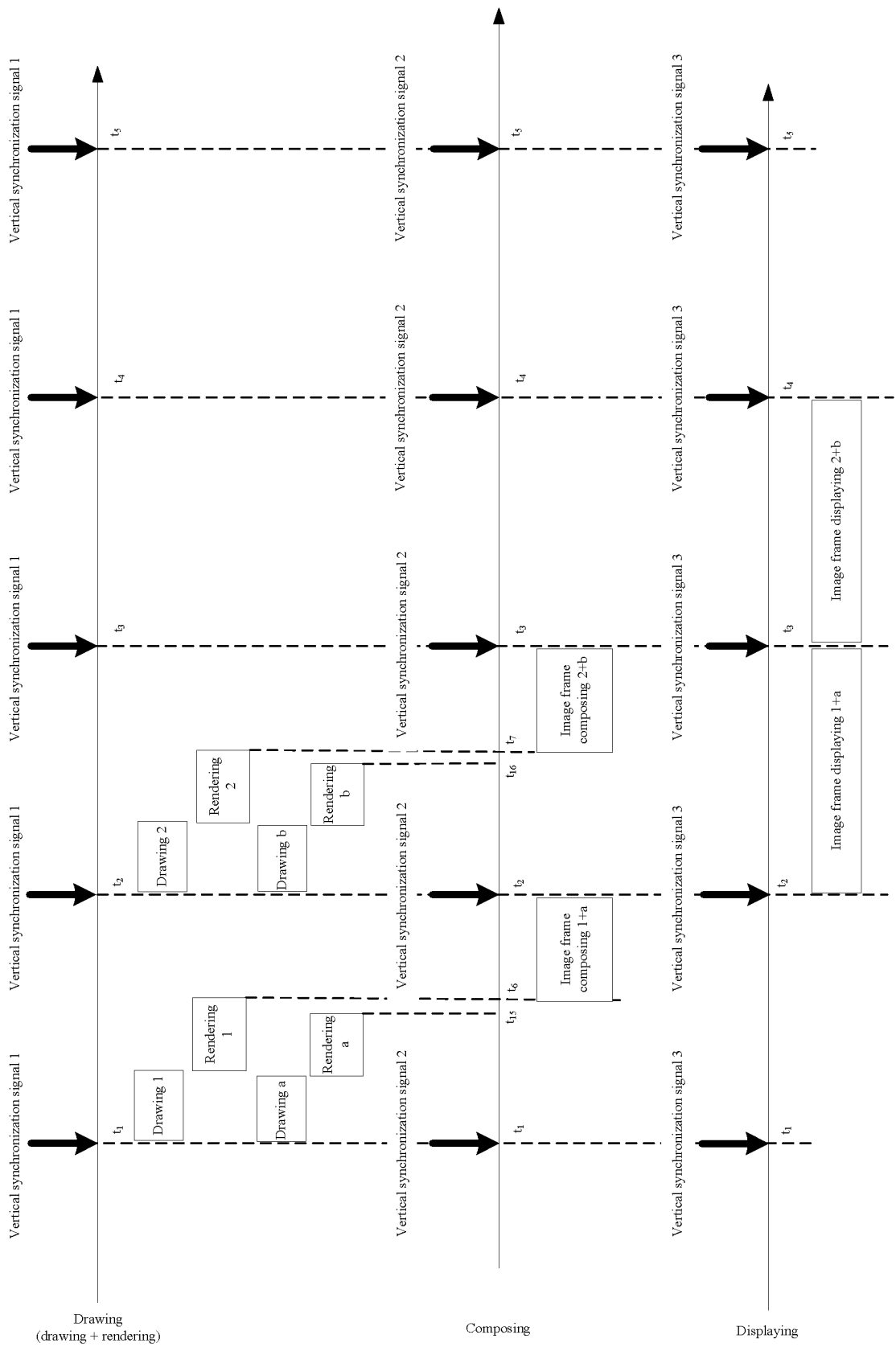
FIG. 6B is a schematic principle diagram of another method for image processing based on vertical synchronization signals according to an embodiment of this application.

For example, as shown in FIG. 6B, in response to the vertical synchronization signal 1 at the time $t_1$, the electronic device may perform "drawing 1" and "rendering 1" for the application 1 to obtain the one or more layers 1, and perform "drawing a" and "rendering a" for the application a to obtain the one or more layers a; then the electronic device may perform "image frame composing 1+a" on the one or more layers 1 and the one or more layers a to obtain the image frame a; and in response to the vertical synchronization signal 3 at the time $t_2$, the electronic device may perform "image frame displaying 1+a" to refresh and display the image frame a. For another example, as shown in FIG. 6B, in response to the vertical synchronization signal 1 at the time $t_2$, the electronic device may perform "drawing 2" and "rendering 2" for the application 1 to obtain one or more layers 2, and perform "drawing b" and "rendering b" for the application a to obtain one or more layers b; then the electronic device may perform "image frame composing 2+b" on the one or more layers 2 and the one or more layers b to obtain an image frame b; and in response to the vertical synchronization signal 3 at the time $t_3$, the electronic device may perform "image frame displaying 2+b" to refresh and display the image frame b.

It should be noted that "image frame composing 1+a" and "image frame composing 2+b" shown in FIG. 6B both represent one time of layer composing. When the electronic device performs "image frame displaying 1+a" or "image frame displaying 2+b", one image frame is also refreshed and displayed.

It can be learned from the foregoing description that the method in this embodiment of this application may be applied not only to a scenario in which the electronic device displays an interface of one application by using a single window, but also to a scenario in which the electronic device displays interfaces of a plurality of applications by using a plurality of windows. For example, the method in this embodiment of this application may be applied to a scenario in which the electronic device displays a plurality of windows in a landscape mode, or may be applied to a scenario in which the electronic device displays a plurality of application interfaces in a plurality of windows on a foldable screen. A method for displaying, by the electronic device, an interface of an application by using a single window or a plurality of windows is not described herein in this embodiment of this application.

It should be noted that this embodiment of this application is described by using an example in which the electronic device performs the method in this embodiment of this application for one application. However, it does not mean that in the method provided in this embodiment of this application, the electronic device cannot simultaneously perform layer drawing, rendering, composing, and image frame displaying for a plurality of applications.

Embodiment 3

In this embodiment, for the foregoing application scenario (2), that is, a scenario of a plurality of applications, a specific method for performing S401b by the electronic device is described.

In a case (1), the electronic device may perform layer composing on the rendered layers when layer rendering for all of the plurality of applications is ended, to obtain the first image frame.

For example, as shown in FIG. 6B, in response to the vertical synchronization signal 1 at the time $t_1$, the electronic device may perform "drawing 1" and "rendering 1" for the application 1, to obtain the one or more layers 1, and perform "drawing a" and "rendering a" for the application a, to obtain the one or more layers a. As shown in FIG. 6B, the electronic device completes "rendering a" at a time $t_{15}$, and completes "rendering 1" at a time $t_6$. In the case (1), even if the electronic device has completed "rendering a" at the time $t_{15}$, because the electronic device has not completed "rendering 1", the electronic device does not start to perform layer composing (that is, "image frame composing 1+a") at the time $t_{15}$. As shown in FIG. 6B, the electronic device has completed "rendering a" and "rendering 1" at the time $t_6$. Therefore, the electronic device may perform "image frame composing 1+a" to obtain the image frame a. In response to the vertical synchronization signal 3 at the time $t_2$, the electronic device may perform "image frame displaying 1+a", that is, refreshing and displaying the image frame a.

Likewise, the electronic device has completed "rendering b" and "rendering 2" at the time $t_7$ after a time $t_{16}$. Therefore, the electronic device may perform "image frame composing 2+b" to obtain the image frame b. In response to the vertical synchronization signal 3 at the time $t_3$, the electronic device may perform "image frame displaying 2+b", that is, refreshing and displaying the image frame b.

In a case (2), the electronic device may perform layer composing on the rendered layers when layer rendering for a part of the plurality of applications is ended, to obtain the first image frame.

In the case (2), the foregoing S401b may be replaced with: when rendering one or more first layers of a focus application, a key application, or an application closely related to fluency of the electronic device in the one or more applications is ended, performing layer composing on the one or more first layers rendered by the electronic device for the one or more applications, to obtain the first image frame. The focus application is an application corresponding to a user touch operation received by the electronic device, that is, an application on which an actual focus is focused.

Figure 6C:
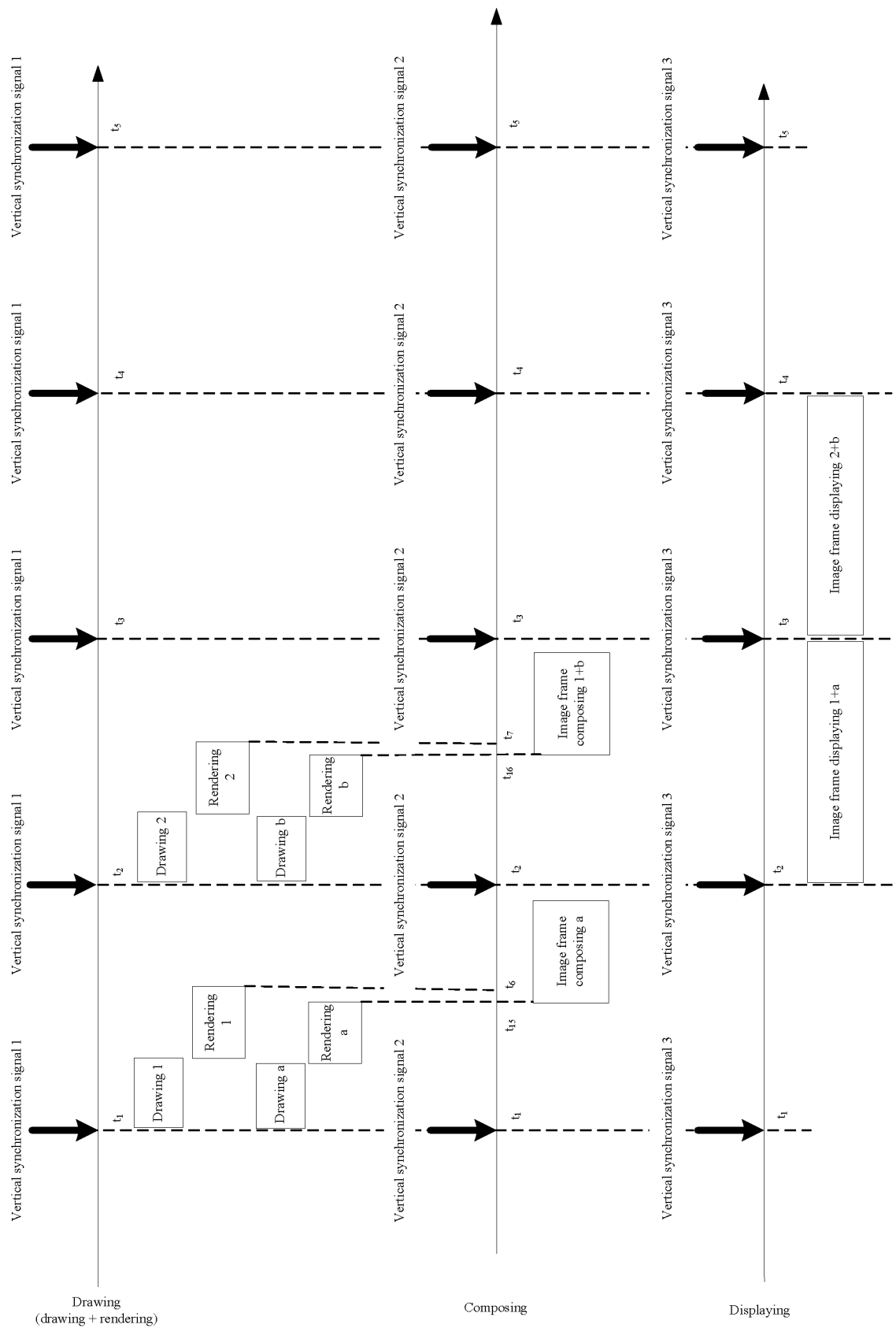
FIG. 6C is a schematic principle diagram of another method for image processing based on vertical synchronization signals according to an embodiment of this application.

For example, the focus application is used as an example. With reference to the foregoing example, it is assumed that the application a is the focus application. As shown in FIG. 6C, the electronic device completes "rendering a" for the application a at the time $t_{15}$, and completes "rendering 1" for the application 1 at the time $t_6$. In the case (2), although the electronic device has not completed "rendering 1" at the time $t_{15}$, the electronic device has completed "rendering a" for the focus application a at the time $t_{15}$. Therefore, the electronic device may perform layer composing (that is, perform "image frame composing a") at the time $t_{15}$. For another example, as shown in FIG. 6C, the electronic device completes "rendering b" for the application a at the time $t_{16}$, and completes "rendering 2" for the application 1 at the time $t_6$. In the case (2), although the electronic device has not completed "rendering 2" at the time $t_{16}$, the electronic device has completed "rendering b" for the focus application a at the time $t_{16}$. Therefore, the electronic device may perform layer composing (that is, perform "image frame composing 1+b") at the time $t_{16}$.

It may be understood that, because the application a is the focus application, the user pays more attention to an interface change of the application a. In other words, the user pays more attention to impact of the interface change of the focus application a on fluency of the electronic device. In the foregoing example, the electronic device performs "image frame composing a" at the time $t_{15}$, and performs "image frame composing 1+b" at the time $t_{16}$. The interface change of the focus application a may also be reflected on an interface. Therefore, visual experience of the user on fluency of the electronic device can be improved.

In a case (3), the electronic device may perform layer composing on the rendered layers when rendering of preset layers of a part of the plurality of applications is ended, to obtain the first image frame.

For example, when rendering of preset layers of an application such as the focus application or the application closely related to fluency of the electronic device is ended, the electronic device may perform layer composing on one or more first layers rendered by the electronic device, to obtain the first image frame. The preset layer may be a layer with a ratio of a layer area to an area of the display screen being greater than a preset ratio threshold, in the one or more first layers drawn by the electronic device for the application such as the focus application or the application closely related to fluency of the electronic device. Alternatively, the preset layer may be a layer corresponding to a user touch operation received by the electronic device, that is, a layer on which an actual focus is focused, in the one or more first layers drawn by the electronic device for the application such as the focus application, the key application, or the application closely related to fluency of the electronic device. Alternatively, the preset layer may be a layer closely related to fluency of the electronic device, in the one or more first layers drawn by the electronic device for the application such as the focus application, the key application, or the application closely related to fluency of the electronic device.

Figure 6D:
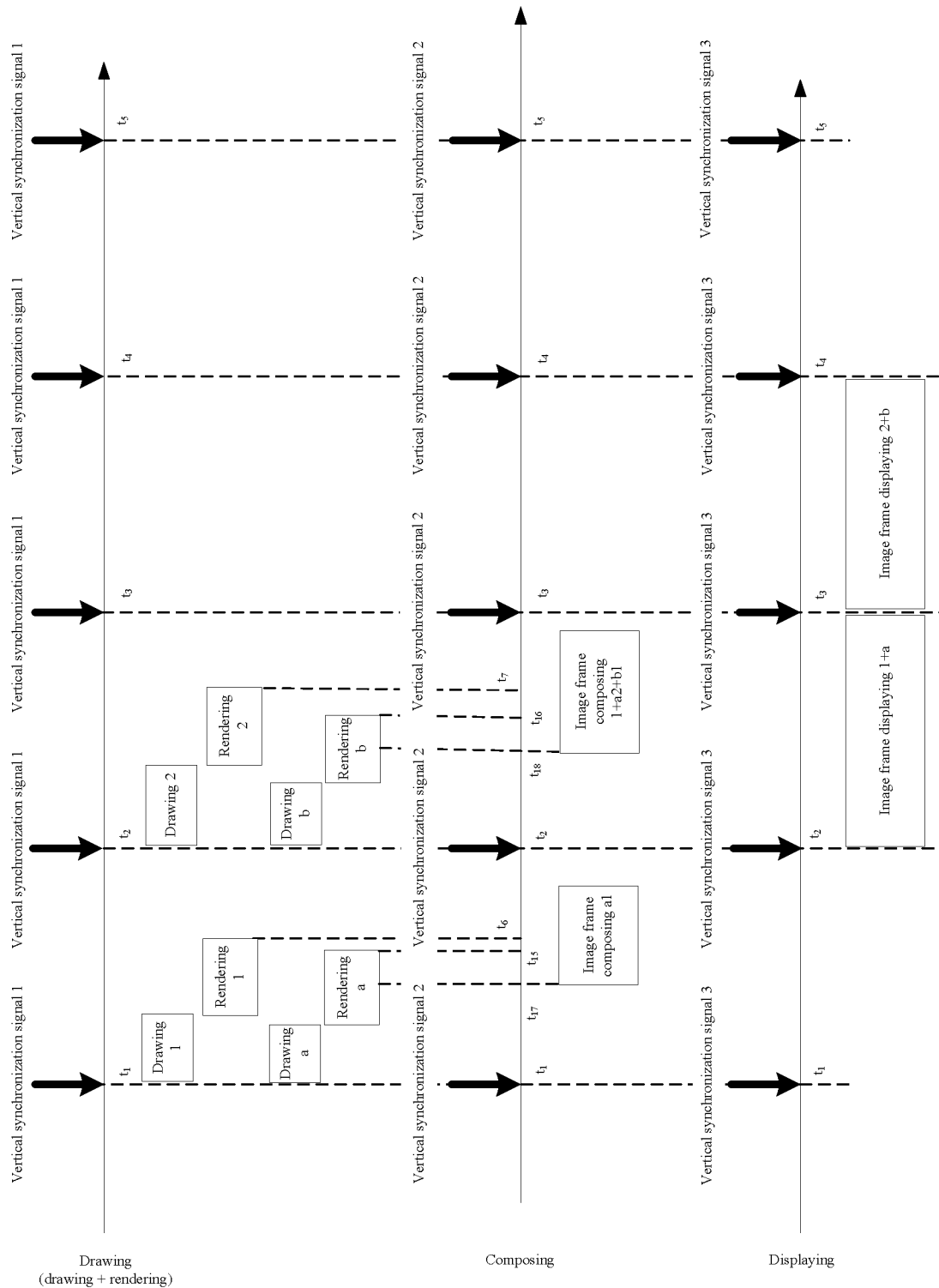
FIG. 6D is a schematic principle diagram of another method for image processing based on vertical synchronization signals according to an embodiment of this application.

For example, the preset layer of the focus application is used as an example. With reference to the foregoing example, it is assumed that the application a is the focus application. As shown in FIG. 6D, the electronic device completes "rendering a" for the application a at the time $t_{15}$, and completes "rendering 1" for the application 1 at the time $t_6$. The electronic device has completed rendering of the preset layer in "rendering a" at a time $t_{17}$ before the time $t_{15}$. "Rendering a" may include "rendering a1" and "rendering a2". "Rendering a1" is rendering of the preset layer in "rendering a". Therefore, as shown in FIG. 6D, the electronic device may perform layer composing at the time $t_{17}$ (that is, perform "image frame composing a1"), that is, perform layer composing on the preset layer rendered by "rendering a1". For another example, as shown in FIG. 6C, the electronic device completes "rendering b" for the application a at the time $t_{16}$, and completes "rendering 2" for the application 1 at the time $t_6$. The electronic device has completed rendering of the preset layer in "rendering b" at a time $t_{18}$ before the time $t_{16}$. "Rendering b" may include "rendering b1" and "rendering b2". "Rendering b1" is rendering of the preset layer in "rendering b". Therefore, the electronic device may perform layer composing at the time $t_{18}$ (that is, perform "image frame composing 1+a2+b1"), that is, perform layer composing on the preset layer rendered by "rendering 1", "rendering a2", and "rendering b1".

It may be understood that, because the application a is the focus application, the user pays more attention to an interface change of the application a. The interface change of the focus application a is mainly reflected in a change of the preset layer. In other words, the user pays more attention to impact of the change of the preset layer of the focus application a on fluency of the electronic device. In the foregoing example, the electronic device performs "image frame composing a1" at the time $t_{17}$, and performs "image frame composing 1+a2+b1" at the time $t_{18}$. The change of the preset layer of the focus application a may also be reflected on an interface. Therefore, visual experience of the user on fluency of the electronic device can be improved.

It should be noted that, in this embodiment of this application, criticality of the application or the layer or impact on fluency of the electronic device may be obtained through recognition and comparison by measuring and recognizing (for example, in a laboratory) or applying (for example, during development) preset priority information, or may be obtained by analyzing and predicting user behavior, a focus of attention, or the like. In this embodiment of this application, a specific method for determining criticality of the application by the electronic device and impact of the application on fluency of the electronic device is not limited herein.

Embodiment 4

With reference to Embodiment (1), in this embodiment, the electronic device may further perform positive scheduling on a hardware resource of the electronic device to shorten the duration required by the electronic device for layer drawing, rendering, and composing. Specifically, the electronic device may perform one or more of the following hardware resource scheduling to shorten the duration required by the electronic device for layer drawing, layer rendering, and/or layer composing. The positive scheduling may include: increasing a working frequency of a processor of the electronic device, selecting a large-core processor to perform the method, and increasing a working frequency of a memory of the electronic device. The processor may include a CPU and/or a GPU.

It may be understood that if the working frequency of the processor is higher, a computing speed of the processor is higher, and the duration required by the electronic device for layer drawing, rendering, and composing is shorter. In addition, a computing speed of a large-core processor is higher than a computing speed of a small-core processor. If the working frequency of the memory of the electronic device is higher, a read/write speed of the electronic device is higher, and the duration required by the electronic device for layer drawing, rendering, and composing is shorter. To shorten the duration required by the electronic device for layer drawing, rendering, and composing and shorten the response latency of the electronic device, the electronic device may perform positive scheduling on the hardware resource of the electronic device.

The positive scheduling performed on the hardware resource of the electronic device by the electronic device can shorten the duration required by the electronic device for layer drawing, rendering, and composing. Therefore, a possibility that the electronic device completes layer drawing, rendering, and composing in one synchronization period can be increased, the response latency of the electronic device can be shortened, and the electronic device can perform positive scheduling on the hardware resource of the electronic device.

In an implementation, the electronic device may perform positive scheduling on the hardware resource of the electronic device based on a first frame processing duration, to shorten the duration required by the electronic device for layer drawing, layer rendering, and/or layer composing. If the first frame processing duration is longer, a range of positive scheduling performed by the electronic device on the hardware resource of the electronic device is larger. For example, assuming that the electronic device increases the working frequency of the processor, if the first frame processing duration is longer, the electronic device adjusts the working frequency of the processor to a higher frequency when adjusting the working frequency of the processor.

In another implementation, the electronic device may perform positive scheduling on the hardware resource of the electronic device based on a quantity of times or a probability of completing layer drawing, layer rendering, and layer composing by the electronic device in one synchronization period in a first measurement period, to shorten the duration required by the electronic device for layer drawing, layer rendering, and/or layer composing. The probability is a ratio of the quantity of times of completing layer drawing, layer rendering, and layer composing by the electronic device in one synchronization period in the first measurement period to a total quantity of times.

If the quantity of times of completing layer drawing, layer rendering, and layer composing by the electronic device in one synchronization period in the first measurement period is smaller, or the probability is lower, the range of positive scheduling performed by the electronic device on the hardware resource of the electronic device is larger. For example, assuming that the electronic device increases the working frequency of the processor, if the quantity of times of completing layer drawing, layer rendering, and layer composing by the electronic device in one synchronization period in the first measurement period is smaller, or the probability is lower, the electronic device adjusts the working frequency of the processor to a higher frequency when adjusting the working frequency of the processor.

In another implementation, the electronic device may perform positive scheduling on the hardware resource of the electronic device based on a foreground application of the electronic device, to shorten the duration required by the electronic device for layer drawing, layer rendering, and/or layer composing. The foreground application may be an application corresponding to an interface currently displayed on the display screen of the electronic device.

It may be understood that a plurality of applications may be installed in the electronic device. When the electronic device runs different applications in the foreground, different time is required for layer drawing, rendering, and composing. When the electronic device runs one foreground application, if the time required for layer drawing, rendering, and composing is longer, the range of positive scheduling performed by the electronic device on the hardware resource of the electronic device is larger. In this embodiment of this application, a manner or policy used to perform positive scheduling on the hardware resource may be set for each application.

For example, assuming that the electronic device increases the working frequency of the processor, when the electronic device runs the foreground application, if the duration required for layer drawing, rendering, and composing is longer, the electronic device adjusts the working frequency of the processor to a higher frequency when adjusting the working frequency of the processor.

In another implementation, the electronic device may store model code of a preset artificial intelligence (artificial intelligence, AI) model. The preset AI model is an AI model having a function of performing positive scheduling on the hardware resource of the electronic device based on 'the first frame processing duration', 'the quantity of times or the probability of completing layer drawing, layer rendering, and layer composing by the electronic device in one synchronization period in the first measurement period', or 'the foreground application of the electronic device', to increase a possibility of single-frame rendering and composing. The preset AI model is obtained by performing sample training for a plurality of times based on 'the first frame processing duration', 'the quantity of times or the probability of completing layer drawing, layer rendering, and layer composing by the electronic device in one synchronization period in the first measurement period', or 'the foreground application of the electronic device'. The single-frame rendering and composing mean that the electronic device completes layer drawing, rendering, and composing in one synchronous period.

The electronic device may run the model code of the preset AI model, and perform positive scheduling on the hardware resource of the electronic device based on 'the first frame processing duration', 'the quantity of times or the probability of completing layer drawing, layer rendering, and layer composing by the electronic device in one synchronization period in the first measurement period', or 'the foreground application of the electronic device', to shorten the duration required by the electronic device for layer drawing, rendering, and composing. Therefore, a possibility that the electronic device completes layer drawing, rendering, and composing in one synchronization period can be increased, the response latency of the electronic device can be shortened, and the electronic device can perform positive scheduling on the hardware resource of the electronic device.

It should be noted that, for a specific method for performing positive scheduling by the electronic device on the hardware resource of the electronic device, refer to related descriptions in the following embodiments. Details are not described herein in this embodiment of this application.

Figure 8A:
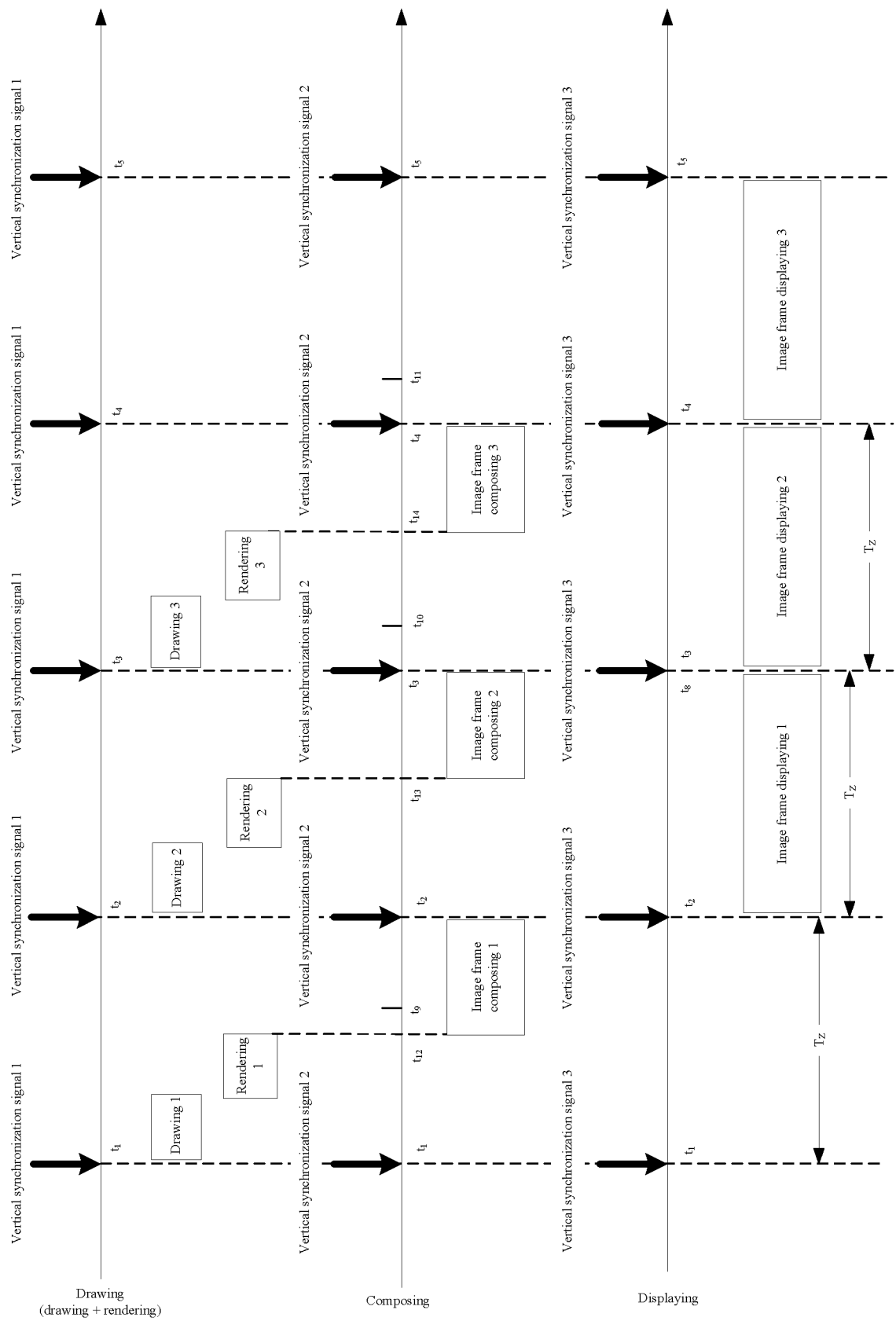
FIG. 8A is a schematic principle diagram of another method for image processing based on vertical synchronization signals according to an embodiment of this application.

In this embodiment of this application, an effect of positive scheduling performed by the electronic device on the hardware resource of the electronic device to shorten the response latency is described. For example, FIG. 7(b) is a schematic diagram of a time sequence in which the electronic device performs image processing based on vertical synchronization signals before performing positive scheduling on the hardware resource of the electronic device. FIG. 8A is a schematic diagram of a time sequence in which the electronic device performs image processing based on vertical synchronization signals after performing positive scheduling on the hardware resource of the electronic device. By comparing FIG. 7(b) with FIG. 8A, the following can be concluded:

The electronic device starts to perform "drawing 1" and "rendering 1" at the time $t_1$ shown in FIG. 7(b), and completes "rendering 1" at the time $t_9$. The electronic device starts to perform "drawing 1" and "rendering 1" at the time $t_1$ shown in FIG. 8A, and completes "rendering 1" at a time $t_{12}$ before the time $t_9$. In other words, a duration required by the electronic device for "drawing 1" and "rendering 1" shown in FIG. 8A is shorter than a duration required by the electronic device for "drawing 1" and "rendering 1" shown in FIG. 7(b). A duration required by the electronic device for "image frame composing 1" shown in FIG. 8A is shorter than a duration required by the electronic device for "image frame composing 1" shown in FIG. 7(b).

The electronic device starts to perform "drawing 2" and "rendering 2" at the time $t_2$ shown in FIG. 7(b), and completes "rendering 2" at the time $t_{10}$. The electronic device starts to perform "drawing 2" and "rendering 2" at the time $t_2$ shown in FIG. 8A, and completes "rendering 2" at a time $t_{13}$ before the time $t_{10}$. In other words, a duration required by the electronic device for "drawing 2" and "rendering 2" shown in FIG. 8A is shorter than a duration required by the electronic device for "drawing 2" and "rendering 2" shown in FIG. 7(b). A duration required by the electronic device for "image frame composing 2" shown in FIG. 8A is shorter than a duration required by the electronic device for "image frame composing 2" shown in FIG. 7(b).

The electronic device starts to perform "drawing 3" and "rendering 3" at the time $t_3$ shown in FIG. 7(b), and completes "rendering 3" at the time $t_{11}$. The electronic device starts to perform "drawing 3" and "rendering 3" at the time $t_3$ shown in FIG. 8A, and completes "rendering 3" at a time $t_{14}$ before the time $t_{11}$. In other words, a duration required by the electronic device for "drawing 3" and "rendering 3" shown in FIG. 8A is shorter than a duration required by the electronic device for "drawing 3" and "rendering 3" shown in FIG. 7(b). A duration required by the electronic device for "image frame composing 3" shown in FIG. 8A is shorter than a duration required by the electronic device for "image frame composing 3" shown in FIG. 7(b).

In conclusion, the electronic device can shorten the duration required by the electronic device for layer drawing, rendering, and composing. Therefore, a possibility that the electronic device completes layer drawing, rendering, and composing in one synchronization period can be increased. For example, as shown in FIG. 8A, the electronic device may complete "drawing 1", "rendering 1", and "image frame composing 1" in the synchronization period (that is, $T_Z$) from the time $t_1$ to the time $t_2$, complete "drawing 2", "rendering 2", and "image frame composing 2" in the synchronization period (that is, $T_Z$) from the time $t_2$ to the time $t_3$, and complete "drawing 3", "rendering 3", and "image frame composing 3" in the synchronization period (that is, $T_Z$) from the time $t_3$ to the time $t_4$.

Embodiment 5

In this embodiment, a specific condition for performing scheduling (for example, positive scheduling or negative scheduling) by the electronic device on the hardware resource of the electronic device is described. To be specific, the electronic device may schedule the hardware resource of the electronic device under the following conditions:

(1) The electronic device performs positive scheduling on the hardware resource of the electronic device when the first frame processing duration in the first measurement period is longer than a preset single-frame duration.

In this embodiment of this application, the preset single-frame duration is shorter than or equal to the synchronization period $T_Z$. For example, the preset single-frame duration may be a difference between the synchronization period $T_Z$ and a preset latency threshold. The preset latency threshold is greater than or equal to 0 ms. For example, the preset latency threshold may be 0 ms, 1 ms, 2 ms, 1.5 ms, or 3 ms. For example, it is assumed that the synchronization period $T_Z$=16.667 ms and that the preset latency threshold is 1 ms. The preset single-frame duration may be 15.667 ms.

If the first frame processing duration in the first measurement period (that is, a measurement period before a current time) is longer than the preset single-frame duration, it indicates that the electronic device cannot complete layer drawing, rendering, and composing in one synchronization period in the first measurement period. Therefore, the electronic device may perform positive scheduling on the hardware resource of the electronic device, to shorten the duration required by the electronic device for layer drawing, rendering, and composing, and increase a possibility that the electronic device completes layer drawing, rendering, and composing in one synchronization period.

(2) After performing positive scheduling on the hardware resource of the electronic device, the electronic device may perform negative scheduling on the hardware resource of the electronic device when a screen refresh rate of the electronic device is greater than a preset refresh rate threshold, to reduce power consumption of the electronic device while avoiding a frame loss phenomenon in image displaying of the display screen and ensuring fluency of image displaying of the display screen.

In this embodiment of this application, when the screen refresh rate of the electronic device is greater than the preset refresh rate threshold, it may be said that the electronic device is at a high refresh rate. For example, the preset refresh rate threshold may be 80 Hz, 90 Hz, or 85 Hz.

Generally, if the electronic device is at a high screen refresh rate, to match the high screen refresh rate, the electronic device may perform positive scheduling on the hardware resource of the electronic device by default, to increase a frame rate of the electronic device, avoid a frame loss phenomenon in image displaying of the display screen, and ensure fluency of image displaying of the display screen. However, when the screen refresh rate is high, performing positive scheduling on the hardware resource of the electronic device greatly increases power consumption of the electronic device.

In this embodiment of this application, after the electronic device performs positive scheduling on the hardware resource of the electronic device, when the electronic device is at a high screen refresh rate, with reference to the solution that the electronic device performs layer drawing, rendering, and composing in response to the vertical synchronization signal 1, the electronic device does not need to perform positive scheduling on the hardware resource greatly, or the electronic device does not need to perform positive scheduling on the hardware resource. As long as the electronic device can complete layer drawing, rendering, and composing in two synchronization periods, a frame loss phenomenon in image displaying of the display screen can be avoided, and fluency of image displaying of the display screen can be ensured. In this case, the electronic device may perform negative scheduling on the hardware resource, to reduce load of the electronic device while avoiding a frame loss phenomenon in image displaying of the display screen and ensuring fluency of image displaying of the display screen.

For example, the negative scheduling may include: decreasing the working frequency of the processor of the electronic device, selecting a small-core processor to perform the method, and decreasing the working frequency of the memory of the electronic device. The processor may include a CPU and/or a GPU.

In conclusion, the electronic device may perform negative scheduling on the hardware resource when the screen refresh rate of the electronic device is greater than the preset refresh rate threshold. Therefore, for a display system with a high screen refresh rate, not only a frame loss phenomenon in image displaying of the display screen can be avoided, but also fluency of image displaying of the display screen can be ensured. In addition, a threshold for performing hardware resource scheduling by the electronic device can be reduced, so that a frame rate matching a high screen refresh rate is provided while fewer hardware resources are required, and that the user is provided with user experience without a frame loss at the high screen refresh rate.

Further, after the electronic device performs positive scheduling on the hardware resource of the electronic device, when the screen refresh rate of the electronic device is greater than the preset refresh rate threshold, the electronic device may perform negative scheduling on the hardware resource of the electronic device if the first frame processing duration is longer than a preset dual-frame duration, to reduce power consumption of the electronic device while avoiding a frame loss phenomenon in image displaying of the display screen and ensuring fluency of image displaying of the display screen.

The preset dual-frame duration is longer than the preset single-frame duration. For example, the preset dual-frame duration may be longer than the preset single-frame duration, and shorter than or equal to K times the signal period (that is, the foregoing synchronization period) of the vertical synchronization signal 3. K is greater than or equal to 2. For example, K may be 2 or 2.5. For example, assuming K=2, when the preset single-frame duration is 11.1 ms, the preset dual-frame duration may be 22.2 ms.

It may be understood that if the first frame processing duration is longer than the preset dual-frame duration, it indicates that the electronic device cannot complete layer drawing, rendering, and composing in two synchronization periods. In this case, the frame loss phenomenon shown in FIG. 7(a) may occur. To avoid a frame loss phenomenon in image displaying of the display screen and ensure fluency of image displaying of the display screen, the electronic device may perform negative scheduling on the hardware resource of the electronic device, to increase a possibility that the electronic device completes layer drawing, rendering, and composing in two synchronization periods.

Embodiment 6

Figure 8B:
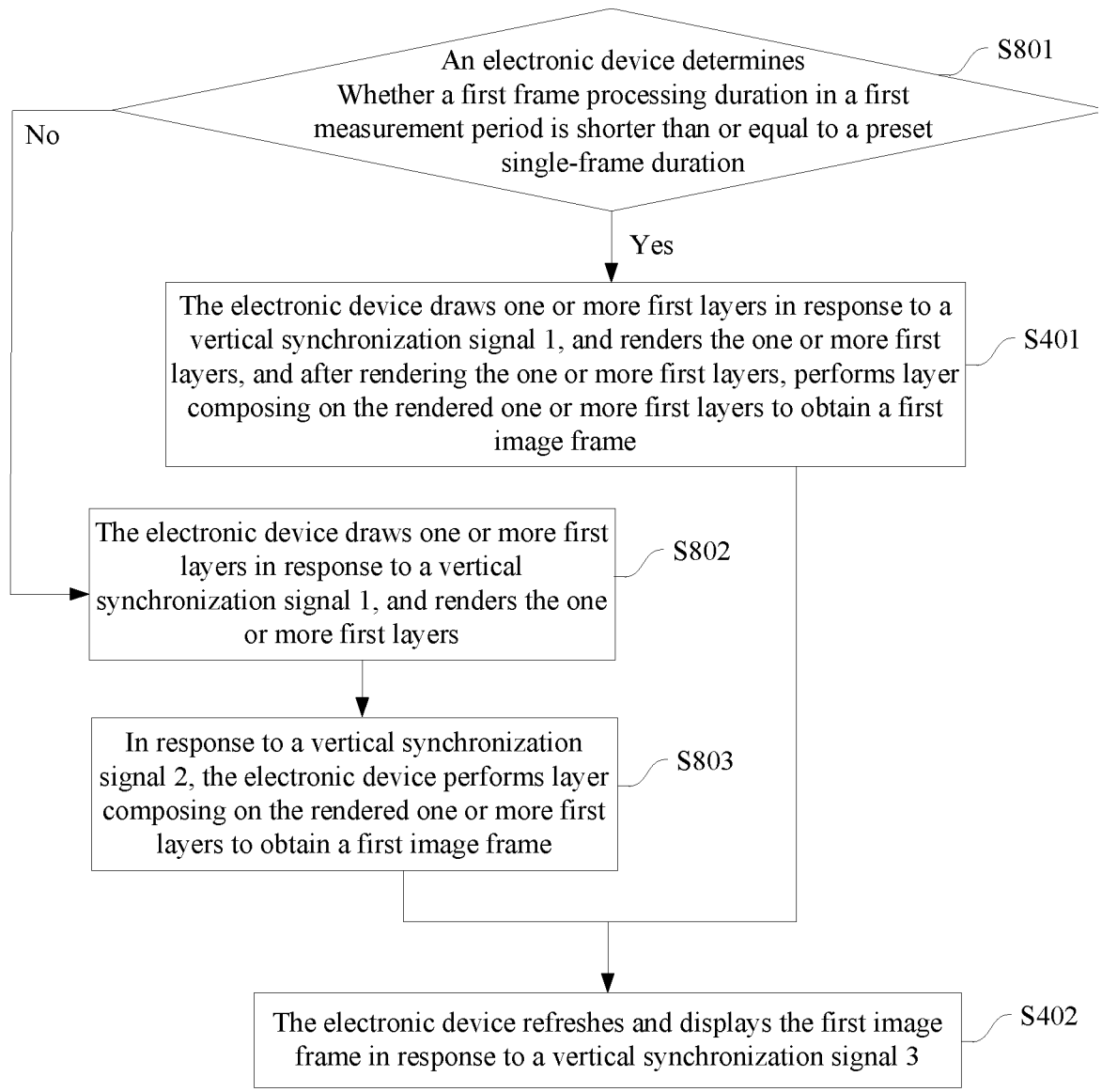
FIG. 8B is a flowchart of another method for image processing based on vertical synchronization signals according to an embodiment of this application.

In comparison with Embodiment (1), in this embodiment, before performing S401, the electronic device may first predict whether the duration required by the electronic device for layer drawing, rendering, and composing is shorter than or equal to the preset single-frame duration (the preset single-frame duration is shorter than the foregoing synchronization period). If the predicted time is shorter than or equal to the preset single-frame duration, it indicates that there is a relatively high possibility that the electronic device completes layer drawing, rendering, and composing in one synchronization period. The electronic device performs S401 and S402 only in this case. Specifically, as shown in FIG. 8B, before S401 shown in FIG. 4, this embodiment of this application may further include S801 to S803.

S801. The electronic device determines whether the first frame processing duration in the first measurement period is shorter than or equal to the preset single-frame duration.

The first frame processing duration is a sum of a first frame rendering duration and a first SF frame duration. The first frame rendering duration is a duration required for drawing the layer and rendering the drawn layer. The first SF frame duration is a duration required for performing layer composing on the rendered layer.

For example, the electronic device may determine the first frame processing duration in the following implementation (i) and implementation (ii).

Implementation (i): The electronic device determines the first frame processing duration based on a first frame rendering duration corresponding to the focus application in the one or more applications and a first SF frame duration corresponding to the one or more applications by the electronic device. The focus application is an application corresponding to a user touch operation received by the electronic device. The first frame rendering duration is a duration required for drawing the layer and rendering the drawn layer.

For example, it is assumed that the one or more applications include an application a, an application b, and an application c, where the application a is the focus application. A first frame rendering duration a of the application a is a duration required by the electronic device to draw a layer for the application a and render the drawn layer. A first frame rendering duration b of the application b is a duration required by the electronic device to draw a layer for the application b and render the drawn layer. A first frame rendering duration c of the application c is a duration required by the electronic device to draw a layer for the application c and render the drawn layer. A first SF frame duration x is a duration required by the electronic device to perform layer composing on the layer rendered for the application a, the layer rendered for the application b, and the layer rendered for the application c.

The electronic device may determine the first frame processing duration based on the first frame rendering duration a and the first SF frame duration x of the focus application a. For example, the first frame processing duration is a sum of the first frame rendering duration a and the first SF frame duration x.

Implementation (ii): The electronic device determines the first frame processing duration based on a longest first frame rendering duration among first frame rendering durations corresponding to all of the one or more applications and a first SF frame duration corresponding to the one or more applications by the electronic device.

With reference to the foregoing example, assuming First frame rendering duration b>First frame rendering duration a>First frame rendering duration c, the electronic device may determine the first frame processing duration based on the first frame rendering duration b and the first SF frame duration x. For example, the first frame processing duration is a sum of the first frame rendering duration b and the first SF frame duration x.

For example, the electronic device may periodically measure the first frame processing duration in each measurement period. The first measurement period is the measurement period before the current time or an earlier measurement period. For example, the measurement period in this embodiment of this application may be any duration of 1 s, 2 s, 3 s, or 5 s. For example, the electronic device may perform S801a and S801b to obtain the first frame processing duration in the first measurement period.

S801a. The electronic device obtains one or more second frame processing durations in the first measurement period, where each second frame processing duration is a sum of a second frame rendering duration and a second SF frame duration.

The electronic device may measure a duration (that is, the second frame rendering duration) required for layer drawing and rendering each time in the first measurement period, and a duration (that is, the second SF frame duration) required for layer composing on a rendered image, and calculate the sum of the second frame rendering duration and the corresponding second SF frame duration, to obtain a total duration (that is, the second frame processing duration) required for layer drawing, rendering, and composing each time.

For example, it is assumed that the electronic device performs layer drawing, rendering, and composing for three times in the first measurement period. A duration required by the electronic device for drawing a layer a and rendering the layer a is a second frame rendering duration a; and a duration required by the electronic device for layer composing on the rendered layer a is a second SF frame duration a. A duration required by the electronic device for drawing a layer b and rendering the layer b is a second frame rendering duration b; and a duration required by the electronic device for layer composing on the rendered layer b is a second SF frame duration b. A duration required by the electronic device for drawing a layer c and rendering the layer c is a second frame rendering duration c; and a duration required by the electronic device for layer composing on the rendered layer c is a second SF frame duration c. The electronic device may calculate a sum of the second frame rendering duration a and the second SF frame duration a to obtain a second frame processing duration a; calculate a sum of the second frame rendering duration b and the second SF frame duration b to obtain a second frame processing duration b; and calculate a sum of the second frame rendering duration c and the second SF frame duration c to obtain a second frame processing duration c. In this way, the electronic device can obtain three second frame processing durations in the first measurement period.

S801b. The electronic device determines the first frame processing duration in the first measurement period based on the one or more second frame processing durations.

In an implementation, the one or more second frame processing durations include only one second frame processing duration. In this implementation, the first frame processing duration is equal to the second frame processing duration.

In an implementation, the one or more second frame processing durations may include a plurality of second frame processing durations. The first frame processing duration is an average value of the plurality of second frame processing durations. With reference to the foregoing example, the first frame processing duration in the first measurement period may be an average value of the second frame processing duration a, the second frame processing duration b, and the second frame processing duration c.

In another implementation, the one or more second frame processing durations may include a plurality of second frame processing durations. The first frame processing duration is a longest second frame processing duration among the plurality of second frame processing durations. With reference to the foregoing example, the first frame processing duration in the first measurement period may be a longest one of the second frame processing duration a, the second frame processing duration b, and the second frame processing duration c.

It may be understood that if the first frame processing duration in the first measurement period (that is, the measurement period before the current time) is shorter than or equal to the preset single-frame duration, it indicates that the electronic device can complete layer drawing, rendering, and composing in one synchronization period in the first measurement period. In this case, in a measurement period (that is, a measurement period in which the current time is located) next to the first measurement period, there is a relatively high possibility that the electronic device completes layer drawing, rendering, and composing in one synchronization period. In this case, the electronic device may perform S401.

It should be noted that, in this embodiment of this application, that the electronic device performs layer drawing, rendering, and composing in one synchronization period may specifically include: the electronic device draws one or more first layers in the first synchronization period in response to a vertical synchronization signal 1, and renders the one or more first layers, and after rendering the one or more first layers, performs layer composing on the rendered one or more first layers to obtain the first image frame. The first synchronization period is a synchronization period corresponding to the vertical synchronization signal 1. For example, the first synchronization period may be the synchronization period $T_Z$ from the time $t_1$ to the time $t_2$ shown in FIG. 6A(b). In other words, in this embodiment of this application, the electronic device may start layer composing in one synchronization period (that is, the first synchronization period) in which layer drawing and rendering are performed.

If the first frame processing duration in the first measurement period (that is, the measurement period before the current time) is longer than the preset single-frame duration, it indicates that the electronic device cannot complete layer drawing, rendering, and composing in one synchronization period in the first measurement period. In this case, in the measurement period (that is, the measurement period in which the current time is located) next to the first measurement period, there is a relatively low possibility that the electronic device completes layer drawing, rendering, and composing in one synchronization period. In this case, the electronic device may perform S802 and S803.

S802. The electronic device draws one or more first layers in response to a vertical synchronization signal 1, and renders the one or more first layers.

S803. In response to a vertical synchronization signal 2, the electronic device performs layer composing on the rendered one or more first layers to obtain the first image frame.

Specifically, in response to the vertical synchronization signal 2, the electronic device may perform layer composing on the rendered first layer to obtain the first image frame in a second synchronization period. The second synchronization period is different from the first synchronization period. For example, as shown in FIG. 6A(a), the first synchronization period may be the synchronization period $T_Z$ from the time $t_1$ to the time $t_2$. The second synchronization period may be the synchronization period $T_Z$ from the time $t_2$ to the time $t_3$.

For example, if the first frame processing duration in the first measurement period is longer than the preset single-frame duration, as shown in FIG. 6A(a), the electronic device does not perform layer composing (that is, image frame composing) at the time $t_6$, but performs layer composing in response to the vertical synchronization signal 2 at the time $t_2$ after the vertical synchronization signal 2 at the time $t_2$ arrives.

In this embodiment of this application, the electronic device may draw and render the one or more first layers in response to the vertical synchronization signal 1 only when it is predicted that the duration required by the electronic device for layer drawing, rendering, and composing is shorter than or equal to the preset single-frame duration; and after rendering the one or more first layers, the electronic device may perform layer composing on the rendered one or more first layers to obtain the first image frame. Therefore, a possibility of a phenomenon that layer composing can only be performed in advance but the response latency of the electronic device cannot be shortened in the second case can be reduced.

Embodiment 7

In this embodiment, a condition for performing the method for image processing by the electronic device based on vertical synchronization signals in any one of the foregoing embodiments is described. Specifically, a condition or circumstance under which the electronic device can perform the foregoing method may be described in this embodiment.

Figure 9:
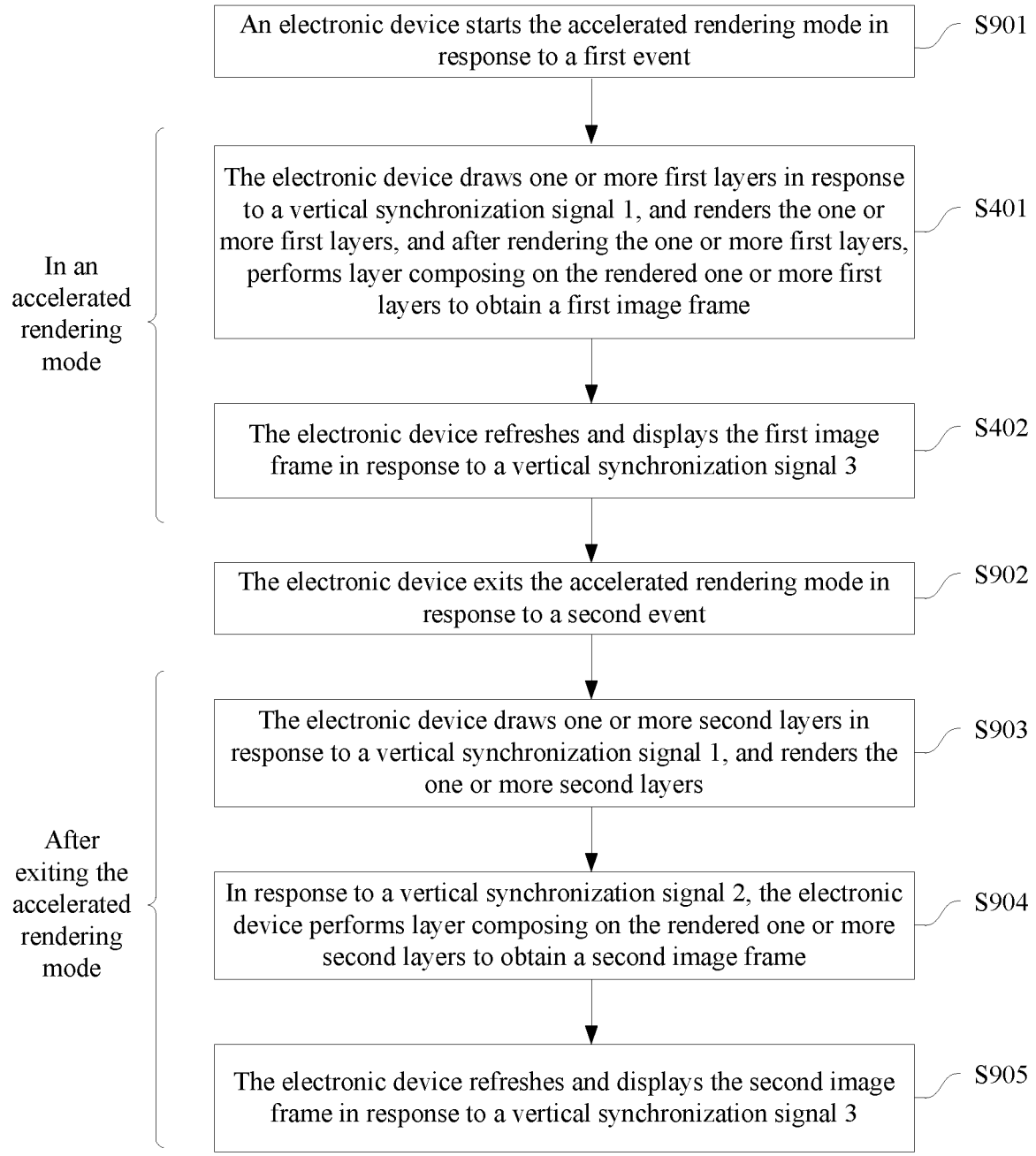
FIG. 9 is a flowchart of another method for image processing based on vertical synchronization signals according to an embodiment of this application.

The electronic device may perform the method in this embodiment of this application in an accelerated rendering mode, for example, S401 and S402, and related steps thereof. Specifically, before S401, the method in this embodiment of this application may further include S901. For example, as shown in FIG. 9, before S401 shown in FIG. 4, the method in this embodiment of this application may further include S901.

S901. The electronic device starts the accelerated rendering mode in response to a first event.

After starting the accelerated rendering mode, and before a first vertical synchronization signal 2 after rendering of the one or more first layers is ended arrives, the electronic device may start to perform layer composing on the rendered layer to obtain an image frame.

For example, in this embodiment of this application, the first event is illustrated herein by using the following two implementations: an implementation (I) and an implementation (II).

In the implementation (I), the first event may be that the electronic device receives a first operation of the user. The first operation is used to trigger the electronic device to start the accelerated rendering mode.

Figure 10A:
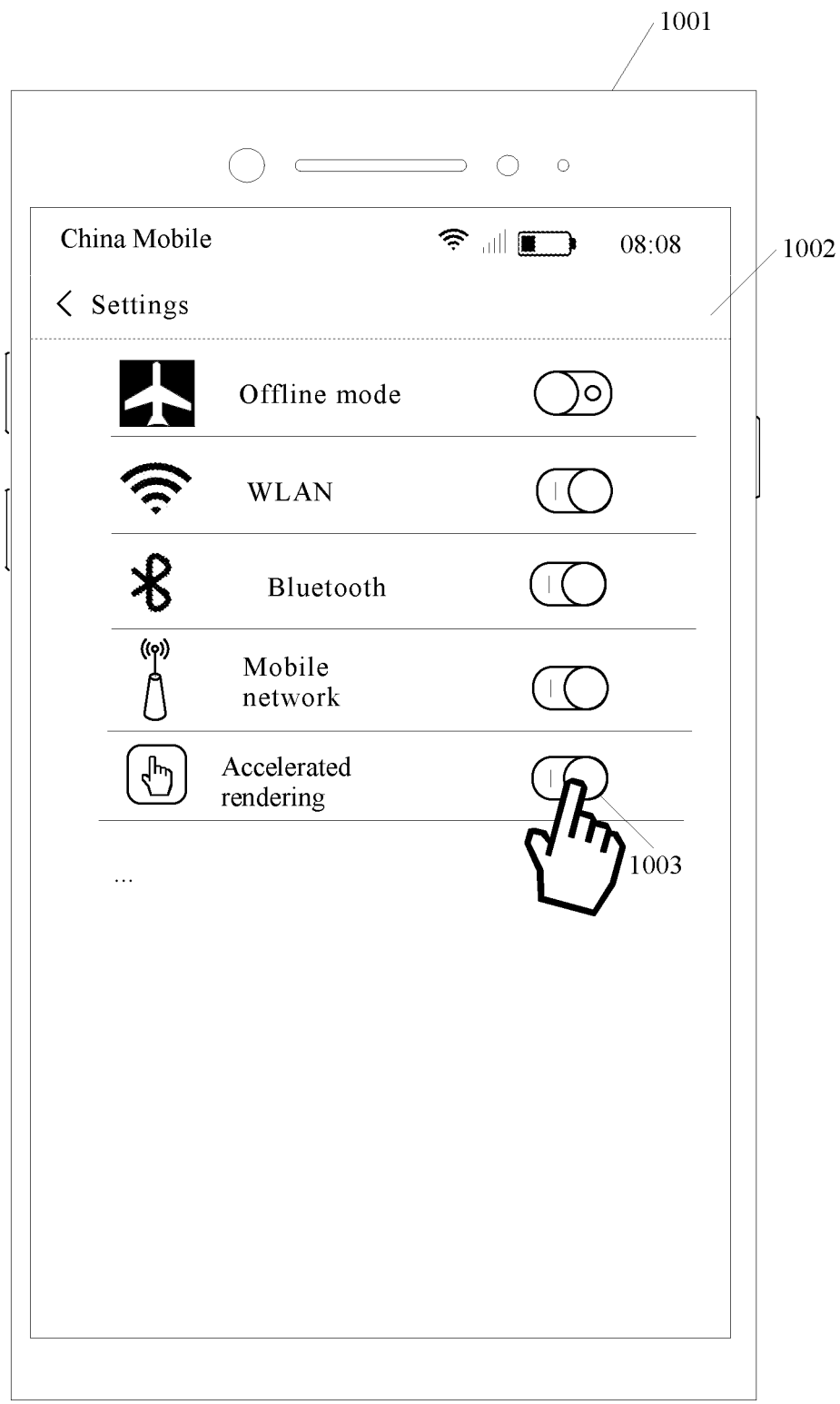
FIG. 10(a) and FIG. 10(b) are schematic diagrams of a display interface according to an embodiment of this application.

For example, the electronic device is a mobile phone 1001. As shown in FIG. 10(a), the first operation may be a tapping operation performed by the user on an "accelerated rendering" option 1003 on a settings interface 1002 displayed by the mobile phone 1001. The first operation is used to enable the "accelerated rendering" option 1003, to trigger the mobile phone 1001 to start the accelerated rendering mode.

Figure 10B:
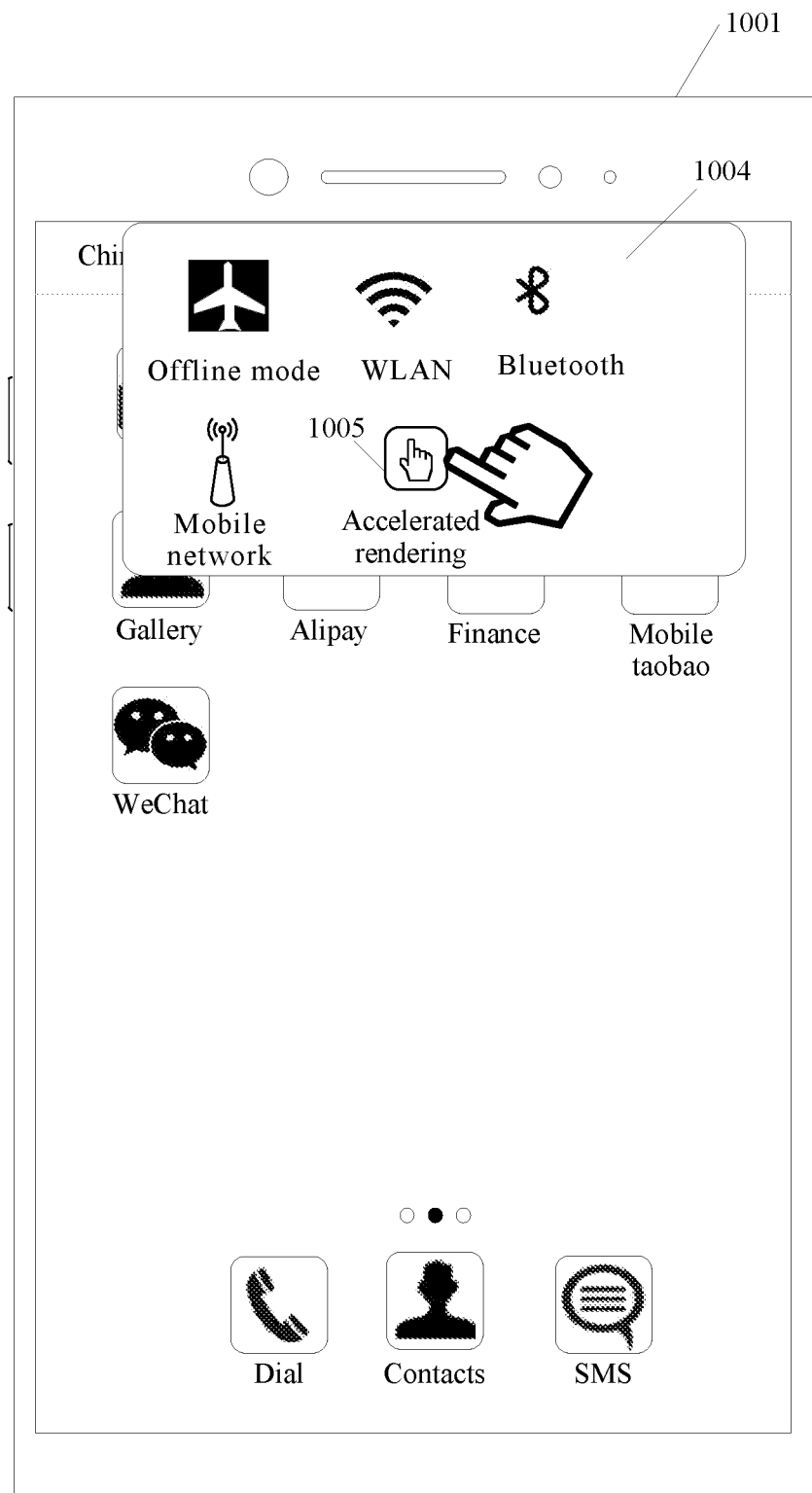

For another example, as shown in FIG. 10(b), the first operation may be a tapping operation performed by the user on an "accelerated rendering" button 1005 in a notification bar 1004 displayed by the mobile phone 1001. The first operation is used to enable an "accelerated rendering" button 1005, to trigger the mobile phone 1001 to start the accelerated rendering mode.

In the implementation (II), the first event may be that the first frame processing duration in the first measurement period is shorter than or equal to the preset single-frame duration. For detailed descriptions of the first measurement period, the preset single-frame duration, and the first frame processing duration being shorter than or equal to the preset single-frame duration, refer to related content in the foregoing embodiment. Details are not described herein again in this embodiment of this application.

Further, the electronic device may exit the accelerated rendering mode. After the electronic device exits the accelerated rendering mode, the electronic device can perform layer composing only in response to the vertical synchronization signal 2. Specifically, the method in this embodiment of this application may further include S902 to S905. For example, as shown in FIG. 9, the method in this embodiment of this application may further include S902 to S905.

S902. The electronic device exits the accelerated rendering mode in response to a second event.

For example, in this embodiment of this application, the second event is illustrated herein by using the following two implementations: an implementation (a) and an implementation (b).

In the implementation (a), the second event may be that the electronic device receives a second operation of the user. The second operation is used to trigger the electronic device to exit the accelerated rendering mode.

The second operation corresponds to the first operation. For example, the second operation may be that after the electronic device enables the "accelerated rendering" option 1003 or the "accelerated rendering" button 1005 in response to the first operation of the user to start the accelerated rendering mode, the electronic device receives a tapping operation performed by the user on the "accelerated rendering" option 1003 or the "accelerated rendering" button 1005. In response to the second operation, the mobile phone 1001 may disable the "accelerated rendering" option 1003 or the "accelerated rendering" button 1005, to exit or disable the accelerated rendering mode.

In the implementation (b), the second event may be that the first frame processing duration in the first measurement period is longer than the preset single-frame duration. For detailed descriptions of the first measurement period, the preset single-frame duration, and the first frame processing duration being longer than or equal to the preset single-frame duration, refer to related content in the foregoing embodiment. Details are not described herein again in this embodiment of this application.

S903. The electronic device draws one or more second layers in response to a vertical synchronization signal 1, and renders the one or more second layers.

S904. In response to a vertical synchronization signal 2, the electronic device performs layer composing on the rendered one or more second layers to obtain a second image frame.

After exiting the accelerated rendering mode, and before the first vertical synchronization signal 2 after rendering of the one or more first layers is ended arrives, the electronic device cannot start to perform layer composing on the rendered second layer. Instead, the electronic device needs to wait for arrival of the vertical synchronization signal 2, and in response to the vertical synchronization signal 2, the electronic device performs layer composing on the rendered second layer to obtain the second image frame.

For example, as shown in FIG. 6A(a), the electronic device does not perform layer composing at the time $t_6$. Instead, the electronic device can perform layer composing on the rendered layer to obtain the image frame in response to the vertical synchronization signal 2 at the time $t_2$ only after waiting for arrival of the vertical synchronization signal 2 at the time $t_2$.

S905. The electronic device refreshes and displays the second image frame in response to a vertical synchronization signal 3.

In this embodiment of this application, the electronic device may start the accelerated rendering mode in response to an operation of the user, or may automatically start the accelerated rendering mode based on the duration required by the electronic device for layer drawing, rendering, and composing in the measurement period.

It should be noted that the accelerated rendering mode is merely a name of a working mode in which the electronic device performs the method in this embodiment of this application. The accelerated rendering mode may also have another name. This is not limited in this embodiment of this application. For example, the accelerated rendering mode may also be referred to as an accelerated rendering and composing mode, or an accelerated composing mode.

Embodiment 8

With reference to the foregoing embodiment, the method in the embodiment of this application is further described in this embodiment. Specifically, the electronic device may periodically obtain the first frame processing duration in each measurement period. If the first frame processing duration in one measurement period (for example, the first measurement period) is longer than the preset single-frame duration, it indicates that there is a relatively low possibility that the electronic device completes layer drawing, rendering, and composing in one synchronization period. In this case, in this embodiment, the electronic device may perform positive scheduling on the hardware resource of the electronic device, to shorten the duration required by the electronic device for layer drawing, layer rendering, and/or layer composing. Therefore, a possibility that the electronic device completes layer drawing, rendering, and composing in one synchronization period can be increased. In this embodiment of this application, a specific method for performing positive scheduling by the electronic device on the hardware resource is described by using an example in which the electronic device increases the working frequency of the processor of the electronic device.

Figure 11:
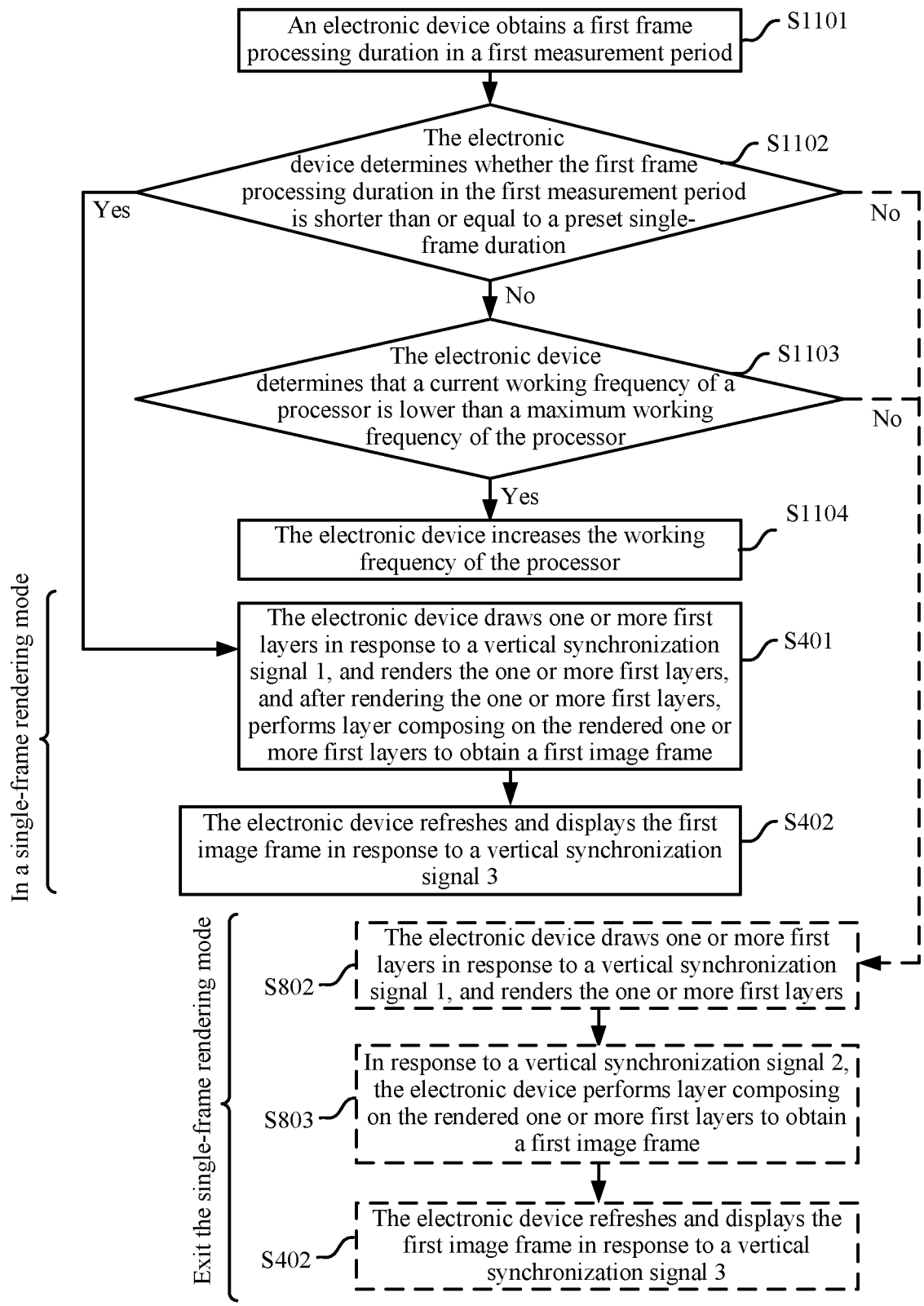
FIG. 11 is a flowchart of another method for image processing based on vertical synchronization signals according to an embodiment of this application.

Specifically, the method in this embodiment of this application may further include S1101 to S1104. For example, as shown in FIG. 11, the method in this embodiment of this application may further include S1101 to S1104.

S1101. The electronic device obtains the first frame processing duration in the first measurement period.

The electronic device may perform S801a and S801b in response to expiry of the first measurement period, to obtain the first frame processing duration in the first measurement period.

S1102. The electronic device determines whether the first frame processing duration in the first measurement period is shorter than or equal to the preset single-frame duration.

The first frame processing duration is a sum of a first frame rendering duration and a first SF frame duration. The first frame rendering duration is a duration required for drawing the layer and rendering the drawn layer. The first SF frame duration is a duration required for performing layer composing on the rendered layer.

For example, the electronic device may periodically measure the first frame processing duration in each measurement period. The first measurement period is the measurement period before the current time. For example, the measurement period in this embodiment of this application may be any duration of 1 s, 2 s, 3 s, or 5 s. For detailed descriptions of S1102, refer to related descriptions in S801. Details are not described herein again in this embodiment of this application.

It may be understood that if the working frequency of the processor is higher, the computing speed of the processor is higher, and the duration required by the electronic device for layer drawing, rendering, and composing is shorter. If the first frame processing duration in the first measurement period is shorter than or equal to the preset single-frame duration, it indicates that the working frequency of the processor is sufficient to ensure that the electronic device completes layer drawing, rendering, and composing in one synchronization period, and the electronic device does not need to further increase the working frequency of the processor.

If the first frame processing duration in the first measurement period is longer than the preset single-frame duration, it indicates that the working frequency of the processor is relatively low and insufficient to ensure that the electronic device completes layer drawing, rendering, and composing in one synchronization period, and the electronic device may increase the working frequency of the processor. For example, the electronic device may perform S1104 to increase the working frequency of the processor. However, the electronic device can increase the working frequency of the processor only when a current working frequency of the processor is lower than a maximum working power of the processor. Therefore, as shown in FIG. 11, after S1102, if the first frame processing duration in the first measurement period is longer than the preset single-frame duration, the electronic device may perform S1103.

S1103. The electronic device determines that the current working frequency of the processor is lower than the maximum working frequency of the processor.

Specifically, if the current working frequency of the processor is lower than the maximum working power of the processor, the electronic device may perform S1104. If the current working frequency of the processor is the maximum working power of the processor, the electronic device does not need to adjust the working frequency of the processor.

S1104. The electronic device increases the working frequency of the processor.

For example, the processor in this embodiment of this application may include at least one of a CPU and a GPU. A unit of the working frequency f of the processor may be hertz (Hz, Hz for short), kilohertz (kHz), megahertz (MHz), or gigahertz (GHz).

In an implementation, the electronic device may increase the working frequency of the processor based on a first preset step. For example, a unit of the first preset step may be Hz, kHz, or MHz. The first preset step may be preconfigured in the electronic device. Alternatively, the first preset step may be set by the user in the electronic device.

In another implementation, the electronic device may increase the working frequency of the processor based on a difference between the first frame processing duration and the preset single-frame duration, so that a second frame processing duration in the next measurement period is shorter than or equal to the preset single-frame duration. In this implementation, a range of adjusting the working frequency of the processor by the electronic device is proportional to a value of the difference. In other words, if the difference between the first frame processing duration and the preset single-frame duration is larger, the range of adjusting the working frequency of the processor by the electronic device is larger. If the difference between the first frame processing duration and the preset single-frame duration is smaller, the range of adjusting the working frequency of the processor by the electronic device is smaller.

In some embodiments, the electronic device may adjust the working frequency of the processor by using the preset AI model based on the first frame processing duration and the preset single-frame duration. The preset AI model is obtained by training a large quantity of samples. The preset AI model is an AI model having a function of adjusting the working frequency of the processor based on the first frame processing duration, to increase a possibility of single-frame rendering and composing. The single-frame rendering and composing mean that the electronic device completes layer drawing, rendering, and composing in one synchronous period.

As shown in FIG. 11, after S1102, if the first frame processing duration is shorter than or equal to the preset single-frame duration, the electronic device may perform S401 and S402; or if the first frame processing duration is longer than the preset single-frame duration, the electronic device may further perform S802, S803, and S402.

After S1102, if the first frame processing duration is longer than the preset single-frame duration, the electronic device performs S1103. In other words, when the electronic device performs S1103, the first frame processing duration is longer than the preset single-frame duration, and there is a relatively low possibility that the electronic device completes layer drawing, rendering, and composing in one synchronization period. Therefore, after S1103, if the current working frequency of the electronic device is equal to the maximum working frequency, it indicates that even if the processor works at the maximum working frequency, there is a relatively low possibility that the electronic device completes layer drawing, rendering, and composing in one synchronization period.

In this case, the electronic device may perform layer drawing, rendering, and composing by using a conventional solution. As shown in FIG. 11, after S1103, if the current working frequency of the electronic device is equal to the maximum working frequency, the electronic device may perform S802, S803, and S402.

It should be noted that, as shown in FIG. 11, when the electronic device performs S401 and S402, the electronic device is in the accelerated rendering mode; or when the electronic device performs S802, S803, and S402, the electronic device has exited the accelerated rendering mode.

In this embodiment of this application, when the first frame processing duration is longer than the preset single-frame duration, that is, when a possibility that the electronic device completes layer drawing, rendering, and composing in one synchronization period is relatively low, the electronic device may increase the working frequency of the processor of the electronic device. In this way, the computing speed of the processor can be increased, to shorten the duration required by the electronic device for layer drawing, rendering, and composing, and increase a possibility that the electronic device completes layer drawing, rendering, and composing in one synchronization period. Therefore, if the electronic device can complete layer drawing, rendering, and composing in one synchronization period, the response latency of the electronic device can be shortened by one synchronization period, and fluency (for example, the touch latency) of the electronic device can be improved.

It may be understood that, although the processor of the electronic device has a relatively high working frequency, which can increase the computing speed of the electronic device and shorten the duration required by the electronic device for layer drawing, rendering, and composing, a higher working frequency of the processor means higher power consumption. In this embodiment of this application, the electronic device may further decrease the working frequency of the processor when the first frame processing duration meets a preset condition. In this way, power consumption of the electronic device can be reduced. Specifically, the method in this embodiment of this application may further include S1201.

S1201. If the first frame processing duration meets the preset condition, decrease the working frequency of the processor.

In an implementation, that the first frame processing duration meets the preset condition may specifically include: the first frame processing duration is shorter than the preset single-frame duration.

If the first frame processing duration is shorter than the preset single-frame duration, it indicates that there is a relatively high possibility that the electronic device completes layer drawing, rendering, and composing in one synchronization period. In this case, possibly because the working frequency of the processor is relatively high, the computing speed of the processor is relatively high, and the electronic device can complete layer drawing, rendering, and composing in one synchronous period. However, an excessively high working frequency of the processor causes relatively high power consumption of the electronic device. Therefore, the electronic device may reduce the working frequency of the processor.

In another implementation, that the first frame processing duration meets the preset condition may specifically include: the first frame processing duration is shorter than the preset single-frame duration, and a difference between the preset single-frame duration and the first frame processing duration is greater than a first preset duration.

If the first frame processing duration is shorter than the preset single-frame duration, and the difference between the preset single-frame duration and the first frame processing duration is greater than the first preset duration, it indicates that after the electronic device completes layer drawing, rendering, and composing in one synchronization period, the electronic device may further need to wait for a period of time for arrival of the vertical synchronization signal 3, and then can refresh and display the composed image frame in response to the vertical synchronization signal 3. In this case, the processor generally works at a relatively high frequency. To reduce power consumption of the electronic device, the electronic device may decrease the working frequency of the processor.

In this embodiment of this application, a method for decreasing the working frequency of the processor by the electronic device may include: the electronic device decreases the working frequency of the processor based on a second preset step. The second preset step may be equal to the first preset step. Alternatively, the second preset step may be less than the first preset step.

It should be noted that when the second preset step is less than the first preset step, the electronic device may adjust the working frequency of the processor in a fast rise and slow fall manner. This helps the electronic device perform the method in this embodiment of this application, shorten a touch response latency of the electronic device, and improve fluency (for example, the touch latency) of the electronic device.

Figure 12:
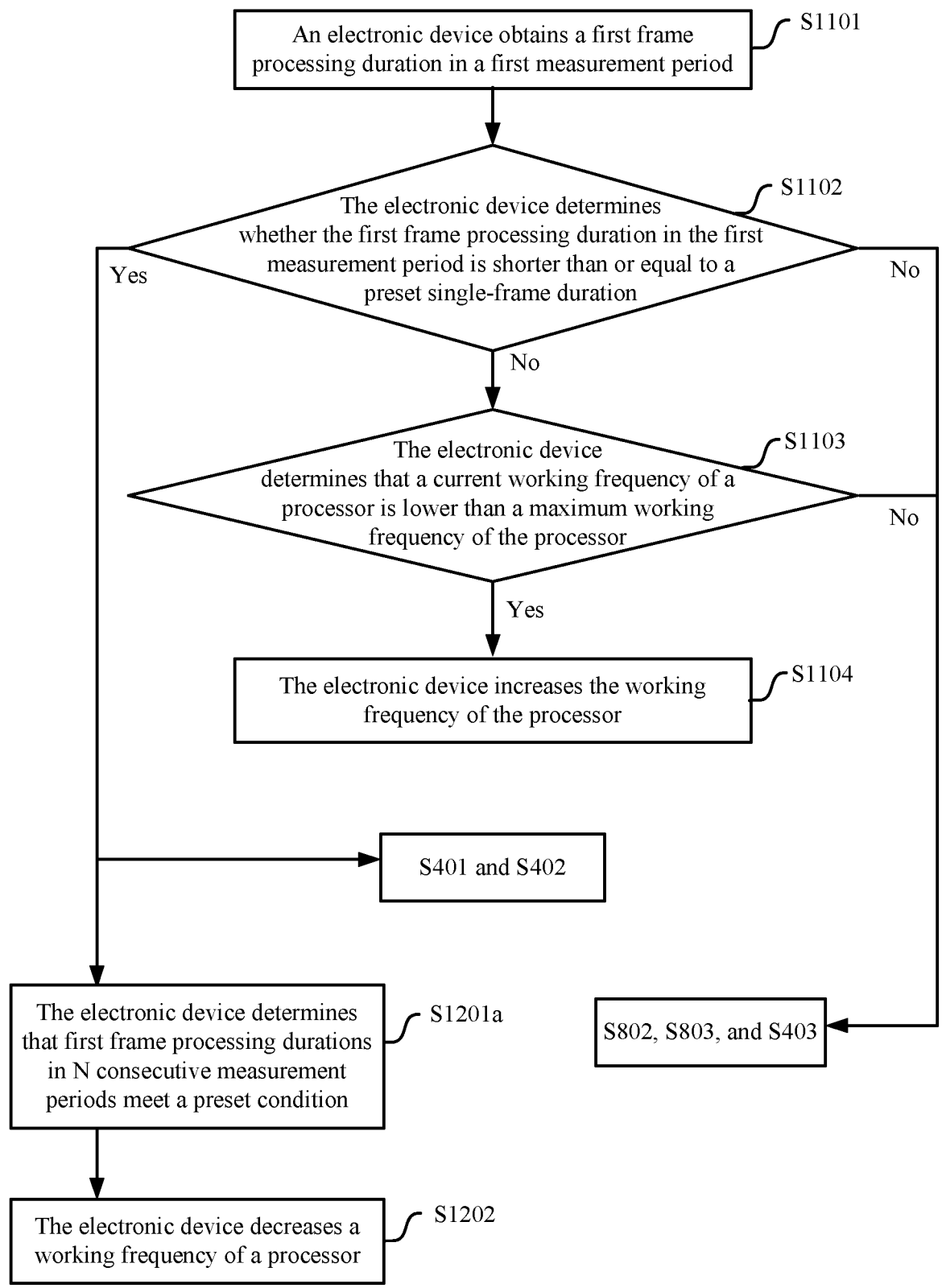
FIG. 12 is a flowchart of another method for image processing based on vertical synchronization signals according to an embodiment of this application.

In some embodiments, to prevent a ping-pong phenomenon during an adjustment of the working frequency of the processor, the electronic device may decrease the working frequency of the processor only when first frame processing durations in N consecutive measurement periods meet the preset condition. For example, as shown in FIG. 12, after S1102 shown in FIG. 11, the method in this embodiment of this application may further include S1201*a* and S1202.

S1201*a*. The electronic device determines that the first frame processing durations in the N consecutive measurement periods meet the preset condition.

N≥2, and N is a positive integer. For example, N may be any positive integer such as 5, 4, 3, 2, or 6.

For example, a method for determining, by the electronic device, that the first frame processing durations in the N consecutive measurement periods meet the preset condition may include: if a first frame processing duration in one measurement period (for example, a measurement period 1) meets the preset condition, the electronic device may add 1 to a count value of a counter, where an initial count value of the counter is 0; and if a first frame processing duration in a measurement period next to the measurement period 1 meets the preset condition, the electronic device adds 1 to the count value of the counter; or if a first frame processing duration in a measurement period next to the measurement period 1 does not meet the preset condition, the electronic device resets the count value of the counter to 0.

Optionally, in some embodiments, the electronic device may enter the accelerated rendering mode only when determining that the first frame processing durations in the N consecutive measurement periods meet the preset condition.

S1202. The electronic device decreases the working frequency of the processor.

It should be noted that, in this embodiment, for that the first frame processing duration meets the preset condition, and the method for decreasing the working frequency of the processor by the electronic device, refer to related descriptions in the foregoing embodiment. Details are not described herein again in this embodiment of this application.

In this embodiment of this application, the electronic device may decrease the working frequency of the processor only when the first frame processing durations in the N consecutive measurement periods meet the preset condition. This can not only prevent a ping-pong phenomenon during the adjustment of the working frequency of the processor, but also implement a fast rise and slow fall during the adjustment of the working frequency of the processor. While ensuring system stability of the electronic device in layer drawing, rendering, and composing, this can increase a possibility that the electronic device completes layer drawing, rendering, and composing in one synchronization period, to shorten the touch response latency of the electronic device, and improve fluency (for example, the touch latency) of the electronic device.

In each measurement period, if a long duration is consumed at some characteristic points during drawing and rendering of one or more layers, the electronic device may be unable to complete layer drawing, rendering, and composing in one synchronization period. In this case, the electronic device may exit the accelerated rendering mode. Then the electronic device may start the accelerated rendering mode in response to the recurring first event.

However, each time the electronic device enters the accelerated rendering mode, a frame loss occurs. For example, as shown in FIG. 6A(a), before entering the accelerated rendering mode, the electronic device waits for arrival of the vertical synchronization signal 2 at the time $t_2$, and then can perform layer composing (that is, image frame composing) only in response to the vertical synchronization signal 2 at the time $t_2$; and the electronic device waits for arrival of the vertical synchronization signal 3 at the time $t_3$, and then can refresh and display the composed image frame only in response to the vertical synchronization signal 3 at the time $t_3$. However, as shown in FIG. 6A(b), after entering the accelerated rendering mode, the electronic device may perform layer composing (that is, image frame composing) at the time $t_7$, and can refresh and display the composed image frame in response to the vertical synchronization signal 3 at the time $t_2$. Therefore, when the electronic device enters the accelerated rendering mode, one frame of image (that is, one image frame) may be composed in response to the vertical synchronization signal 2 before the electronic device enters the accelerated rendering mode. After the electronic device enters the accelerated rendering mode, the frame of image is not refreshed and displayed by the display screen, and a frame loss occurs.

It may be understood that one occasional frame loss does not greatly affect a display effect of the display screen and therefore does not greatly affect visual experience of the user. However, if the electronic device frequently starts and exits the accelerated rendering mode, a frame loss phenomenon frequently occurs. The frequent frame loss phenomenon affects the display effect of the display screen, and further affects visual experience of the user.

In some embodiments, to prevent the electronic device from frequently starting and exiting the accelerated rendering mode, after the electronic device enters the accelerated rendering mode, the method in this embodiment of this application may further include S1301.

S1301. In a measurement period, if a duration consumed at a first characteristic point during drawing and rendering of one or more third layers is longer than a second preset duration corresponding to the first characteristic point, the electronic device adjusts the working frequency of the processor to the maximum working frequency of the processor.

The first characteristic point may include at least any one of the following: the electronic device draws the one or more third layers; the electronic device renders the one or more third layers; the electronic device executes any function in a process of drawing the one or more third layers; and the electronic device executes any function in a process of rendering the one or more third layers.

In this embodiment of this application, one second preset duration may be set for each first characteristic point. The second preset duration may be determined by measuring time required by a large quantity of electronic devices for performing operations corresponding to the first feature point for a plurality of times.

It may be understood that, in the measurement period, if the duration consumed at the first characteristic point is longer than the second preset duration corresponding to the first characteristic point, it indicates that there is a relatively high possibility that the electronic device cannot complete drawing and rendering of one or more third layers by using a method corresponding to the accelerated rendering mode. The one or more third layers are layers that are being drawn or rendered by the electronic device in the measurement period. In this case, the electronic device may instantaneously increase the frequency of the processor, and adjust the working frequency of the processor to the maximum working frequency of the processor. After the frequency of the processor is instantaneously increased, the computing speed of the processor may be increased, and further, the duration required by the electronic device for layer drawing, rendering, and composing may be shortened.

If the electronic device still cannot complete layer drawing, rendering, and composing in one synchronization period after instantaneously increasing the frequency of the processor, the electronic device may exit the accelerated rendering mode to ensure that the electronic device can complete layer drawing, rendering, and composing, and ensure the display effect of the display screen of the electronic device. Specifically, after S1301, the method in this embodiment of this application may further include S1302.

S1302. If a third frame processing duration is longer than the preset single-frame duration, the electronic device performs layer composing on the rendered layer in response to the vertical synchronization signal 2, to obtain an image frame.

The third frame processing duration is a sum of a third frame rendering duration and a third SF frame duration. The third frame rendering duration is a duration required for drawing and rendering the one or more third layers, and the third SF frame duration is a duration required for performing layer composing on the rendered one or more third layers.

If the third frame processing duration is longer than the preset single-frame duration, it indicates that after instantaneously increasing the frequency of the processor, the electronic device still cannot complete drawing, rendering, and composing of the one or more third layers in one synchronization period. In this case, the electronic device may exit the accelerated rendering mode. In other words, before the first vertical synchronization signal 2 after rendering of the one or more first layers is ended arrives, the electronic device does not perform layer composing on the rendered layer, but waits for arrival of the vertical synchronization signal 2 and performs layer composing on the rendered layer to obtain the image frame only in response to the vertical synchronization signal 2.

Embodiment 9

Figure 13:
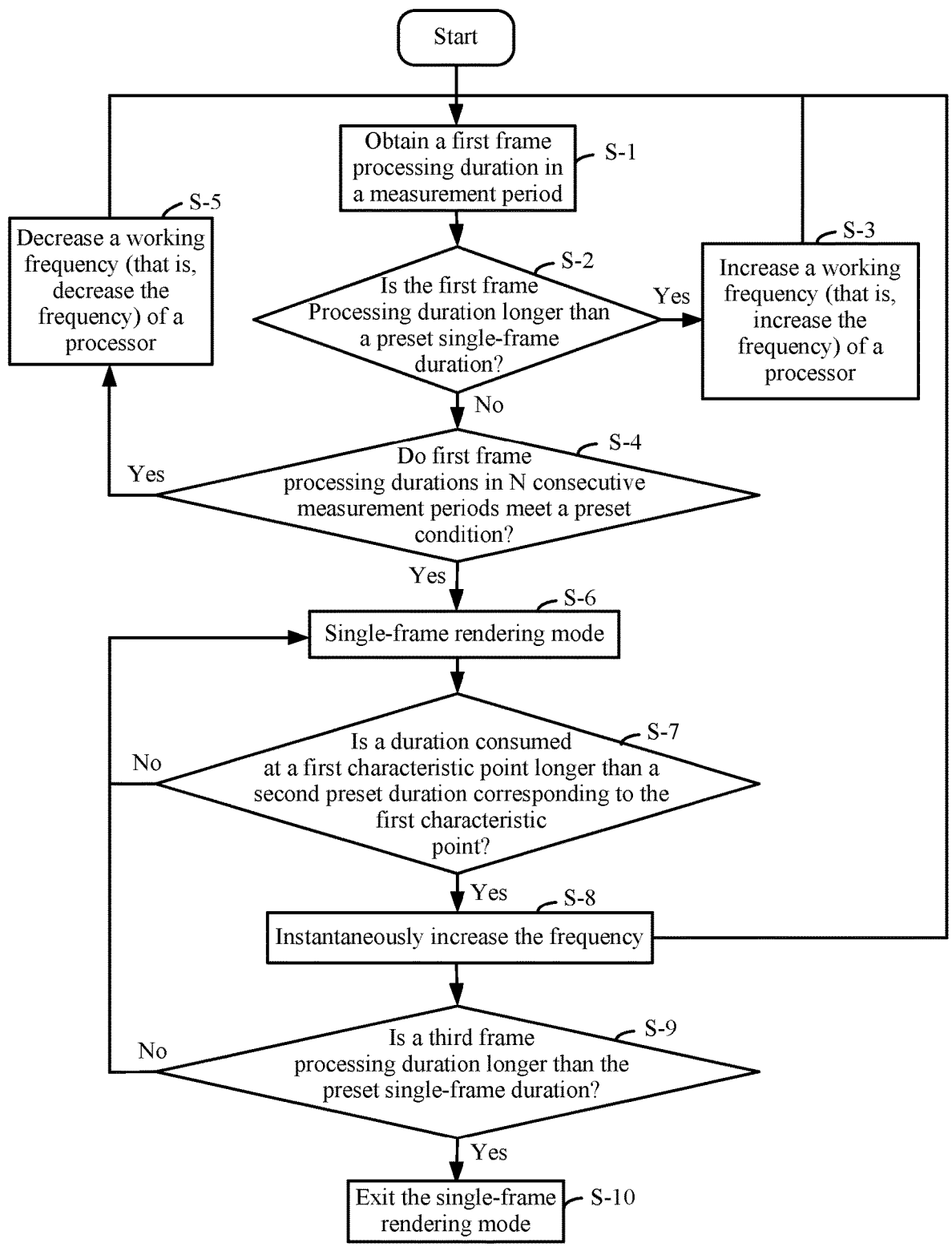
FIG. 13 is a flowchart of another method for image processing based on vertical synchronization signals according to an embodiment of this application.

FIG. 13 is a simplified flowchart of a method for image processing based on vertical synchronization signals according to this embodiment of this application.

As shown in FIG. 13, after a measurement period expires, an electronic device may perform S-1 to obtain a first frame processing duration in the measurement period. For detailed descriptions of S-1, refer to S801a, S801b, S1101, and related descriptions in the foregoing embodiment. Details are not described herein again. Then the electronic device may perform S-2 to determine whether the first frame processing duration in the measurement period is longer than a preset single-frame duration. For detailed descriptions of S-2, refer to S801 and related descriptions in the foregoing embodiment. Details are not described herein again.

If the first frame processing duration in the measurement period is longer than the preset single-frame duration, the electronic device may perform S-3 to increase a working frequency (that is, increase the frequency) of a processor. For detailed descriptions of S-3, refer to S1104 and related descriptions in the foregoing embodiment. Details are not described herein again. If the first frame processing duration in the measurement period is shorter than or equal to the preset single-frame duration, the electronic device may perform S-4 to determine whether first frame processing durations in N consecutive measurement periods meet a preset condition. For detailed descriptions of S-4, refer to S1201a and related descriptions in the foregoing embodiment. Details are not described herein again. If the first frame processing durations in the N consecutive measurement periods meet the preset condition, the electronic device performs S-5 and S-6. The electronic device may perform S-5 to decrease the working frequency (that is, decrease the frequency) of the processor. For detailed descriptions of S-5, refer to S1202 and related descriptions in the foregoing embodiment. Details are not described herein again. The electronic device performs S-6 to start an accelerated rendering mode. In this embodiment of this application, the electronic device may also start the accelerated rendering mode in response to a first event. In the accelerated rendering mode, the electronic device may perform S401 and S402.

In addition, in the accelerated rendering mode, the electronic device may perform S-7 to determine whether a duration consumed at a first characteristic point is longer than a second preset duration corresponding to the first characteristic point. If the duration consumed at the first characteristic point is longer than the second preset duration corresponding to the first characteristic point, the electronic device may perform S-8 to instantaneously increase the frequency. For detailed descriptions of S-7 and S-8, refer to S1301 and related descriptions in the foregoing embodiment. Details are not described herein again.

If the duration consumed at the first characteristic point is shorter than or equal to the second preset duration corresponding to the first characteristic point, the electronic device continues to be in the accelerated rendering mode. After instantaneously increasing the frequency (that is, performing S-8), the electronic device may perform S-9 to determine whether a third frame processing duration is longer than the preset single-frame duration. If the third frame processing duration is longer than the preset single-frame duration, the electronic device may perform S-10 to exit the accelerated rendering mode. For detailed descriptions of S-9 and S-10, refer to S1302 and related descriptions in the foregoing embodiment. Details are not described herein again. If the third frame processing duration is shorter than or equal to the preset single-frame duration, the electronic device continues to be in the accelerated rendering mode. In this embodiment of this application, the electronic device may also exit the accelerated rendering mode in response to a second event. After exiting the accelerated rendering mode, the electronic device may perform layer drawing, rendering, and composing, and image frame displaying in a manner of S903 to S905.

Embodiment 10

Figure 14:
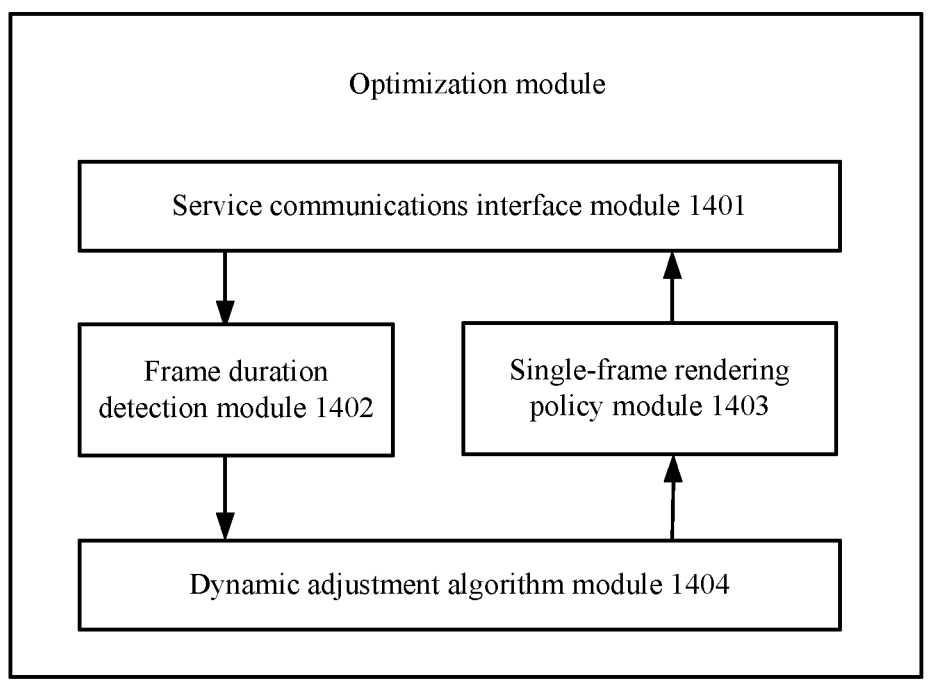
FIG. 14 is a schematic diagram of a structure of an apparatus for adjusting a phase of a vertical synchronization signal according to an embodiment of this application.

FIG. 14 is a schematic diagram of an optimization module according to this embodiment of this application. The optimization module may be a functional module that is in an image frame generation apparatus or an electronic device and is configured to implement the methods in the embodiments of this application. As shown in FIG. 14, the optimization module may include a service communications interface module 1401, a frame duration detection module 1402, a single-frame rendering policy module 1403, and a dynamic adjustment algorithm module 1404.

The frame duration detection module 1402 is configured to obtain a plurality of second frame processing durations in a measurement period (for example, a first measurement period), determine a first frame processing duration in the measurement period, and transmit the first frame processing duration in the measurement period to the dynamic adjustment algorithm module 1404. The frame duration detection module 1402 may obtain the plurality of second frame processing durations in the measurement period by using the service communications interface module 1401. For example, the frame duration detection module 1402 is configured to support the electronic device in performing S801*a*, S801*b*, and S1101 in the foregoing method embodiments, and/or another process of the technology described in this specification.

The dynamic adjustment algorithm module 1404 is configured to invoke a scheduling module to adjust a working frequency of a processor based on the first frame processing duration determined by the frame duration detection module 1402. For example, the dynamic adjustment algorithm module 1404 is configured to support the electronic device in performing an operation of "determining that the third frame processing duration is longer than the preset single-frame duration" in S801, S1102, S1103, S1104, S1201, S1201*a*, S1202, S1301, and S1302 in the foregoing method embodiments, S901, and S902, and/or used in another process in the technology described in this specification.

The single-frame rendering policy module 1403 is configured to: in response to control of the dynamic adjustment algorithm module 1404, control a UI thread, a rendering thread, and a composing thread of the electronic device to perform layer drawing, rendering, and composing in a corresponding manner. For example, the single-frame rendering policy module 1403 is configured to support the electronic device in performing an operation of "layer composing" in S401, S402, S802, S803, S903, S904, S905, and S1302 in the foregoing method embodiments, and/or used in another process in the technology described in this specification.

Figure 15:
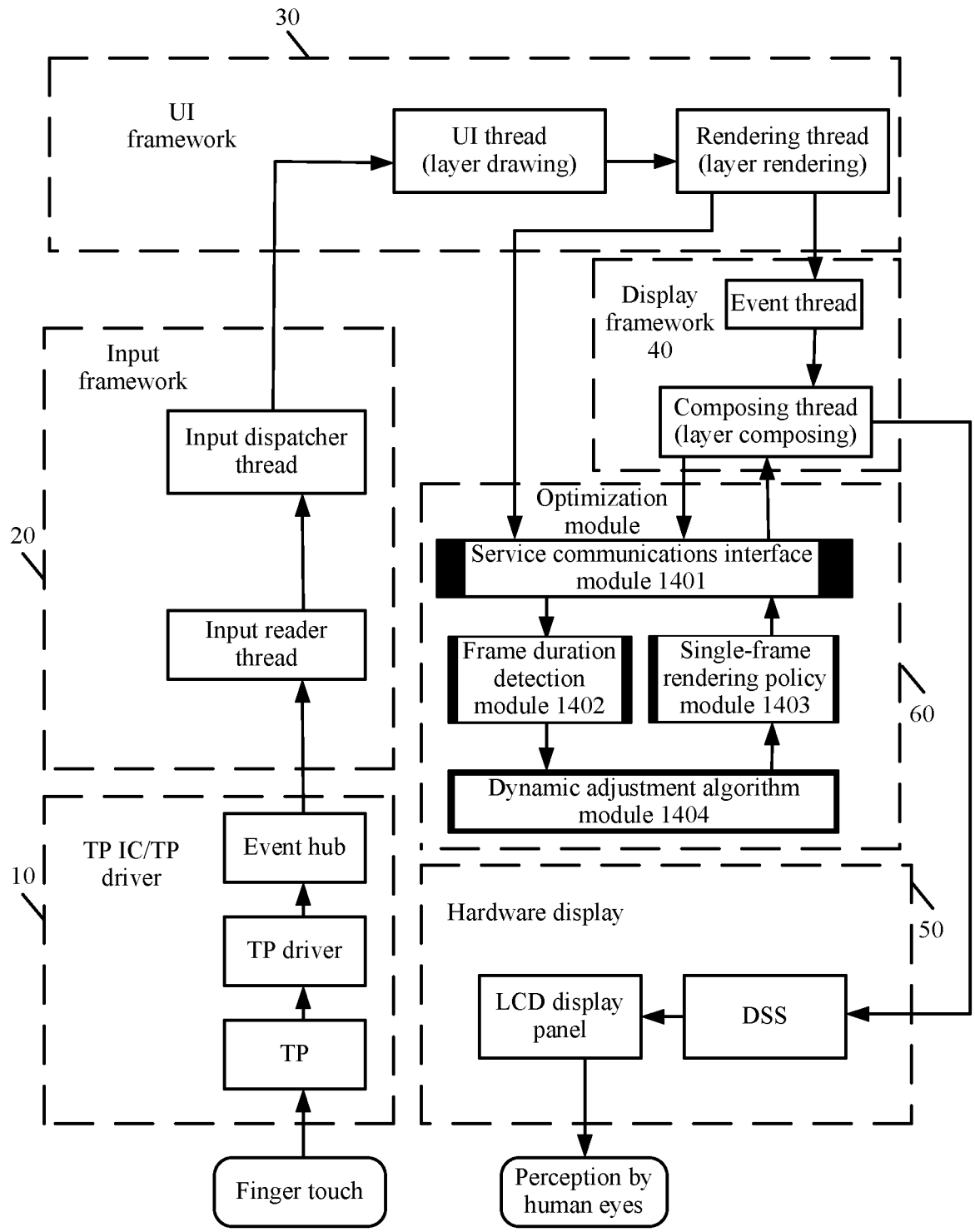
FIG. 15 is a schematic diagram of another software processing procedure in which an electronic device displays an image in response to a touch operation according to an embodiment of this application.

As shown in FIG. 15, a software architecture shown in FIG. 1A may further include an optimization module 60. The optimization module 60 may include a service communications interface module 1401, a frame duration detection module 1402, a single-frame rendering policy module 1403, and a dynamic adjustment algorithm module 1404.

Embodiment 11

Figures 16A, 16B, 16C:
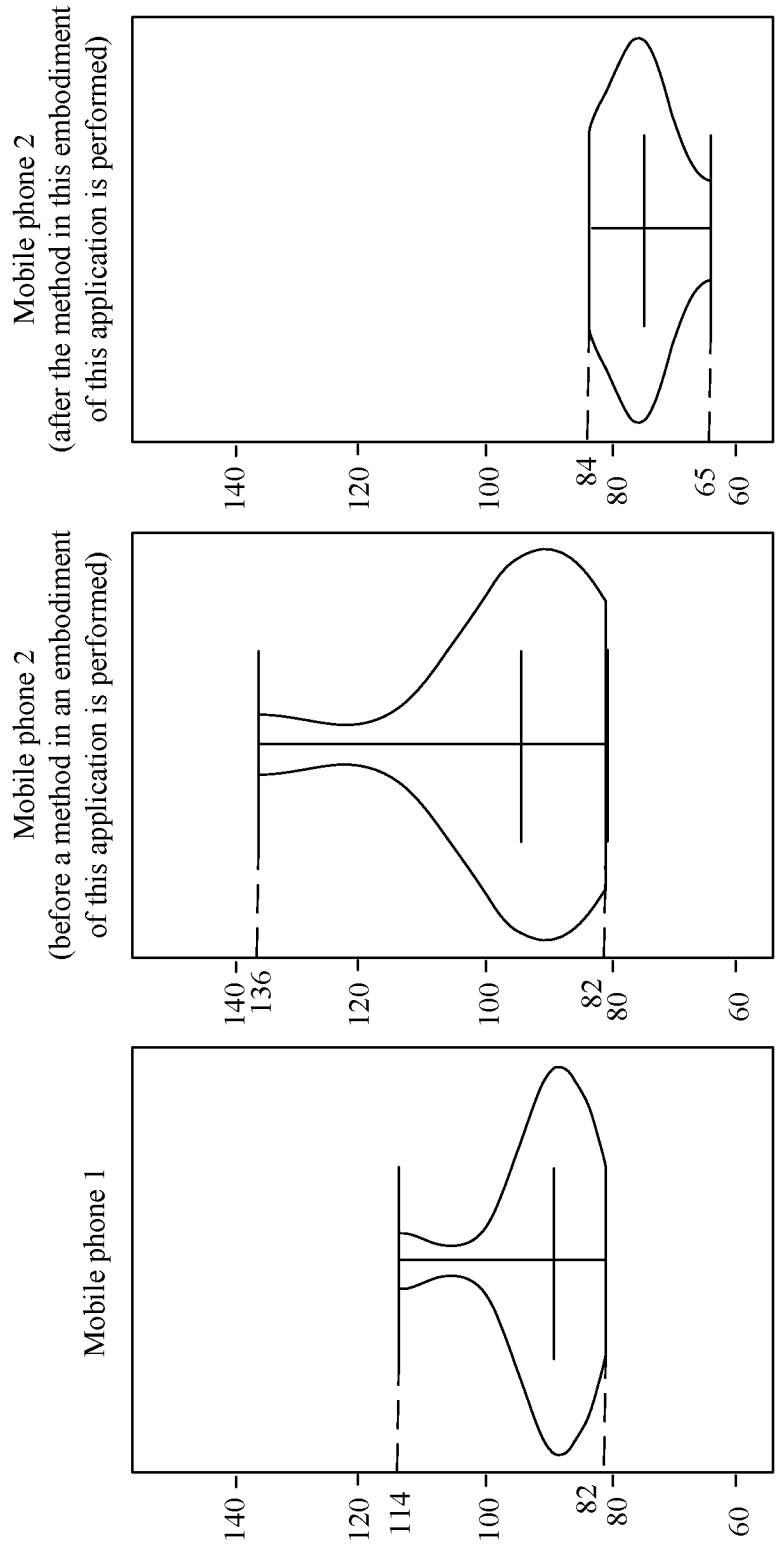
FIG. 16(a) to FIG. 16(c) are schematic diagrams of test results of a test scenario according to an embodiment of this application.

FIG. 16(*a*) to FIG. 16(*c*) are schematic diagrams of test results of a slide test scenario of a "contacts" application when mechanical hand speeds of mobile phones of two brands are 100 millimeters (mm)/s.

FIG. 16(*a*) shows a test result of a slide test scenario of a "contacts" application when a mechanical hand speed of a mobile phone 1 of a brand (for example, an iPhone xs mobile phone) is 100 mm/s. As shown in FIG. 16(*a*), a touch response time of the mobile phone 1 is 82 ms to 114 MS.

FIG. 16(*b*) shows a test result of a slide test scenario of a "contacts" application when a mechanical hand speed is 100 mm/s before a mobile phone 2 of another brand (such as a Huawei mobile phone) performs a method in an embodiment of this application. As shown in FIG. 16(*b*), before the mobile phone 2 performs the method in this embodiment of this application, a touch response time is 82 ms to 136 ms.

FIG. 16(*c*) shows a test result of a slide test scenario of the "contacts" application when the mechanical hand speed is 100 mm/s after the mobile phone 2 performs the method in this embodiment of this application. As shown in FIG. 16(*c*), before the mobile phone 2 performs the method in this embodiment of this application, a touch response time is 65 ms to 84 ms.

By comparing FIG. 16(*c*) with FIG. 16(*b*), it can be learned that, when tests are performed in a same test scenario at a same mechanical hand speed (for example, 100 mm/s), in comparison with the touch response time before the mobile phone 2 performs the method in this embodiment of this application ("touch response time-before" for short, for example, 82 ms to 136 ms), the touch response time after the mobile phone 2 performs the method in this embodiment of this application ("touch response time-after" for short, for example, 65 ms to 84 ms) is shortened by a relatively long latency time. In other words, the method in this embodiment of this application can shorten a response latency of an electronic device, and improve fluency (for example, a touch latency) of the electronic device.

By comparing FIG. 16(*a*) with FIG. 16(*b*), it can be learned that, when tests are performed at a same mechanical hand speed (for example, 100 mm/s) in a same test scenario, in comparison with the touch response time (for example, 82 ms to 114 ms) of the mobile phone 1, the "touch response time-before" (for example, 82 ms to 136 ms) is relatively long.

By comparing FIG. 16(*a*) and FIG. 16(*b*) with FIG. 16(*c*), it can be learned that, when tests are performed at a same mechanical hand speed (for example, 100 mm/s) in a same test scenario, the "touch response time-after" (for example, 65 ms to 84 ms) is not only shortened by a relatively long latency time in comparison with the "touch response time-before" (for example, 82 ms to 136 ms), but also shortened by some time in comparison with the touch response time (for example, 82 ms to 114 ms) of the mobile phone 1.

It can be learned from the foregoing test scenario that the method in this embodiment of this application can greatly shorten the response latency of the electronic device, and improve fluency (for example, the touch latency) of the electronic device.

Embodiment 12

Some embodiments of this application provide an electronic device. The electronic device may include a display screen (such as a touchscreen), a memory, and one or more processors. The display screen and the memory are coupled to the processor. The memory is configured to store computer program code, where the computer program code includes computer instructions. When the processor executes the computer instructions, the electronic device may perform functions or steps performed by the electronic device in the foregoing method embodiment. For a structure of the electronic device, refer to the structure of the electronic device 200 shown in FIG. 2.

Figure 17:
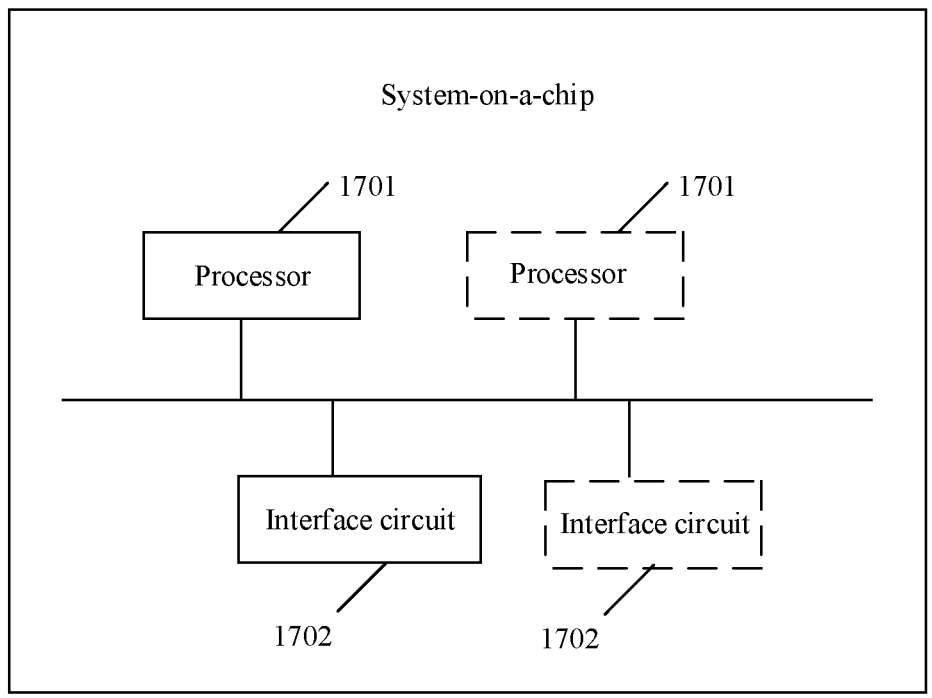
FIG. 17 is a schematic diagram of a structure of a system-on-a-chip according to an embodiment of this application.

An embodiment of this application further provides a system-on-a-chip. As shown in FIG. 17, the system-on-a-chip includes at least one processor 1701 and at least one interface circuit 1702. The processor 1701 and the interface circuit 1702 may be interconnected by using a line. For example, the interface circuit 1702 may be configured to receive a signal from another apparatus (for example, a memory of an electronic device). For another example, the interface circuit 1702 may be configured to send a signal to another apparatus (for example, the processor 1701 or a touchscreen of the electronic device). For example, the interface circuit 1702 may read instructions stored in the memory, and send the instructions to the processor 1701. When the instructions are executed by the processor 1701, the electronic device may be enabled to perform each step in the foregoing embodiment. Certainly, the system-on-a-chip may further include another discrete component. This is not specifically limited in this embodiment of this application.

An embodiment of this application further provides a computer storage medium. The computer storage medium includes computer instructions, and when the computer instructions are run on the foregoing electronic device, the electronic device is enabled to perform functions or steps performed by the electronic device in the foregoing method embodiment.

An embodiment of this application further provides a computer program product. When the computer program product is run on a computer, the computer is enabled to perform the functions or steps performed by the electronic device in the foregoing method embodiment.

The foregoing descriptions about implementations allow a person skilled in the art to clearly understand that, for the purpose of convenient and brief description, division of the foregoing functional modules is used as an example for illustration. In an actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in an actual implementation. For example, a plurality of units or components may be combined or integrated into another apparatus, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for image processing based on vertical synchronization signals, wherein the method is applied to an electronic device comprising a display screen, and the method comprises:
   drawing, by the electronic device, one or more first layers in response to a first vertical synchronization signal, and rendering the one or more first layers, and after rendering the one or more first layers, performing layer composing on the rendered one or more first layers to obtain a first image frame; and
   refreshing and displaying, by the electronic device, the first image frame in response to a second vertical synchronization signal;
   wherein the drawing, by the electronic device, one or more first layers in response to a first vertical synchronization signal, and rendering the one or more first layers, and after rendering the one or more first layers, performing layer composing on the rendered one or more first layers to obtain a first image frame comprises:
   determining that a first frame processing duration in a first measurement period is shorter than or equal to a preset single-frame duration;
   in response to the determining that the first frame processing duration in the first measurement period is shorter than or equal to the preset single-frame duration, drawing, by the electronic device, the one or more first layers in response to the first vertical synchronization signal, and rendering the one or more first layers, and after rendering the one or more first layers, performing layer composing on the rendered one or more first layers to obtain the first image frame, wherein
   the first frame processing duration is a sum of a first frame rendering duration and a first layer composing frame duration for composing the first layer, the first frame rendering duration is a duration required for drawing the layer and rendering the drawn layer, and the first layer composing frame duration is a duration required for performing layer composing on the rendered layer.

2. The method according to claim 1, wherein the method further comprises:
   shortening, by the electronic device, a duration required by the electronic device for layer drawing, layer rendering, and/or layer composing, by at least one of increasing a working frequency of a processor of the electronic device, using a large-core processor of the electronic device, or increasing a working frequency of a memory of the electronic device.

3. The method according to claim 1, wherein the method further comprises:
   detecting a user operation or a user interface (UI) event on the electronic device;
   wherein the drawing, by the electronic device, one or more first layers in response to a first synchronization signal, and rendering the one or more first layers, are both performed in response to the detecting the user operation or the user interface (UI) event on the electronic device.

4. The method according to claim 1, wherein the preset single-frame duration is shorter than or equal to a signal period of the second vertical synchronization signal.

5. The method according to claim 1, wherein the drawing, by the electronic device, one or more first layers in response to a first vertical synchronization signal, and rendering the one or more first layers, and after rendering the one or more first layers, performing layer composing on the rendered one or more first layers to obtain a first image frame comprises:
   determining that a first frame processing duration in a first measurement period is longer than or equal to a preset single-frame duration;
   in response to the determining that the first frame processing duration is longer than the preset single-frame duration, drawing, by the electronic device, the one or more first layers in response to the first vertical synchronization signal, and performing layer composing on the rendered one or more first layers in response to a third vertical synchronization signal, to obtain the first image frame, wherein
   the first frame processing duration is a sum of a first frame rendering duration and an SF frame duration for composing the first layer, the first frame rendering duration is a duration required for drawing the layer and rendering the drawn layer, and the first SF frame duration is a duration required for performing layer composing on the rendered layer.

6. The method according to claim 1, wherein the drawing, by the electronic device, one or more first layers in response to a first vertical synchronization signal, and rendering the one or more first layers, and after rendering the one or more first layers, performing layer composing on the rendered one or more first layers to obtain a first image frame comprises:
   in response to the determining that the first frame processing duration is longer than the preset single-frame duration, shortening, by the electronic device, the duration required by the electronic device for layer drawing, layer rendering, and/or layer composing by at least one of increasing a working frequency of a processor of the electronic device, using a large-core processor of the electronic device, or increasing a working frequency of a memory of the electronic device, wherein
   the first frame processing duration is a sum of a first frame rendering duration and an SF frame duration for composing the first layer, the first frame rendering duration is a duration required for drawing the layer and rendering the drawn layer, and the first SF frame duration is a duration required for performing layer composing on the rendered layer.

7. The method according to claim 1, wherein the one or more first layers comprise a layer drawn by the electronic device by performing a drawing task corresponding to one or more applications; the one or more applications comprise at least one of one or more system-level applications and one or more user-level applications; and the system-level application comprises a status bar, a launcher, a navigation bar, and a wallpaper.

8. The method according to claim 7, wherein the performing layer composing on the rendered one or more first layers to obtain a first image frame after rendering the one or more first layers comprises:
   after rendering one or more first layers of a focus application, a key application, or an application closely related to fluency of the electronic device in the one or more applications, performing layer composing on the first layer rendered by the electronic device for the one or more applications, to obtain the first image frame.

9. The method according to claim 7, wherein the performing layer composing on the rendered one or more first layers to obtain a first image frame after rendering the one or more first layers comprises:
   after rendering a focus layer, a key layer, or a layer closely related to fluency of the electronic device in the one or more first layers, performing layer composing on the first layer rendered by the electronic device for the one or more applications, to obtain the first image frame.

10. The method according to claim 7, wherein the method further comprises:
    determining, by the electronic device, the first frame processing duration based on a first frame rendering duration corresponding to the focus application in the one or more applications and a first SF frame duration corresponding to the one or more applications by the electronic device.

11. The method according to claim 7, wherein the method further comprises:
    determining, by the electronic device, the first frame processing duration based on a longest first frame rendering duration among first frame rendering durations corresponding to all of the one or more applications and a first SF frame duration corresponding to the one or more applications by the electronic device.

12. The method according to claim 1, wherein the method further comprises:
    when a screen refresh rate of the electronic device is greater than a preset refresh rate threshold, reducing power consumption of the electronic device.

13. The method according to claim 12, wherein the method further comprises:
    when the screen refresh rate of the electronic device is greater than the preset refresh rate threshold, and a first frame processing duration is longer than a preset dual-frame duration, reducing power consumption of the electronic device.

14. The method according to claim 1, wherein the first layer composing frame duration is a SurfaceFlinger frame duration.

15. An electronic device, wherein the electronic device comprises a touchscreen, a memory, and one or more processors, wherein the touchscreen and the memory are coupled to the processor; and the memory is configured to store computer program code, the computer program code comprises computer instructions, and when the processor executes the computer instructions, the electronic device performs the following steps:
    drawing, by the electronic device, one or more first layers in response to a first vertical synchronization signal, and rendering the one or more first layers, and after rendering the one or more first layers, performing layer composing on the rendered one or more first layers to obtain a first image frame; and
    refreshing and displaying, by the electronic device, the first image frame in response to a second vertical synchronization signal
    wherein the drawing, by the electronic device, one or more first layers in response to a first vertical synchronization signal, and rendering the one or more first layers, and after rendering the one or more first layers, performing layer composing on the rendered one or more first layers to obtain a first image frame comprises:

determining that a first frame processing duration in a first measurement period is shorter than or equal to a preset single-frame duration;

in response to the determining that the first frame processing duration in the first measurement period is shorter than or equal to the preset single-frame duration, drawing, by the electronic device, the one or more first layers in response to the first vertical synchronization signal, and rendering the one or more first layers, and after rendering the one or more first layers, performing layer composing on the rendered one or more first layers to obtain the first image frame, wherein the first frame processing duration is a sum of a first frame rendering duration and a first layer composing frame duration for composing the first layer, the first frame rendering duration is a duration required for drawing the layer and rendering the drawn layer, and the first layer composing frame duration is a duration required for performing layer composing on the rendered layer.

16. The electronic device of claim 15, wherein the first layer composing frame duration is a SurfaceFlinger frame duration.

* * * * *